United States Patent
Matsumura et al.

(10) Patent No.: US 6,961,647 B2
(45) Date of Patent: Nov. 1, 2005

(54) METHOD OF CONTROLLING A VEHICLE AND SYSTEM OF CONTROLLING THE SAME

(75) Inventors: Tetsuo Matsumura, Hitachinaka (JP); Naoyuki Ozaki, Hitachinaka (JP); Kinya Fujimoto, Hitachinaka (JP); Hiroshi Kuroiwa, Hitachi (JP); Takashi Okada, Hitachi (JP); Toshimichi Minowa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/303,883

(22) Filed: Nov. 26, 2002

(65) Prior Publication Data

US 2003/0100985 A1 May 29, 2003

(30) Foreign Application Priority Data

Nov. 26, 2001 (JP) ........................................ 2001-358988

(51) Int. Cl.⁷ ........................ G06F 17/00; G06G 7/00; B60K 41/02
(52) U.S. Cl. .................... 701/55; 701/60; 701/66; 701/51; 192/3.54; 192/3.51; 477/174; 477/175; 477/176
(58) Field of Search .................... 701/55, 52, 56, 701/58, 60, 64, 65, 66; 192/3.51, 3.54, 3.55, 3.58, 3.61; 477/70, 77, 79, 80, 86, 115, 169, 174, 175, 176, 180; 180/338, 368

(56) References Cited

U.S. PATENT DOCUMENTS

| 6,067,494 A | * | 5/2000 | Noda et al. ................... 701/54 |
| 6,770,010 B2 | * | 8/2004 | Matsumura et al. ........ 477/124 |

FOREIGN PATENT DOCUMENTS

| JP | 2898405 | 3/1993 |
| JP | 2703169 | 10/1997 |

* cited by examiner

*Primary Examiner*—Thomas G. Black
*Assistant Examiner*—Brian J. Broadhead
(74) *Attorney, Agent, or Firm*—Crowell & Moring LLP

(57) ABSTRACT

Friction clutches 203, 204 and engaging clutches 19, 20, 21 are arranged between an input shaft and an output shaft of a gear type transmission having a plurality of gear trains. A power train unit 100 controls an output shaft torque and an input rotation speed of the transmission during changing speed by estimating or detecting input a torque to the transmission, and detecting an output rotation speed of the transmission, and setting a target shift torque during shifting gear, and setting a command value to the friction clutches 203 and 204 from the target shift torque and the input torque.

6 Claims, 28 Drawing Sheets

|  | MESH TYPE CLUTCH 1 | | | MESH TYPE CLUTCH 2 | | | MESH TYPE CLUTCH 3 | | |
|---|---|---|---|---|---|---|---|---|---|
|  | 1 | N | 2 | 3 | N | 4 | 5 | N | R |
| FIRST SPEED STAGE P1 | ○ | | | | | | | ○ | |
| SECOND SPEED STAGE P2 | | | ○ | | | | | ○ | |
| THIRD SPEED STAGE P3 | | ○ | | ○ | | | | ○ | |
| FOURTH SPEED STAGE P4 | | ○ | | | | ○ | | ○ | |
| FIFTH SPEED STAGE P5 | | ○ | | | | | ○ | | |
| BACKWARD STAGE PR | | ○ | | | | ○ | | | ○ |

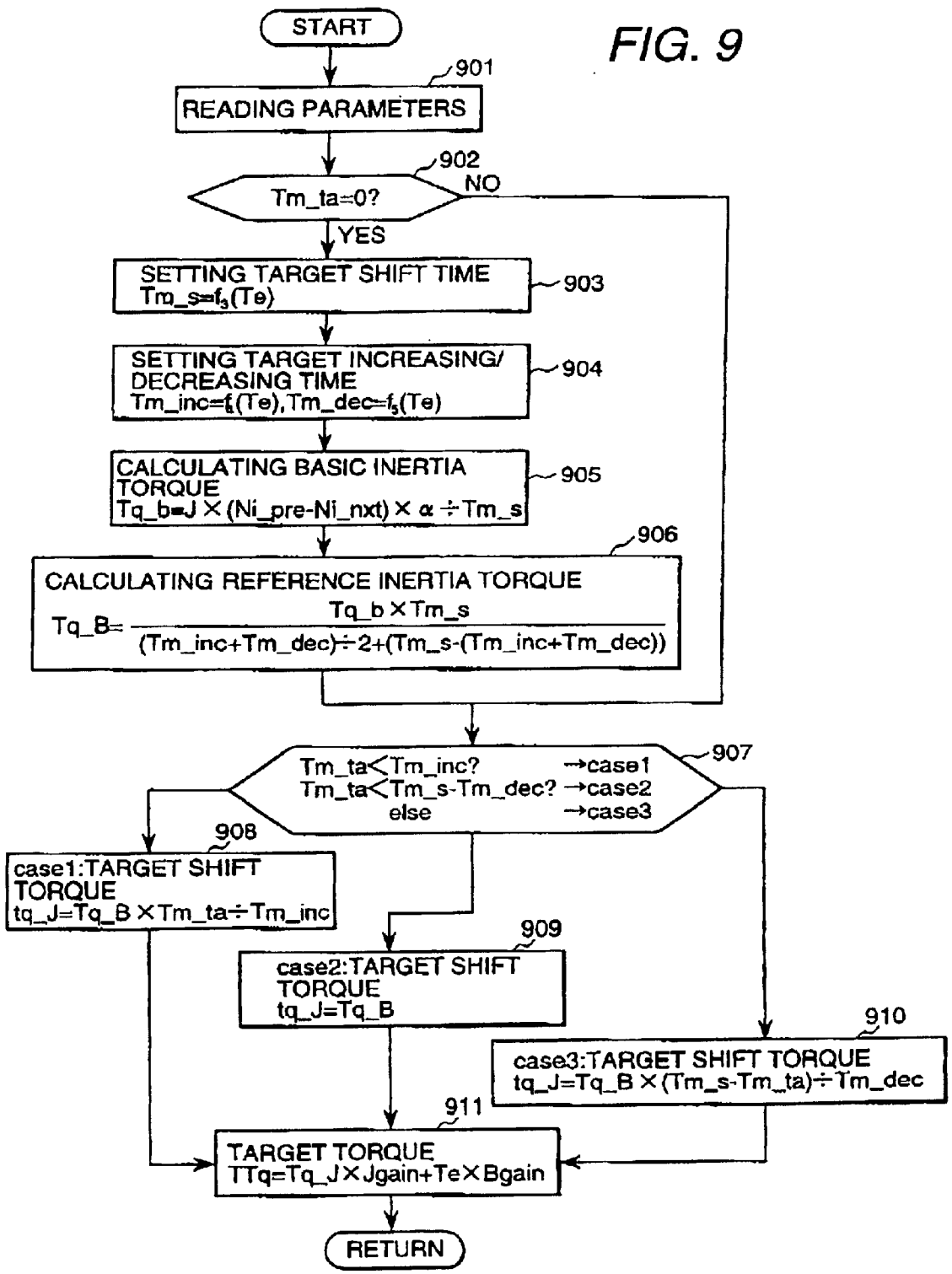

METHOD OF CONTROLLING A VEHICLE AND SYSTEM OF CONTROLLING THE SAME

BACKGROUND OF THE INVENTION

The present invention relates to a method of controlling a vehicle and a system of controlling a vehicle, and particularly to a method of controlling a vehicle and a system of controlling a vehicle having an automatic transmission in the vehicle.

A vehicle of a manual transmission type is excellent in fuel economy compared to a vehicle mounting a transmission using a torque converter. However, coordination of the clutch and the accelerator at starting is difficult to be operated. If the coordination of the clutch and the accelerator at starting is not operated well, a large shock is generated at engaging the clutch, or rotation speed of the engine may be rapidly increased when the clutch pressure is insufficient, that is, what is called as a blowing-up phenomenon occurs. Further, when the clutch is suddenly engaged while rotation speed of the engine is insufficient, or when the vehicle is started to run on an uphill, the engine may be stopped, that is, what is called as engine stopping occurs.

In order to solve these problems, a system automatizing clutching and shifting using a mechanism of a manual transmission, that is, an automatized MT (an automatized manual transmission) has been developed. However, a driver sometimes feels incongruity because suspension of driving torque occurs by disengaging and engaging of the clutch in the control at shifting gear in the conventional automatized MT (the automatized manual transmission).

A system disclosed in, for example, the Japanese Patent No. 2703169 is known. In the system, an assist clutch of a friction transmission means is added to the conventional automatized MT (the automatized manual transmission) to perform rotation speed synchronization and torque transmission for shifting gear by controlling the assist clutch when shifting is performed.

Further, a system disclosed in, for example, the Japanese Patent No. 2898405 is known. In the system, in order to rapidly perform rotation speed synchronization in a vehicle of such a kind, a target value of an input rotation speed of the transmission is set depending on a driving condition of the vehicle, and a torque of the assist clutch is set so that the input rotation speed of the transmission is operated according to the target rotation speed.

In the vehicles of such a kind, a feeling of shifting strongly depends on a waveform of the output shaft torque of the transmission in what is called as an inertia phase in which using the assist clutch, the rotation speed of the input shaft of the transmission is synchronized with the rotation speed of a gear train next engaged with an engaging clutch. Therefore, in the case of setting a target input shaft rotation speed first, and then controlling the clutch torque so that the input shaft rotation speed may follow the target rotation speed, as disclosed in Patent No. 2703169 or Patent No. 2898405, the torque of the assist clutch generated as the result is not always formed in a desired waveform as a shifting feeling.

SUMMARY OF THE INVENTION

An object of the present invention is to provide a method of controlling a vehicle and a system of controlling a vehicle which can improve the shifting feeling and can rapidly perform the rotation speed synchronization by controlling the torque waveform during shifting gear so as to form a torque waveform good for the shifting feeling.

(1) In order to attain the above object, the present invention is characterized by a method of controlling a vehicle comprising a driving power source for generating a driving force; a gear type transmission having a plurality of gear trains; and a plurality of torque transmitting means arranged between an input shaft and an output shaft of the transmission, at least one of the torque transmitting means being a friction transmitting means, shifting being performed by controlling the friction transmitting means when the shifting is performed from one of the gear trains to another of the gear trains, the method comprising the steps of estimating or detecting an input torque to the transmission; detecting an output rotation speed of the transmission; setting a target shift torque during shifting using at least one parameter among parameters expressing a state of the driving power source or the transmission; and controlling an output shaft torque of the transmission and an input rotation speed of the transmission during shifting by setting a command value to the friction transmitting means using the target shift torque and the input torque.

By the method described above, feeling of the shifting can be improved and the synchronization of rotation speed can be rapidly performed by controlling the torque waveform during shifting.

(2) In the above item (1), it is preferable that the target shift torque is set by a target shift time set by at least one parameter among the parameters expressing the state of the driving power source or the transmission; a target increasing time set by at least one parameter among the parameters expressing the state of the driving power source or the transmission; a target decreasing time set by at least one parameter among the parameters expressing the state of the driving power source or the transmission; and at least one parameter among the parameters expressing the state of the driving power source or the transmission.

(3) In the above item (2), it is preferable that the target shift time, the target increasing time and the target decreasing time are set corresponding to a gear position before shifting and a gear position to be targeted.

(4) In the above item (2), it is preferable that the target shift time, the target increasing time and the target decreasing time are set corresponding to an input torque.

(5) In the above item (2), it is preferable that the target shift time, the target increasing time and the target decreasing time are set corresponding to a gear position before shifting, a gear position to be targeted, and an input torque.

(6) Further, in order to attain the above-described object, the present invention is characterized by a method of controlling a vehicle comprising a driving power source for generating a driving force; a gear type transmission having a plurality of gear trains; and a plurality of torque transmitting means arranged between an input shaft and an output shaft of the transmission, at least one of the torque transmitting means being a friction transmitting means, shifting being performed by controlling the friction transmitting means when the shifting is performed from one of the gear trains to another of the gear trains, the method comprising the steps of estimating or detecting an input torque to the transmission; detecting an input rotation speed of the transmission; detecting an output rotation speed of the transmission; setting a target shift torque during shifting using at least one parameter among parameters expressing a state of the driving power source or the transmission; setting a target shift torque during shifting using at least one parameter among the parameters expressing the state of the driving power source or the transmission; setting a feed-forward command value to the friction transmitting means from the target shift torque and the input torque; setting a target input rotation speed from the target shift torque; setting a feedback command value to the friction transmitting means based on a difference between the target input rotation speed and the input rotation speed; and controlling an output shaft torque of the transmission and an input rotation speed of the transmission during shifting by setting a command value to the friction transmitting means using the feed-forward command value and the feedback command value.

By the method described above, feeling of the shifting can be improved and the synchronization of rotation speed can be rapidly performed by controlling the torque waveform during shifting.

(7) in the above item (6), it is preferable that the target shift torque is set by a target shift time set by at least one parameter among the parameters expressing the state of the driving power source or the transmission; a target increasing time set by at least one parameter among the parameters expressing the state of the driving power source or the transmission; a target decreasing time set by at least one parameter among the parameters expressing the state of the driving power source or the transmission; and at least one parameter among the parameters expressing the state of the driving power source or the transmission.

(8) In the above item (7), it is preferable that the target input rotation speed is set based on a target gear ratio set from the target shift torque.

(9) In order to attain the above-described object, the present invention is characterized by a method of controlling a vehicle comprising a driving power source for generating a driving force; a gear type transmission having a plurality of gear trains; and two friction transmitting means to be connected to a transmission input shaft, shifting being performed by engaging one of the two friction transmitting means and by disengaging the other, the method comprising the steps of estimating or detecting an input torque to the transmission; detecting an output rotation speed of the transmission; setting a targeted shift time using at least one parameter among parameters expressing a state of the driving power source or the transmission; setting a target shift torque during shifting using at least one parameter among the parameters expressing the state of the driving power source or the transmission; setting a target increasing time of a time increasing said target shift torque using at least one parameter among the parameters expressing the state of the driving power source or the transmission; setting a target decreasing time of a time decreasing the target shift torque using at least one parameter among the parameters expressing the state of the driving power source or the transmission; and controlling an output shaft torque of the transmission and an input rotation speed of the transmission during shifting by setting a command value to the friction transmitting means using the target shift torque and the input torque.

By the method described above, feeling of the shifting can be improved and the synchronization of rotation speed can be rapidly performed by controlling the torque waveform during shifting.

(10) Further, in order to attain the above-described object, the present invention is characterized by a method of controlling a vehicle comprising a driving power source for generating a driving force; a gear type transmission having a plurality of gear trains; and two friction transmitting means to be connected to a transmission input shaft, shifting being performed by engaging one of the two friction transmitting means and by disengaging the other, the method comprising the steps of estimating or detecting an input torque to the transmission; detecting an output rotation speed of the transmission; setting a targeted shift time using at least one parameter among parameters expressing a state of the driving power source or the transmission; setting a target shift torque during shifting using at least one parameter among the parameters expressing the state of the driving power source or the transmission; setting a target increasing time of a time increasing the target shift torque using at least one parameter among the parameters expressing the state of the driving power source or the transmission; setting a target decreasing time of a time decreasing the target shift torque using at least one parameter among the parameters expressing the state of the driving power source or the transmission; setting a feed-forward command value to the friction transmitting means from the target shift torque and the input torque; setting a target input rotation speed from the target shift torque; setting a feedback command value to the friction transmitting means based on a difference between the target input rotation speed and the input rotation speed; and controlling an output shaft torque of the transmission and an input rotation speed of the transmission during shifting by setting a command value to the friction transmitting means using the feed-forward command value and the feedback command value.

By the method described above, feeling of the shifting can be improved and the synchronization of rotation speed can be rapidly performed by controlling the torque waveform during shifting.

(11) In the above item (10), it is preferable that the target input rotation speed is set based on a target gear ratio set from the target shift torque.

(12) Further, in order to attain the above-described object, the present invention is characterized by a system of controlling a vehicle comprising a driving power source for generating a driving force; a gear type transmission having a plurality of gear trains; a plurality of torque transmitting means arranged between an input shaft and an output shaft of the transmission, at least one of the torque transmitting means being a friction transmitting means; and a shift control means for performing shifting by controlling the friction transmitting means when the shifting is performed from one of the gear trains to another of the gear trains, wherein the shift control means controlling an output shaft torque of the transmission and an input rotation speed of the transmission during shifting by estimating or detecting an input torque to the transmission; detecting an output rotation speed of the transmission; setting a target shift torque during shifting using at least one parameter among parameters expressing a state of the driving power source or the transmission; and setting a command value to the friction transmitting means using the target shift torque and the input torque.

By the method described above, feeling of the shifting can be improved and the synchronization of rotation speed can be rapidly performed by controlling the torque waveform during shifting.

BRIEF DESCRIPTION OF THE DRAWINGS

FIG. 9 is a flowchart showing the control contents of the torque assist control phase in the shift control by the system of controlling the vehicle according to the first embodiment of the present invention.

DETAILED DESCRIPTION OF THE PREFERRED EMBODIMENTS

The construction and the operation of a first embodiment of a system of controlling a vehicle in accordance with the present invention will be described below, referring to FIG. 1 to FIG. 14.

Initially, a first construction example of the system of controlling the vehicle according to the present embodiment will be described, referring to FIG. 1.

Figure 1:
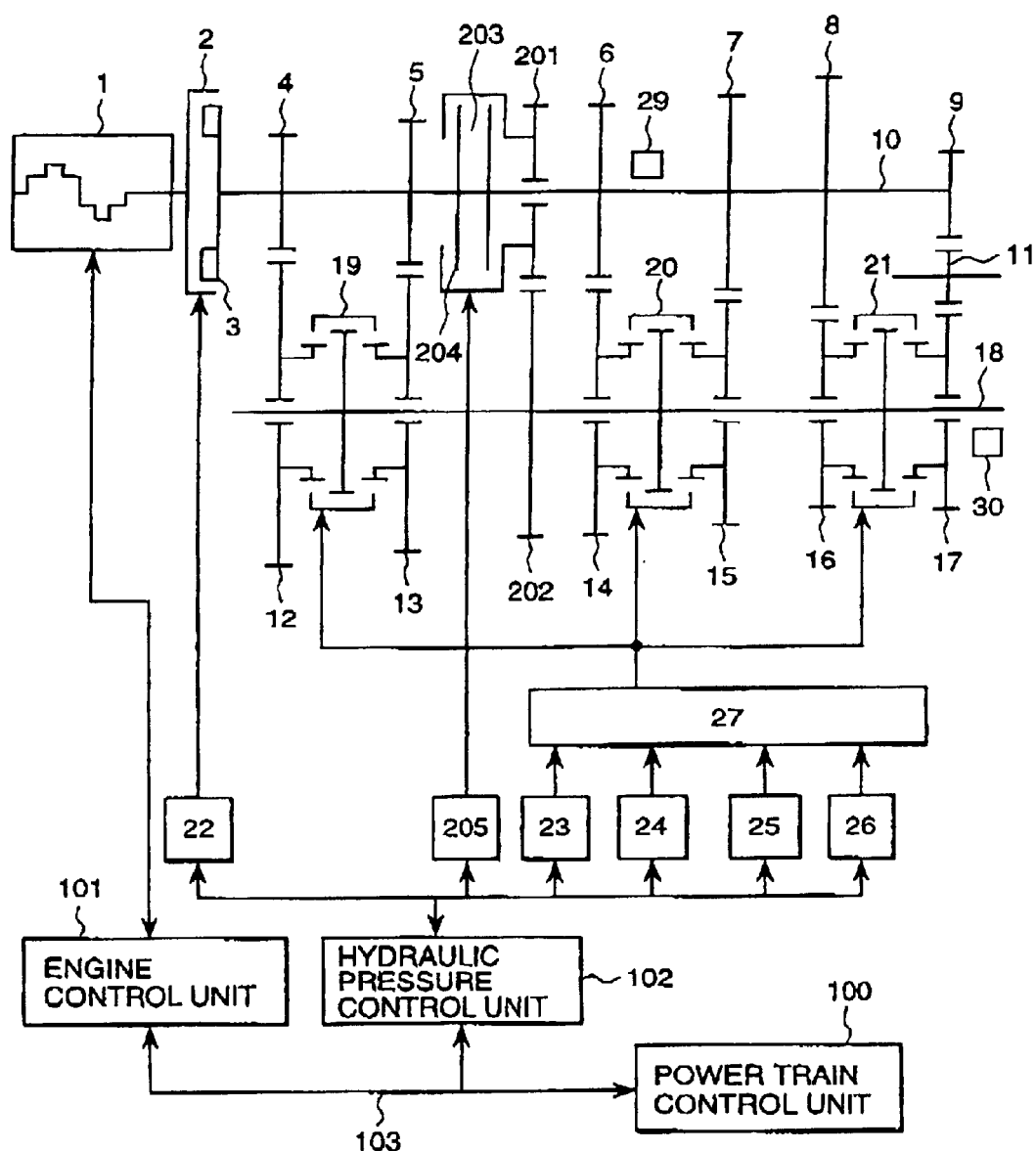
FIG. 1 is a system diagram showing a first construction example of a system of controlling a vehicle according to a first embodiment of the present invention.

FIG. 1 is a system diagram showing the first construction example of the system of controlling the vehicle according to the first embodiment of the present invention.

An engine 1 comprises an engine rotation speed sensor, not shown, for measuring rotation speed of the engine 1; an electronic control throttle (not shown) for controlling engine torque; and a fuel injector (not shown) for injecting an amount if fuel corresponding to an amount of intake air. An engine control unit 101 can control torque of the engine 1 with high accuracy by operating the amount of intake air, the amount of fuel, ignition timing and so on. As the fuel injector, there are an intake port injection type in which fuel is injected into an intake port, and an in-cylinder injection type in which fuel is directly injected into a cylinder. It is advantageous that which type of engine is used is determined by comparing the operating range (a range determined by an engine torque and an engine rotation speed) required for the engine and selecting one type capable of reducing fuel consumption and reducing the amount of emission gas.

A first clutch input disk 2 is connected to the engine 1, and torque of the engine 1 can be transmitted to a transmission input shaft 10 by engaging the first clutch input disk 2 with a first clutch output disk 3. A dry single-plate type clutch is generally used for the first clutch, but any type of a friction transmitting means such as a wet multi-plate clutch or a magnetic clutch may be used.

A first drive gear 4, a second drive gear 5, a third drive gear 6, a fourth drive gear 7, a fifth drive gear 8 and a sixth drive gear 9 are provided to the input shaft 10. An actuator 22 driven by hydraulic pressure is used for controlling a thrust force (a clutch torque) between the first clutch input disk 2 and the first clutch output disk 3, and the output power of the engine 1 can be transmitted or cut off to the input shaft 11 by controlling the thrust force (the clutch torque).

The first drive gear 4, the second drive gear 5, the third drive gear 6, the fourth drive gear 7, the fifth drive gear 8 and the sixth drive gear 9 are fixed to the transmission input shaft 10 Further, a sensor 29 for detecting the rotation speed of the transmission input shaft 10 is provided.

On the other hand, a first driven gear 12, a second driven gear 13, a third driven gear 14, a fourth driven gear 15, a fifth driven gear 16 and a sixth driven gear 17 are rotatably provided to the transmission output shaft 18. The first driven gear 16 is engaged with the first drive gear 4, and the second driven gear 13 is engaged with the second drive gear 5. The third driven gear 14 is engaged with the third drive gear 6, and the fourth driven gear 15 is engaged with the fourth drive gear 7. The fifth driven gear 16 is engaged with the fifth drive gear 8, and the sixth driven gear 17 is engaged with the sixth drive gear 9.

Further, a second clutch (called as an engaging clutch or a dog clutch) 19 having a synchronizer mechanism for engaging the first driven gear 12 with the transmission output shaft 18 or engaging the second driven gear 13 with the transmission output shaft 18 is provided between the first driven gear 12 and the second driven gear 13. Therefore, the rotation torque transmitted from the first drive gear 4 or the second drive gear 5 to the first driven gear 12 or the second driven gear 13 is transmitted to the second clutch 19, and then transmitted to the transmission output shaft 18 through the second clutch 19.

Further, a third clutch (called as an engaging clutch or a dog clutch) 20 having a synchronizer mechanism for engaging the third driven gear 14 with the transmission output shaft 18 or engaging the fourth driven gear 15 with the transmission output shaft 18 is provided between the third driven gear 14 and the fourth driven gear 15. Therefore, the rotation torque transmitted from the third drive gear 6 or the fourth drive gear 7 to the third driven gear 14 or the fourth driven gear 15 is transmitted to the third clutch 20, and then transmitted to the transmission output shaft 18 through the third clutch 20.

Further, a fourth clutch (called as an engaging clutch or a dog clutch) 21 having a synchronizer mechanism for engaging the fifth driven gear 16 with the transmission output shaft 18 or engaging the sixth driven gear 17 with the transmission output shaft 18 is provided between the fifth driven gear 16 and the sixth driven gear 17. Therefore, the rotation torque transmitted from the fifth drive gear 8 or the sixth drive gear 9 to the fifth driven gear 16 or the sixth driven gear 17 is transmitted to the fourth clutch 21, and then transmitted to the transmission output shaft 18 through the third clutch 21. In a case where the sixth driven gear 17 is engaged with the transmission output shaft 18 through a reverse rotation gear 11, an engaging clutch not having the synchronizer mechanism different from the fourth clutch 21 may be used.

As described above, in order to transmit the rotation torque of the transmission input shaft 10 to the second clutch 19 or the third clutch 20 or the fourth clutch 21, it is necessary to move any one of the second clutch 19, the third clutch 20 and the fourth clutch 21 in the axial direction of the transmission output shaft 18 to engage with any one of the first driven gear 12, the second driven gear 13, the third driven gear 14, the fourth driven gear 15, the fifth driven gear 16 and the sixth driven gear 17. In order to engage with any one of the first driven gear 12, the second driven gear 13, the third driven gear 14, the fourth driven gear 15, the fifth driven gear 16 and the sixth driven gear 17 with the transmission output shaft 18, any one of the second clutch 19, the third clutch 20 and the fourth clutch 21 in the axial direction of the transmission output shaft 18 must be moved. In order to move any one of the second clutch 19, the third clutch 20 and the fourth clutch 21, a shift mechanism 27 and a select mechanism 28 are operated by actuators, that is, a shift first actuator 23, a shift second actuator 24, and a select first actuator 25 and a select second actuator 26 which are driven by hydraulic pressure. The operational relationship of the shift mechanism 27 and the select mechanism 28 using the shift first actuator 23 and the shift second actuator 24, and the select first actuator 25 and the select second actuator 26 is to be described later referring to FIG. 4. By engaging any one of the second clutch 19, the third clutch 20 and the fourth clutch 21 with any one of the first driven gear 12, the second driven gear 13, the third driven gear 14, the fourth driven gear 15, the fifth driven gear 16 and the sixth driven gear 17, the rotation torque of the transmission input shaft 10 can be transmitted to the driving wheel output shaft 18 through any one of the second clutch 19, the third clutch 20 and the fourth clutch 21. Further, a sensor 30 for detecting the rotation speed of the transmission output shaft 18 is provided.

The shift first actuator 23 and the shift second actuator 24, and the select first actuator 25 and the select second actuator 26 may be constructed of solenoid valves or motors or the like. Further, the shift/select mechanisms 27 may be constructed of a shifter rail and a shifter folk, or constructed in a drum type. The operation of the shift first actuator 23, the shift second actuator 24, the select first actuator 25 and the select second actuator 26, and the operational relationship of the first engaging clutch 19, the second engaging clutch 20 and the third engaging clutch 21 are to be described later, referring to FIG. 3.

A seventh drive gear 201 is connected to an assist clutch input disk 203 of a second clutch (hereinafter, referred to as an assist clutch) of a friction clutch of one type of friction transmitting means, and the transmission input shaft 10 is connected to an assist clutch output disk 204. The torque of a seventh driven gear 202 can be transmitted to the transmission output shaft 18 by engaging the assist clutch input disk 203 with the assist clutch output disk 204.

An actuator 205 driven by hydraulic pressure is used for controlling a thrust force (an assist clutch torque) between the assist clutch input disk 203 and the assist clutch output disk 204, and the output power of the engine 1 can be transmitted to the transmission output shaft 18 by controlling the thrust force (the assist clutch torque) The actuator 205 may be constructed of solenoid valves or motors or the like. Further, although a wet multi-plate clutch is generally used for the assist clutch of the one type of friction transmitting means, any type of friction transmitting means such as a magnetic clutch or the like may be used.

As described above, the rotation torque of the transmission input shaft 10 transmitted from the first drive gear 4, the second drive gear 5, the third drive gear 6, the fourth drive gear 7, the fifth drive gear 8 or the sixth drive gear 9 through the first driven gear 12, the second driven gear 13, the third driven gear 14, the fourth driven gear 15, the fifth driven gear 16 or the sixth driven gear 17 is transmitted to wheels (not shown) through a differential gear (not shown) connected to the transmission output shaft 18.

The first clutch actuator 22 generating the thrust force (the clutch torque) between the first clutch input disk 2 and the first clutch output disk 3; the shift first actuator 23, the shift second actuator 24, the select first actuator 25 and the select second actuator 26 driving the shift mechanism 27 and the select mechanism 28 operating the second clutch 19, the third clutch 20 and the fourth clutch 21; and the actuator 205 generating the thrust force (the assist clutch torque) between the assist clutch input disk 203 and the assist clutch output disk 204 control the individual clutches by being controlled hydraulic pressure applied to the individual actuators by the hydraulic pressure control unit 102 and by adjusting stroke amounts of hydraulic pressure cylinders (not shown) provided to the individual actuators.

Further, the engine 1 is constructed so that the torque of the engine 1 is controlled with high accuracy by the engine control unit 101 operating the amount of intake air, the amount of fuel, the ignition timing and so on. Further, the hydraulic pressure control unit 102 and the engine control unit 101 are controlled by a power train control unit 100. The power train control unit 101, the engine control unit 101 and the hydraulic pressure control unit 102 mutually send and receive information through a communication means 103.

Next, a second construction example of the system of controlling the vehicle of the present embodiment will be described, referring to FIG. 2.

Figure 2:
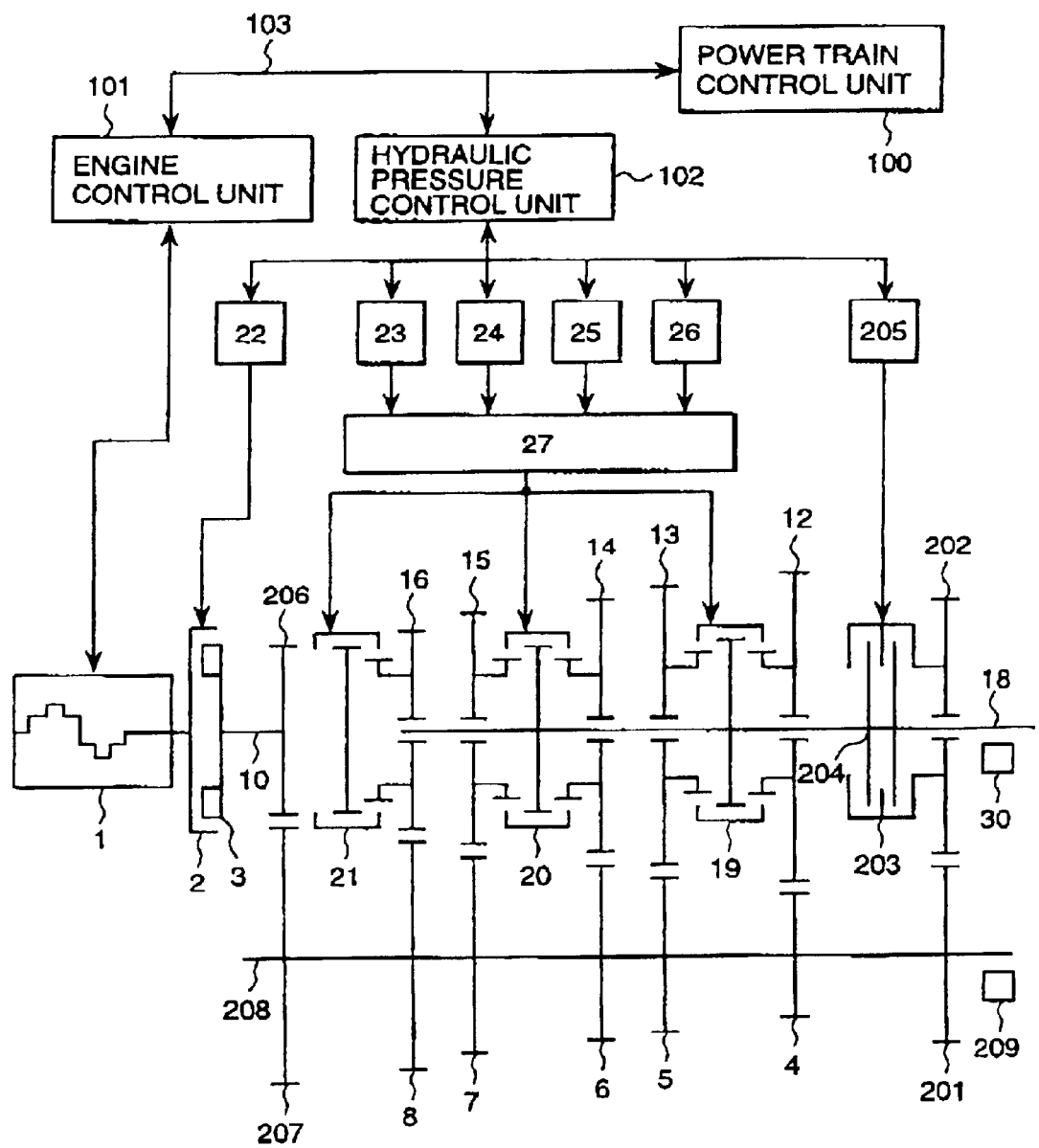
FIG. 2 is a system diagram showing a second construction example of a system of controlling a vehicle according to the first embodiment of the present invention.

FIG. 2 is a system diagram showing the second construction example of the system of controlling the vehicle according to the first embodiment of the present invention. In the figure, the same parts as in FIG. 1 are identified by the same reference character.

Although the example shown in FIG. 1 is constructed of two shafts of the transmission input shaft 10 and the transmission output shaft 18, the present example is constructed of three shafts including a counter shaft 208. That is, the power of the engine 1 is transmitted from an input drive gear 206 to an input driven gear 207, and then transmitted from the counter shaft 208 to the transmission output shaft 18 through the first drive gear 4, the second drive gear 5, the third drive gear 6, the fourth drive gear 7, the fifth drive gear 8, a backward drive gear (not shown) or the seventh drive gear 201; and the first driven gear 12, the second driven gear 13, the third driven gear 14, the fourth driven gear 15, the fifth driven gear 16, a backward driven gear (not shown) or the seventh driven gear 202. Further, the seventh drive gear 201 and the seventh driven gear 202 connected to the assist clutch may be constructed in a gear position.

As described above, the present invention comprises the gear type transmission having the plurality of gear trains and the plurality of torque transmitting means between the input shaft and the output shaft of the transmission, and can be applied to various kinds of transmissions using at least one of the above described torque transmitting means as the friction transmitting means.

The engaging relationship between the clutch and the driven gear in the present embodiment of the system of controlling the vehicle will be described below, referring to FIG. 3.

Figures 3A, 3B:
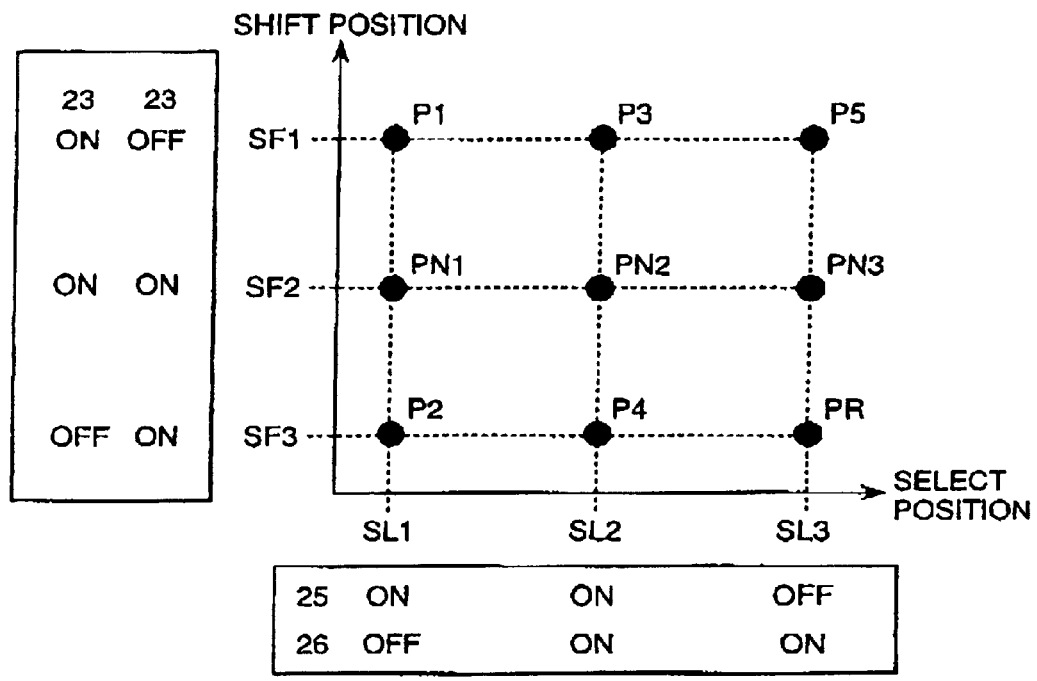
FIG. 3 is diagrams explaining the engaging relationship between the clutch and the driven gear in the system of controlling the vehicle according to the first embodiment of the present invention.

FIGS. 3(A) and (B) are diagrams explaining the engaging relationship between the clutch and the driven gear in the system of controlling the vehicle according to the first embodiment of the present invention.

FIG. 3 shows the engaging relationship between the second clutch 19, the third clutch 20, the fourth clutch 21 and the first driven gear 12, the second driven gear 13, the third driven gear 14, the fourth driven gear 15, the fifth driven gear 16, the sixth driven gear 17 by controlling the shift mechanism 27 and the select mechanism 28, that is, the shift position and the select position using the shift first actuator 23 and the shift second actuator 24, and the select first actuator 25 and the select second actuator 26 shown in FIG. 1.

By setting the select position to a position SL1 by turning the select first actuator 25 ON and the select second actuator 26 OFF, and by setting the shift position to a position SF1 by turning the shift first actuator 23 ON and the shift second actuator 24 OFF, the shift position and the select position are moved to a point P1 to form a first speed stage by engaging the second clutch 19 with the first driven gear 12.

By setting the select position to the position SL1 by turning the select first actuator 25 ON and the select second actuator 26 OFF, and by setting the shift position to a position SF3 by turning the shift first actuator 23 OFF and the shift second actuator 24 ON, the shift position and the select position are moved to a point P2 to form a second speed stage by engaging the second clutch 19 with the second driven gear 13.

By setting the select position to a position SL2 by turning the select first actuator 25 ON and the select second actuator 26 ON, and by setting the shift position to the position SF1 by turning the shift first actuator 23 ON and the shift second actuator 24 OFF, the shift position and the select position are moved to a point P3 to form a third speed stage by engaging the third clutch 20 with the third driven gear 14.

By setting the select position to a position SL2 by turning the select first actuator 25 ON and the select second actuator 26 ON, and by setting the shift position to a position SF3 by turning the shift first actuator 23 OFF and the shift second actuator 24 ON, the shift position and the select position are moved to a point P4 to form a fourth speed stage by engaging the third clutch 20 with the fourth driven gear 15.

By setting the select position to a position SL3 by turning the select first actuator 25 OFF and the select second actuator 26 ON, and by setting the shift position to the position SF1 by turning the shift first actuator 23 ON and the shift second actuator 24 OFF, the shift position and the select position are moved to a point P5 to form a fifth speed stage by engaging the fourth clutch 21 with the fifth driven gear 16.

By setting the select position to the position SL3 by turning the select first actuator 25 OFF and the select second actuator 26 ON, and by setting the shift position to the position SF3 by turning the shift first actuator 23 OFF and the shift second actuator 24 ON, the shift position and the select position are moved to a point PR to form a backward stage by engaging the fourth clutch 21 with the sixth driven gear 17.

By setting the select position to the position SL2 by turning the select first actuator 25 ON and the select second actuator 26 ON, engagement of the gear is released to form a neutral position.

Figure 4:
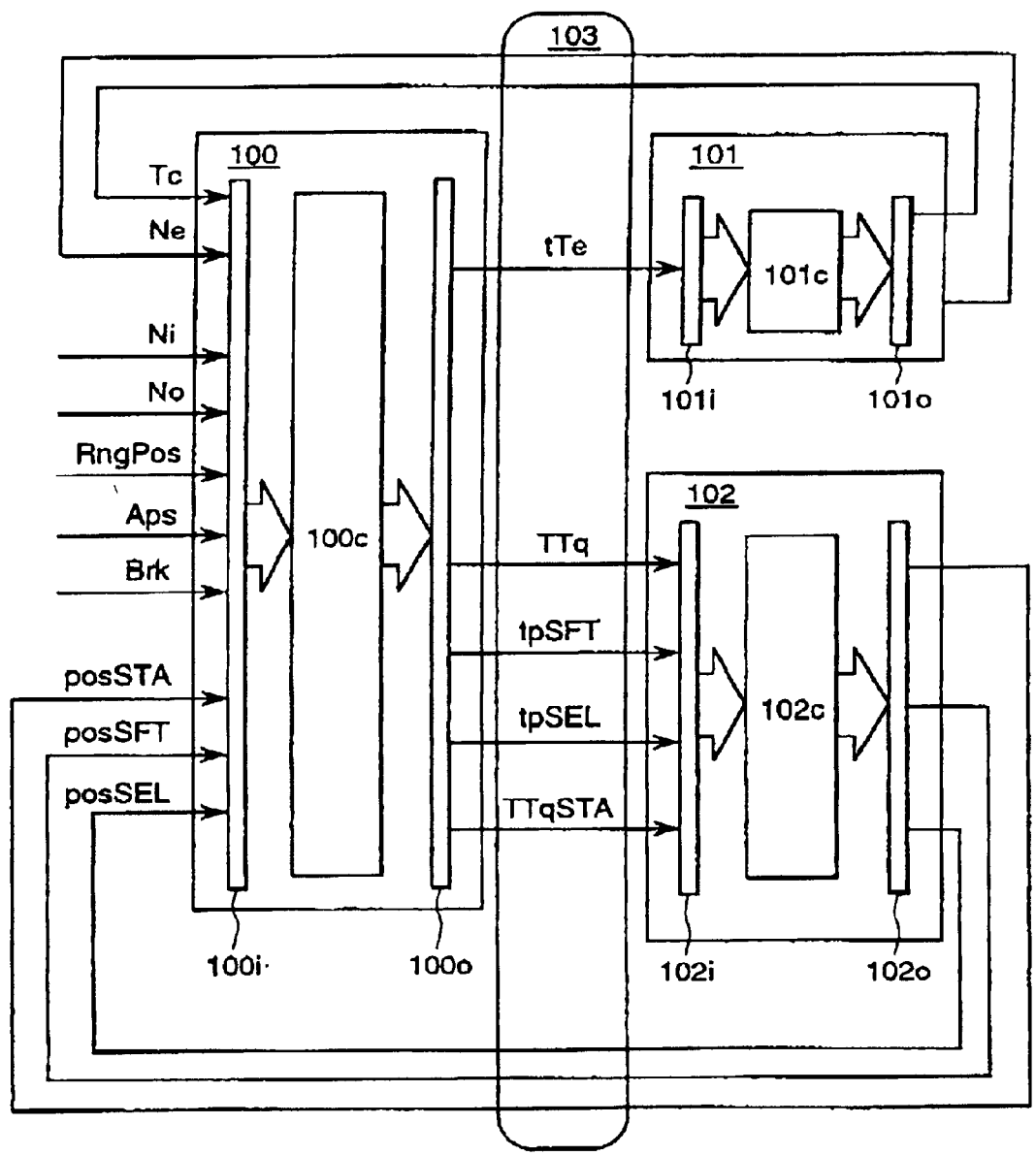
FIG. 4 is a block diagram showing the input and output signal relationship by a communication means 103 among a power train control unit 100, an engine control unit 101 and a hydraulic pressure control unit 102 in the system of controlling the vehicle according to the first embodiment of the present invention.

Referring to FIG. 4, description will be made below on the input and output signal relationship among the power train control unit 100, the engine control unit 101 and the hydraulic pressure control unit 102 using the communication means 103.

FIG. 4 is a block diagram showing the input and output signal relationship by a communication means 103 among the power train control unit 100, the engine control unit 101 and the hydraulic pressure control unit 102 in the system of controlling the vehicle according to the first embodiment of the present invention.

The power train control unit 100 is constructed as a control unit having an input part 100i, an output part 100o and a computer 100c. Similarly, the engine control unit 101 is also constructed as a control unit having an input part 101i, an output part 101o and a computer 101c. The hydraulic pressure control unit 102 is also constructed as a control unit having an input part 102i, an output part 102o and a computer 102c.

An engine torque command value tTe is transmitted from the power train control unit 100 to the engine control unit 101 using the communication means 103, and the engine control unit 101 controls the amount of intake air, the amount of fuel and the ignition timing (not shown) so as to satisfy the engine torque command tTe. Further, a means (not shown) for detecting an engine torque to become an input torque to the transmission is provided inside the engine control unit 101, and the engine control unit 101 detects a rotation speed Ne of the engine 1 and an engine torque Te generated by the engine 1 and transmits them to the power train control unit 100 using the communication means 103. As the engine torque detecting means, a torque sensor may be used, or an estimating means from parameters of the engine such as an injection pulse width of the injector or a pressure inside the intake pipe, an engine rotation speed and the like may be used.

The power train control unit 100 sends a first clutch target torque TTqSTA, a target shift position tpSFT, a target select position tpSEL and an assist clutch target torque TTq to the hydraulic pressure control unit 102, and the hydraulic pressure control unit engages and disengages the first clutch input disk 2 and the first clutch output disk 3 by controlling the first clutch actuator 22 so as to satisfy the first clutch target torque TTqSTA. Further, the hydraulic pressure control unit controls the shift first actuator 23, the shift second actuator 24, the select first actuator 25 and the select second actuator 26 and controls the shift position and the select position by operating the shift/select mechanism 27 to engage and disengage the first engaging clutch 19, the second engaging clutch 20 and the third engaging clutch 21 so as to satisfy the target shift position tpSFT and the target select position tpSEL. Further, the hydraulic pressure control unit controls the assist clutch actuator 205 to engage and disengage the assist clutch input disk 203 and the assist clutch output disk 204 so as to satisfy the assist clutch target torque TTq.

Further, the hydraulic pressure control unit 102 detects a position signal posSTA expressing engaging and disengaging of the first clutch, a shift position signal rpSFT and a select position signal rpSEL, and sends the signals to the power train control unit 100.

Further, the power train control unit 100 receives an input shaft rotation speed Ni and an output shaft rotation speed NO from the input shaft rotation sensor 29 and the output shaft rotation sensor 30, respectively. Further, the power train control unit 100 receives a range position signal RngPos expressing a shift lever position such as P-range, R-range, N-range or D-range, and a stepping-in amount of accelerator pedal Aps, and an ON/OFF signal Brk from a brake switch for detecting whether or not the brake is stepped on.

When a driver sets, for example, the shift range to the D-range and steps in the accelerator, the power train control unit 100 judges that the driver intends to start and accelerate the vehicle. On the other hand, when the driver steps in the brake pedal, the power train control unit judges that the driver intends to decelerate and stop the vehicle. Then, the power train control unit sets the engine torque command value tTe, the first clutch target torque TTqSTA, the target shift position tpSFT and the target select position tpSEL so as to satisfy the intension of the driver. Further, The power train control unit 100 sets a gear position from a vehicle speed vsp calculated from the output shaft rotation speed tpSFT and the stepping-in amount of the accelerator pedal Aps, and sets the engine torque command value tTe, the first clutch target torque TTqSTA, the target shift position tpSET, the target select position tpSEL and the assist clutch target torque TTq so as to perform the shifting operation to the set gear position.

The control contents of shift control by the present embodiment of the system of controlling the vehicle will be described below, referring to FIG. 5 to FIG. 14.

Firstly, the overall control contents of the shift control by the present embodiment of the system of controlling the vehicle will be described, referring to FIG. 5.

Figure 5:
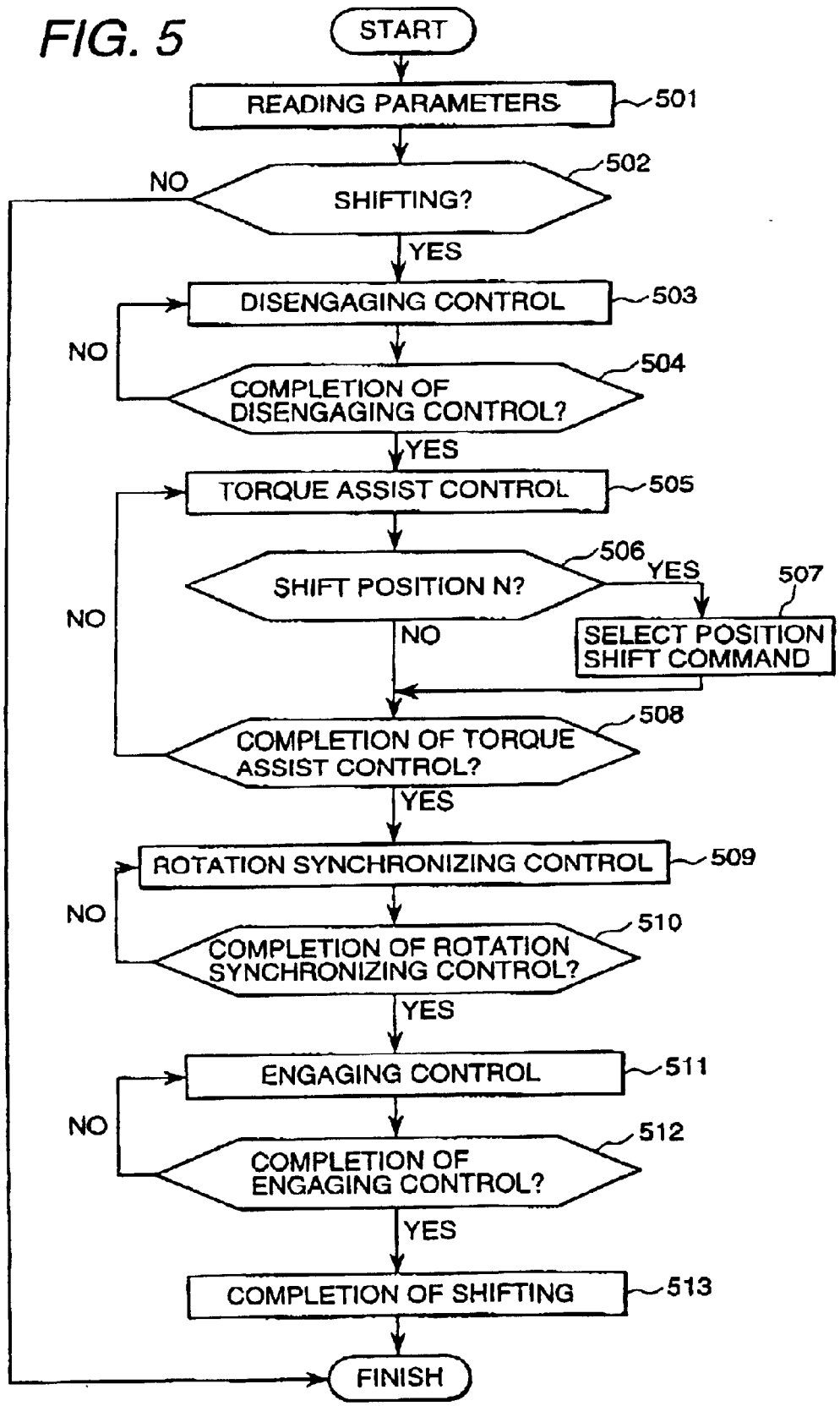
FIG. 5 is a flowchart showing the control contents of the shift control by the system of controlling the vehicle according to the first embodiment of the present invention.

FIG. 5 is a flowchart showing the control contents of the shift control by the system of controlling the vehicle according to the first embodiment of the present invention.

The control contents of the shift control to be described below are programmed in the computer 100c of the power train control unit 100, and repetitively executed in a predetermined cycle. That is, the processing from Step 501 to 513 described below is executed by the power train control unit 100.

The power train control unit 100 reads parameters in Step 501, and judges in Step 502 whether the shift control is necessary or not. If the shift control is necessary, the processing proceeds to Step 503. If the shift control is not necessary, the shift control is completed. Whether or not the shift control is necessary is judged as follows. That is, a gear position is set from a vehicle speed Vsp and a stepping-in amount of the accelerator Aps, and it is judged that the shift control is necessary if the set gear position is different from a present gear position. If the shift control is necessary, shifting operation is started by Step 503 and the flowing steps.

As the shifting operation is started, disengaging control for disengaging the gear is executed in Step 503 (a disengaging control phase). The disengaging control is to be described later in detail, referring to FIG. 7.

Next, it is judged in Step 504 whether or not the disengaging control is completed. If the disengaging control is completed, the processing proceeds to Step 505. If the disengaging control is not completed yet, the processing of Step 503 is executed again. Therein, the judgment of Step 504 is executed by whether or not the shift position rpSFT is at a position which can be judged to be a disengaging position, that is, by whether or not the shift position rpSFT is within a preset range near the shift position SF2 in FIG. 3. Letting the thresholds for judging as the disengaging position be SF1OFF and SF3OFF, respectively, if the shift position rpSFT satisfies a condition of the threshold SF1OFF≧the shift position rpSFT≧the threshold SF3OFF, it is judged that the shift position rpSFT is in the disengaging position. There, it is preferable that the thresholds SF1OFF and SF3OFF are ranges as wide as possible within positions where the engaging clutch is out of the engaging condition.

After completion of the disengaging control, torque assist control is executed in Step 505 (a torque assist control phase). The torque assist control is to be described later in detail, referring to FIG. 9.

Next, in Step 506, it is judged whether or not the shift position is in the neutral position. The judgment of Step 506 is executed by whether or not the shift position rpSFT is at a position which can be judged to be a neutral position, that is, by whether or not the shift position rpSFT is within a preset range near the shift position SF2 in FIG. 3. If the shift position is in the neutral position, a select position shift command is made in step 507. After completion of select position shift, the processing proceeds to Step 508. If the shift position is not in the neutral position, the processing proceeds to Step 508. In a case of, for example, 2→3 shifting, the target select position tpSEL is from the position SL1 to the position SL2 in FIG. 3.

Next, in Step 508, it is judged whether or not the torque assist control is completed. The completion condition of the torque assist control is the condition that elapsing time exceeds a target shift time set by the method to be described later referring to FIG. 11, or the condition that the difference between a rotation speed of the next gear position and an input rotation speed becomes small (when the condition . of input rotation speed Ni-output rotation speed No×gear ratio of the target gear position γn.≦ΔNiAT is satisfied).

If the torque assist control is completed, the processing proceeds to Step 509 (a rotation synchronizing control phase) to execute rotation synchronizing control to be described later referring to FIG. 12. If the torque assist control is not completed yet, the processing proceeds to Step 505 to continue the torque assist control.

Next, in Step 510, it is judged whether or not the rotation synchronizing control is completed. The completion condition of the rotation synchronizing control is the condition that the difference between a rotation speed of the next gear position and an input rotation speed becomes small (when the condition of . input rotation speed Ni-output rotation speed No×gear ratio of the target gear positionγn.≦ΔNiNS is satisfied) and the select position is in the target position. In a case of, for example, 2→3 shifting, the judgment of the select position is executed by whether or not the select position rpSEL in FIG. 3 is within a predetermined range near the position SL2. It is preferable that a time delay is provided in the judgment of both of the rotation difference condition and the select position condition. Further, in the case where the rate of change in the input rotation speed Ni per unit time becomes small, it is preferable that the condition of (rate of change in the input rotation speed ΔNi≦ΔDNiNS) is also added.

If the synchronizing control is completed, in order to engage the gear the processing proceeds to Step 511 (an engaging control phase) to execute engaging control. The engaging control is to be described in detail, referring to FIG. 13. If the synchronizing control is not completed yet, the processing proceeds to Step 509 again to continue the synchronizing control.

Next, in Step 512, it is judged whether or not the engaging control is completed. Therein, the completion condition of the engaging control is the condition that the difference between a rotation speed of the next gear position and an input rotation speed becomes small (when the condition of . input rotation speed Ni-output rotation speed No×gear ratio of the target gear position γn.≦ΔNiCN is satisfied) and the shift position is in the target position. In a case of, for example, 2→3 shifting, the judgment of the shift position is executed by whether or not the shift position rpSFT in FIG. 3 is within a predetermined range near the position SF1.

If the engaging control is completed, the processing proceeds to Step 513 (a shifting completion phase), and the target torque TTq of the assist clutch is set to 0, and then the shift control is completed. If the engaging control is not completed yet, the processing proceeds to Step 511 again to continue the engaging control.

Description will be made below on the contents of timers showing elapsing time of the shift control by the present embodiment of the system of controlling the vehicle, referring to FIG. 6.

Figure 6:
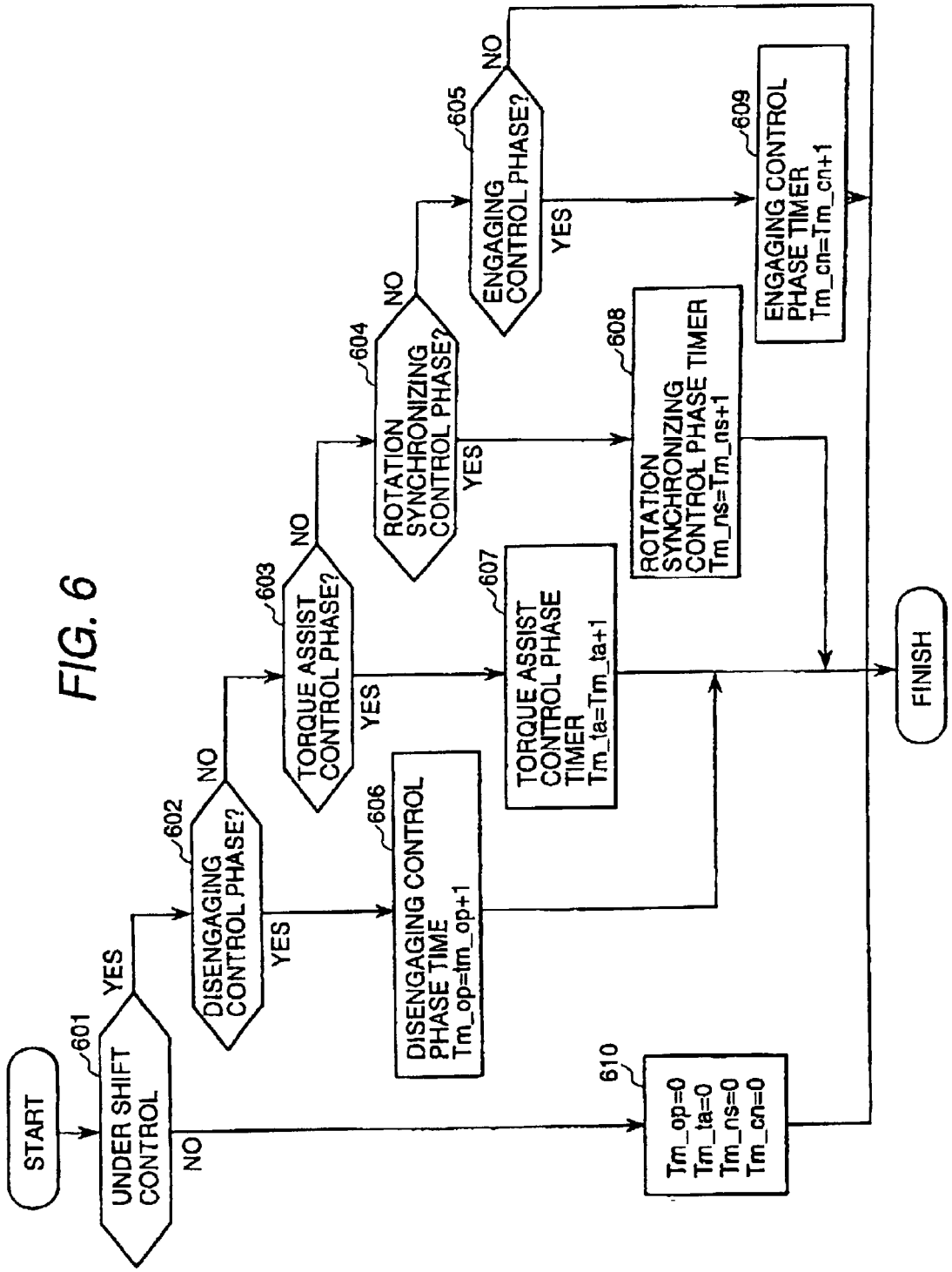
FIG. 6 is a flowchart showing the contents of timers showing elapsing time of the shift control by the system of controlling the vehicle according to the first embodiment of the present invention.

FIG. 6 is a flowchart showing the contents of timers showing elapsing time of the shift control by the system of controlling the vehicle according to the first embodiment of the present invention.

The control contents of the timers to be described below are programmed in the computer 100c of the power train control unit 100, and repetitively executed in a predetermined cycle. That is, the processing from Step 601 to 510 described below is executed by the power train control unit 100.

The power train control unit 100 judges in Step 601 whether the shift control is being progressed or not. If the shift control is being progressed, the processing proceeds to Step 602. If the shift control is not being progressed, the processing proceeds to step 610 to reset disengaging control phase timer Tm_op, torque assist control phase timer Tm_ta, rotation synchronizing control timer phase timer Tm_ns and engaging control phase timer Tm_cn.

If the shift control is being progressed, it is judged in Step 602 whether or not it is in a disengaging control phase. If it is in the disengaging control phase, the processing proceeds to Step 606 to count up the disengaging control phase timer Tm_op. If it is not in the disengaging control phase, the processing proceeds to Step 603.

If it is not in the disengaging control phase, it is judged in Step 602 whether or not it is in a torque assist control phase. If it is in the torque assist control phase, the processing proceeds to Step 607 to count up the torque assist control phase timer Tm_ta. If it is not in the torque assist control phase, the processing proceeds to Step 604.

If it is not in the torque assist control phase, it is judged in Step 604 whether or not it is in a rotation synchronizing control phase. If it is in the rotation synchronizing control phase, the processing proceeds to Step 608 to count up the rotation synchronizing control phase timer Tm_ns. If it is not in the rotation synchronizing control phase, the processing proceeds to Step 605.

If it is not in the rotation synchronizing control phase, it is judged in Step 605 whether or not it is in an engaging control phase. If it is in the engaging control phase, the processing proceeds to Step 609 to count up the engaging control phase timer Tm_cn. If it is not in the engaging control phase, the processing not executed.

The control contents of the disengaging control phase of Step 503 of the shift control by the present embodiment of the system of controlling the vehicle will be described below, referring to FIG. 7, FIG. 8 and FIG. 14.

Figure 7:
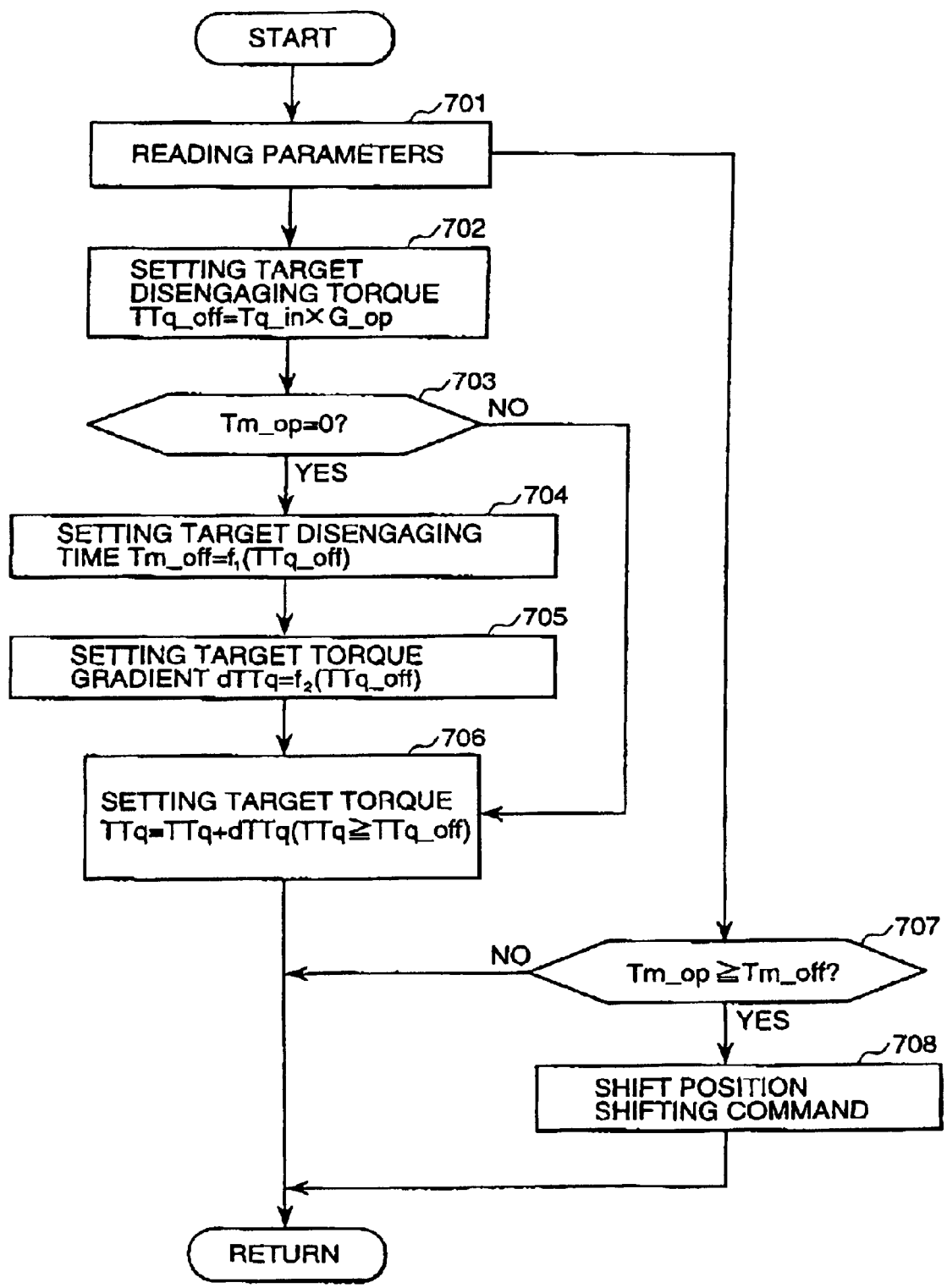
FIG. 7 is a flowchart showing the control contents of the disengaging control phase in the shift control by the system of controlling the vehicle according to the first embodiment of the present invention.
Figure 8A:
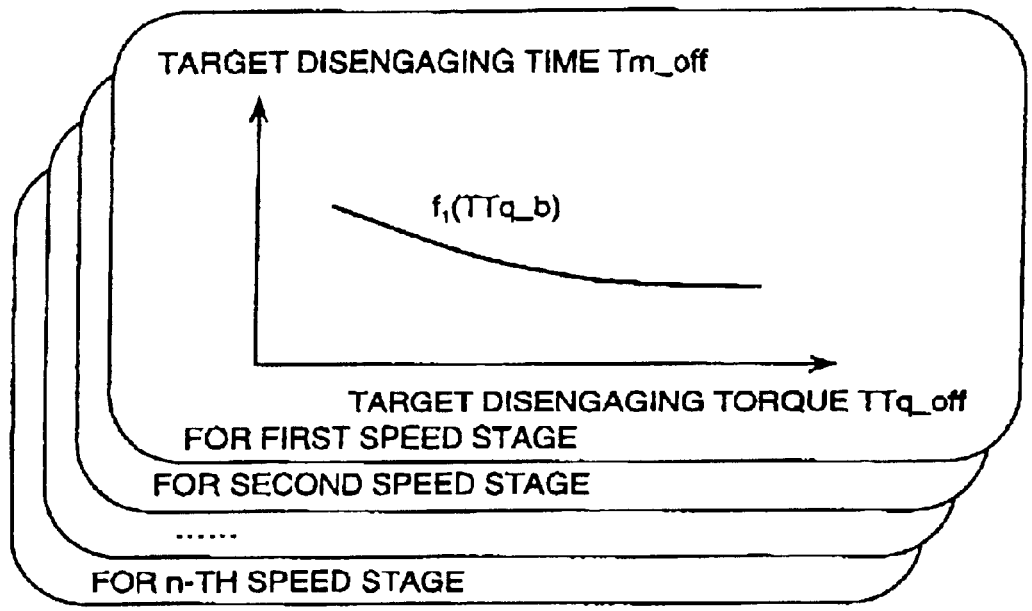
FIG. 8 is an illustration explaining methods of calculating the target disengaging time Tm_off and the target torque gradient dTTq in the disengaging control phase in the shift control by the system of controlling the vehicle according to the first embodiment of the present invention.
Figure 8B:
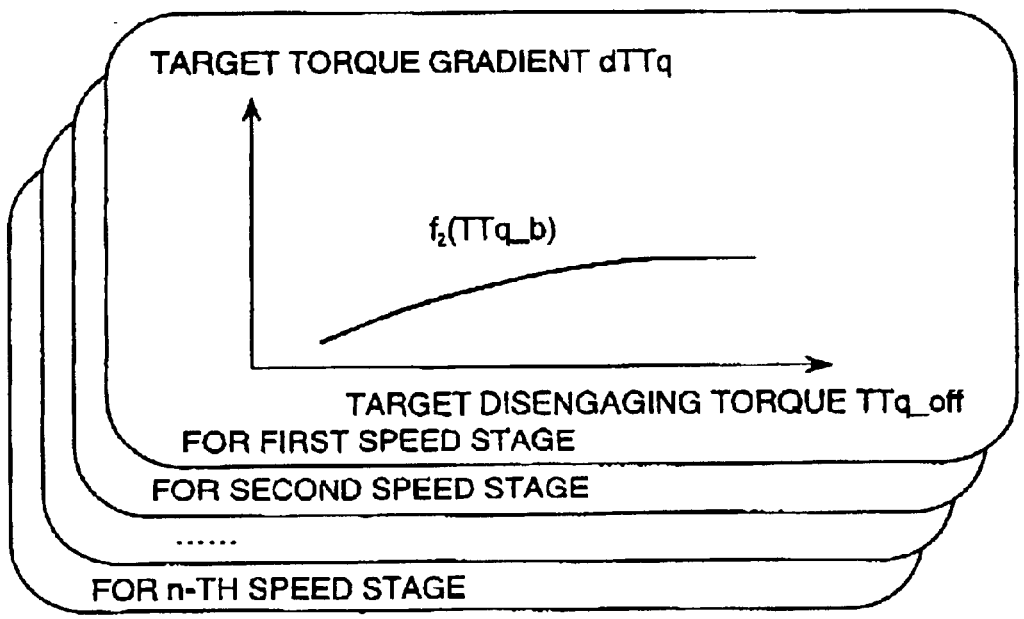

FIG. 7 is a flowchart showing the control contents of the disengaging control phase in the shift control by the system of controlling the vehicle according to the first embodiment of the present invention. FIG. 8 is an illustration explaining methods of calculating the target disengaging time Tm_off and the target torque gradient dTTq in the disengaging control phase in the shift control by the system of controlling the vehicle according to the first embodiment of the present invention. FIG. 14 is a time chart showing the control contents of the shift control by the system of controlling the vehicle according to the first embodiment of the present invention.

Figure 14:
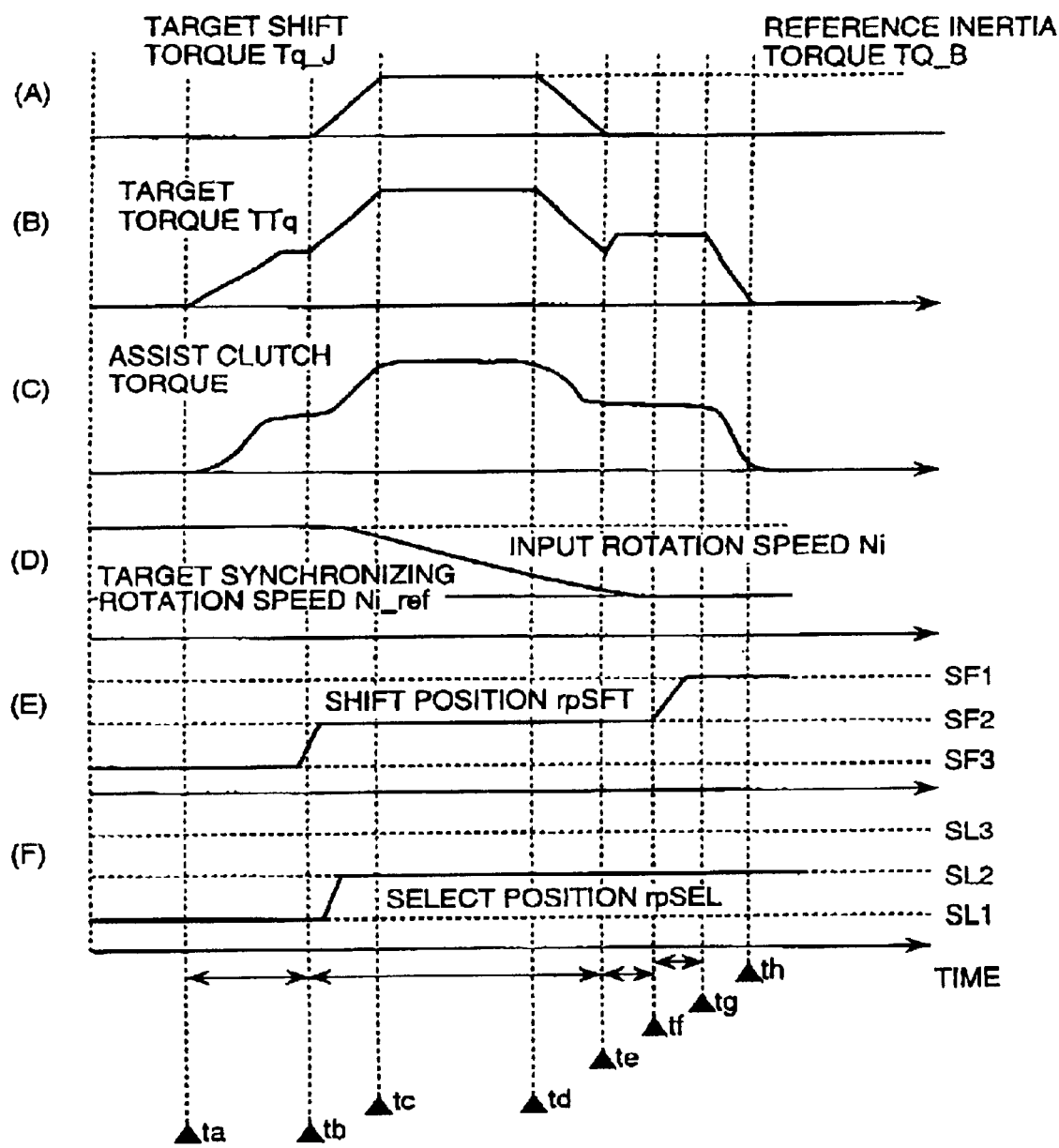
FIG. 14 is a time chart showing the control contents of the shift control by the system of controlling the vehicle according to the first embodiment of the present invention.

FIG. 14 shows a time chart of the control at up-shift from the second gear position to the third gear position. In FIG. 14, a period from the time point ta to the time point tb corresponds to the disengaging control phase, a period from the time point tb to the time point te corresponds to the torque assist control phase, a period from the time point te to the time point tf corresponds to the rotation synchronizing control phase, a period from the time point tt to the time point tg corresponds to the engaging control phase, and a period from the time point tg to the time point th corresponds to the shifting completion phase. FIG. 14(A) shows the target shift torque Tq_J. FIG. 14(B) shows the target torque TTq of the assist clutch of (B) FIG. 14(C) shows the transmitted torque of the assist clutch. FIG. 14(D) shows the input rotation speed Ni and the target synchronizing rotation speed Ni_ref. FIG. 14 (E) shows the shift position rpSFT. FIG. 14(F) shows the select position rpSEL.

The control contents of the disengaging control phase to be described below are programmed in the computer 100c of the power train control unit 100, and repetitively executed in a predetermined cycle. That is, the processing from Step 701 to 708 described below is executed by the power train control unit 100.

In Step 701 of FIG. 7, the power train control unit 100 reads parameters, and then in Step 702, sets a target disengaging torque TTq_off. The target disengaging torque TTq_off is calculated by multiplying an input torque Tq_in by a gain G_op. The input torque Tq_in is calculated by subtracting inertia variation caused by the change ΔNi per unit time in the input rotation speed from the engine torque Te as the base. It is preferable that the gain G_op is set every gear position to be disengaged.

Next, in Step 703, it is judged whether or not it is just after starting the disengaging control phase. If the disengaging control phase timer Tm_op=0, it is regarded as just after starting the disengaging control phase. Then, a target disengaging time Tm_off is set in Step 704, and a target torque gradient dTTq is set in Step 705, and the processing proceeds to Step 706. Each of the target disengaging time Tm_off and the target torque gradient dTTq is assumed to be a function of the target disengaging torque TTq_off. As shown in FIG. (A), the target disengaging time Tm_off is calculated by inputting the target disengaging torque TTq_off, and is separately set for each gear position to be disengaged. Further, as shown in FIG. (B), the target torque gradient dTTq is calculated by inputting the target disengaging torque TTq_off, and is separately set for each gear position to be disengaged.

On the other hand, in Step 703, if the disengaging control phase timer Tm_op 0, the processing proceeds to Step 706.

Next, in Step 706, the target torque TTq of the assist clutch is set. The target torque TTq is asymptotically brought up to the target disengaging torque TTq_off by adding the target torque gradient dTTq set in Step 705 to the preceding target torque TTq.

On the other hand, time judgment is performed in Step 707. If the disengaging control phase timer Tm_op≧the target disengaging time Tm_off, the shift position is shifted in Step 708. In a case of, for example, 2→3 shifting, the target shift position tpSET is moved from the position SF3 to the position SF2 in FIG. 3.

In the disengaging control phase, as the target torque TTq of the assist clutch shown in FIG. 14(B) rises, the actual assist clutch transmitting torque of FIG. 14(C) rises, and the shift position rpSFT of FIG. 14(E) is started to move from the position SF3 to The position SF2.

The control contents of the torque assist control phase of Step 505 of the shift control by the present embodiment of the system of controlling the vehicle will be described below, referring to FIG. 9 to FIG. 11 and FIG. 14.

Figure 10:
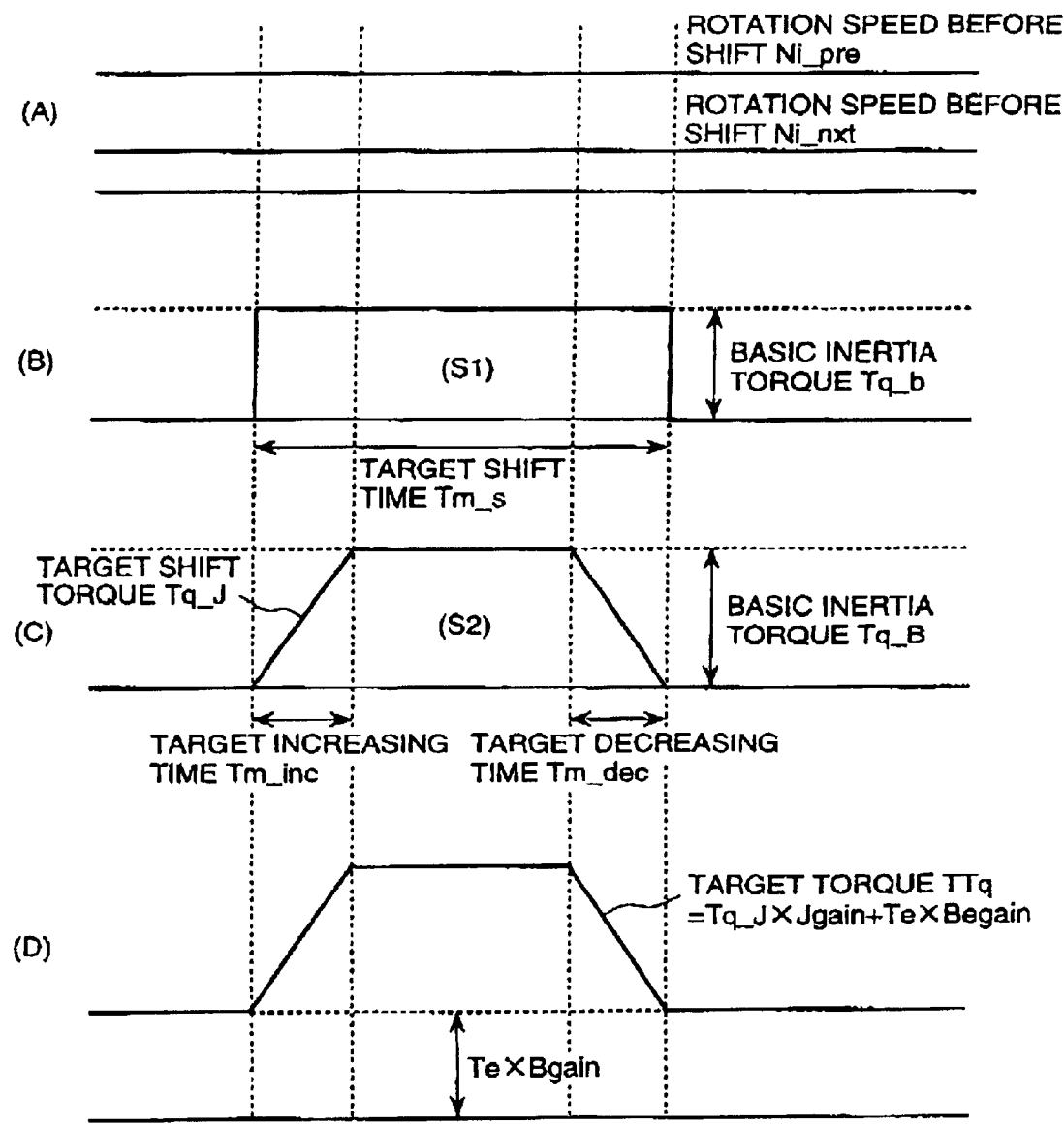
FIG. 10 is a time chart showing the control contents of the torque assist control phase in the shift control by the system of controlling the vehicle according to the first embodiment of the present invention.

FIG. 9 is a flowchart showing the control contents of the torque assist control phase in the shift control by the system of controlling the vehicle according to the first embodiment of the present invention. FIG. 10 is a time chart showing the control contents of the torque assist control phase in the shift control by the system of controlling the vehicle according to the first embodiment of the present invention. FIG. 11 is an illustration explaining methods of calculating the target shift time Tm_s, the target increasing time Tm_inc and the target decreasing time Tm_dec in the torque assist control phase in the shift control by the system of controlling the vehicle according to the first embodiment of the present invention.

FIG. 10 shows a case of up-shift (the input rotation speed before shifting Ni_pre>the input rotation speed after shifting Ni_nxt) FIG. 10(A) shows the input rotation speed before shifting Ni_pre and the input rotation speed after shifting Ni_nxt. FIG. 10(B) shows the basic inertia torque Tq_b. FIG. 10(C) shows target shift torque Tq_J. FIG. 10(D) shows the target torque of the assist clutch TTq.

The control contents of the torque assist control phase to be described below are programmed in the computer 100c of the power train control unit 100, and repetitively executed in a predetermined cycle. That is, the processing from Step 901 to 911 described below is executed by the power train control unit 100.

In Step 901 of FIG. 9, the power train control unit 100 reads parameters, and then in Step 902, judges by a value of the torque assist control phase timer Tm_ta whether or not it is just after starting of the torque assist control phase. If the torque assist control phase timer Tm_ta=0, it is judged that it is just after starting the torque assist control phase. Then, Step 903, Step 904, Step 905 and Step 906 are executed, and after that, the processing proceeds to Step 907. If the torque assist control phase timer Tm_ta≠0, the processing proceeds to Step 907.

Figure 11A:
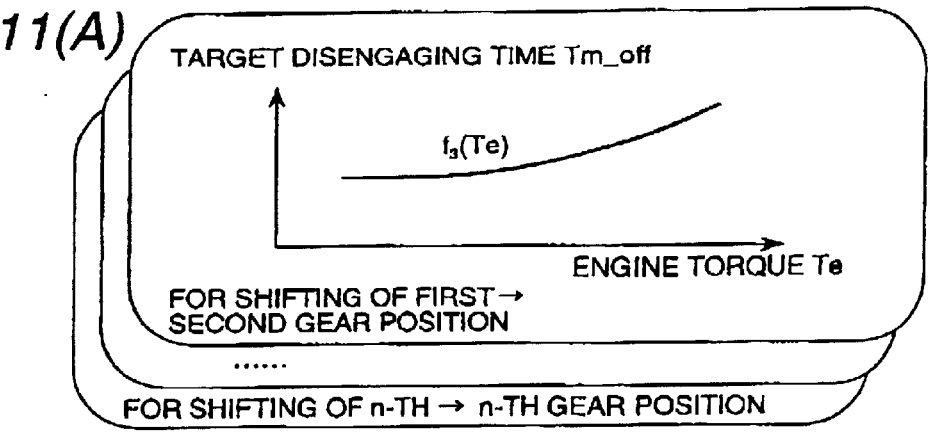
FIG. 11 is an illustration explaining methods of calculating the target shift time Tm_s, the target increasing time Tm_inc and the target decreasing time Tm_dec in the torque assist control phase in the shift control by the system of controlling the vehicle according to the first embodiment of the present invention.

In Step 903 (the target shift time setting process), the target shift time Tm_s is set. The target shift time Tm_s is assumed to be a function of the engine torque Te. As shown in FIG. 11(A), the target shift time Tm_s is calculated by inputting the engine torque Te, and is separately set for each shifting pattern.

Figure 11B:
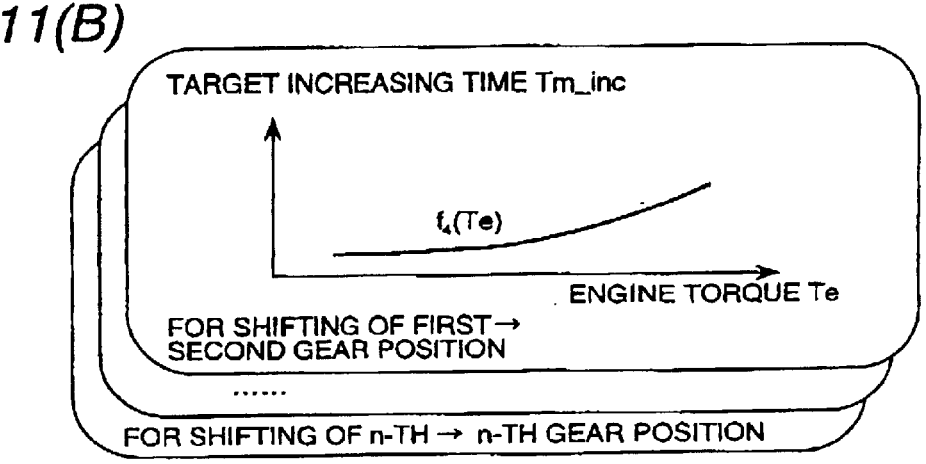
Figure 11C:
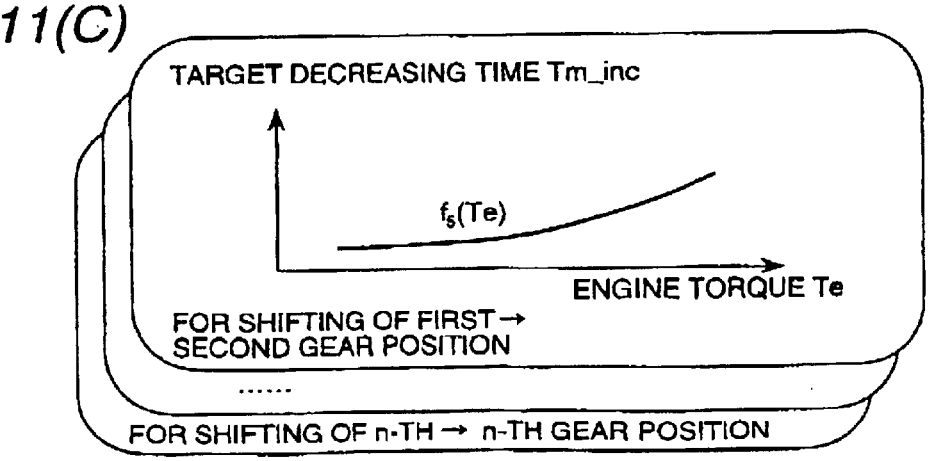

Next, in Step 904 (the target increasing time setting process, and the target decreasing time setting process), the target increasing time Tm_inc and the target decreasing time Tm_dec shown in FIG. 10(C) are set. As shown in FIG. 11(B) and FIG. 11(C), each of the target increasing time Tm_inc and the target decreasing time Tm_dec is assumed to be a function of the engine torque Te. As shown in FIG. 11(B) and FIG. 11 (C), the target shift time Tm_s is calculated by inputting the engine torque Te, and is separately set for each shifting pattern.

Next, in Step 905, the basic inertia torque Tq_b shown in FIG. 10(C) is calculated. The basic inertia torque Tq_b is a torque necessary for shifting from the rotation speed Ni_pre equivalent to an input power before shifting to the rotation speed Ni_nxt equivalent to an input power after shifting. Letting an inertia coefficient from the engine to the input shaft be J, and the unit conversion coefficient be α, the basic inertia torque Tq_b of the torque necessary for shifting becomes J×(Ni_pre−Ni_nxt)×α/Tm_s.

Next, in Step 906, a reference inertia torque Tq_B shown in FIG. 10(C) is calculated. The reference inertia torque Tq_B is a torque which has an area equal to an area of the basic inertia torque Tq_b×the target shift time Tm_s when the reference inertia torque Tq_B increases (decreases, in the case of downshift) in the target increasing time Tm_inc and decreases (increases, in the case of downshift) in the target decreasing time Tm_dec within the target shift time Tm_s, and calculated according to the equation shown in Step 906 of FIG. 9. The reference inertia torque Tm_B when the reference inertia torque. Tq_B is increased in the target increasing time Tm_inc and decreased in the target decreasing time Tm_dec within the target shift time Tm_s is calculated so that the area S1 of FIG. 10(B) may become equal to the area S2 of FIG. 10(C). At that time, a torque which increases from 0 to the reference inertia torque Tq_B in the target increasing time Tm_inc and decreases from the reference inertia torque Tq_B to 0 in the target decreasing time Tm_dec becomes the target shift torque Tq_J.

Step 907, Step 908, Step 909 and Step 910 are the target shift torque setting process. In Step 907, classification of cases is performed using the torque assist control phase timer Tm_ta to determine the method of calculating the target shift torque Tq_J. If the torque assist control phase timer Tm_ta<the target increasing time Tm_inc, the processing proceeds to Step 908. If the torque assist control phase timer Tm_ta<the target shift time Tm_s−the target decreasing time Tm_dec, the processing proceeds to Step 909. If the case is a case other than the above, the processing proceeds to Step 910.

When the torque assist control phase timer Tm_ta<the target increasing time Tm_inc, in Step 908 the target shift torque Tq_J is increased up to the reference inertia torque Tq_B in the target increasing time Tm_inc (decreased down when down-shifting). It is set that the target shift torque Tq_J=the reference inertia torque Tq_B×the torque assist control phase timer Tm_ta/the target increasing time Tm_inc.

When the torque assist control phase timer Tm_ta<the target shift time Tm_s−the target decreasing time Tm_dec, in Step 909 it is set that the target shift torque Tq_J=the reference inertia torque Tq_B.

In the cases other than the above, in step 910 the target shift torque Tq_J is decreased down to 0 in the target decreasing time Tm_dec (increased up when down-shifting). It is set that the target shift torque Tq_J=the reference inertia torque Tq_B×(the target shift time Tm_s−the torque assist control phase timer Tm_ta)/the target decreasing time Tm_dec.

Next, in Step 911, the target torque TTq of the assist clutch shown in FIG. 10(D) is calculated. It is set that the target torque TTq=the target shift torque Tq_J×the shift torque adjusting gain Jgain+the engine torque Te×the engine torque adjusting gain Bgain. It is preferable that each of the shift torque adjusting gain Jgain and the engine torque Te×the engine torque adjusting gain Bgain is set for each shifting pattern Further, it is preferable that each of the shift torque adjusting gain Jgain and the engine torque Te×the engine torque adjusting gain Bgain is a function of the input torque (or the engine torque) before shifting.

As shown in FIG. 14(E), when the shift position rpSFT is close to the position SF2 (the time tb), the control phase becomes the torque assist control phase. In the torque assist control phase, as the target shift torque Tq_J of FIG. 14(A) increases up to the reference inertia torque Tq_B and then decreases down to 0, the assist clutch target torque of FIG. 14(B) increases up and then decreases down. As the assist clutch target torque TTq of FIG. 14(B) increases up and then decreases down, the actual transmitting torque of the assist clutch of FIG. 14(C) is increased and decreased, and the input rotation speed Ni of FIG. 14(D) is decreased. Thereby, the input rotation speed Ni can be controlled while the target shift torque Tq_J is satisfied. Further, the select position rpSEL of FIG. 14(F) is shifted from the position SL1 to the position SL2.

Although in the description of FIG. 9, the target shift torque Tq_J is calculated using the target increasing time Tm_inc and the target decreasing time Tm_dec, the target shift torque Tq_J may be calculated by setting a target increasing torque and a target decreasing torque.

Further, the target shift torque Tq_J may be calculated by inputting a rotation speed difference before shifting (the input rotation speed before shitting Ni_pre−the input rotation speed after shifting Ni_nxt) instead of using the engine torque Te. Further, the target shift torque Tq_J may be calculated by inputting an accelerator opening degree instead of using the engine torque Te.

The control contents of the rotation synchronizing control phase of Step 509 of the shift control by the present embodiment of the system of controlling the vehicle will be described below, referring to FIG. 12 and FIG. 14.

Figure 12:
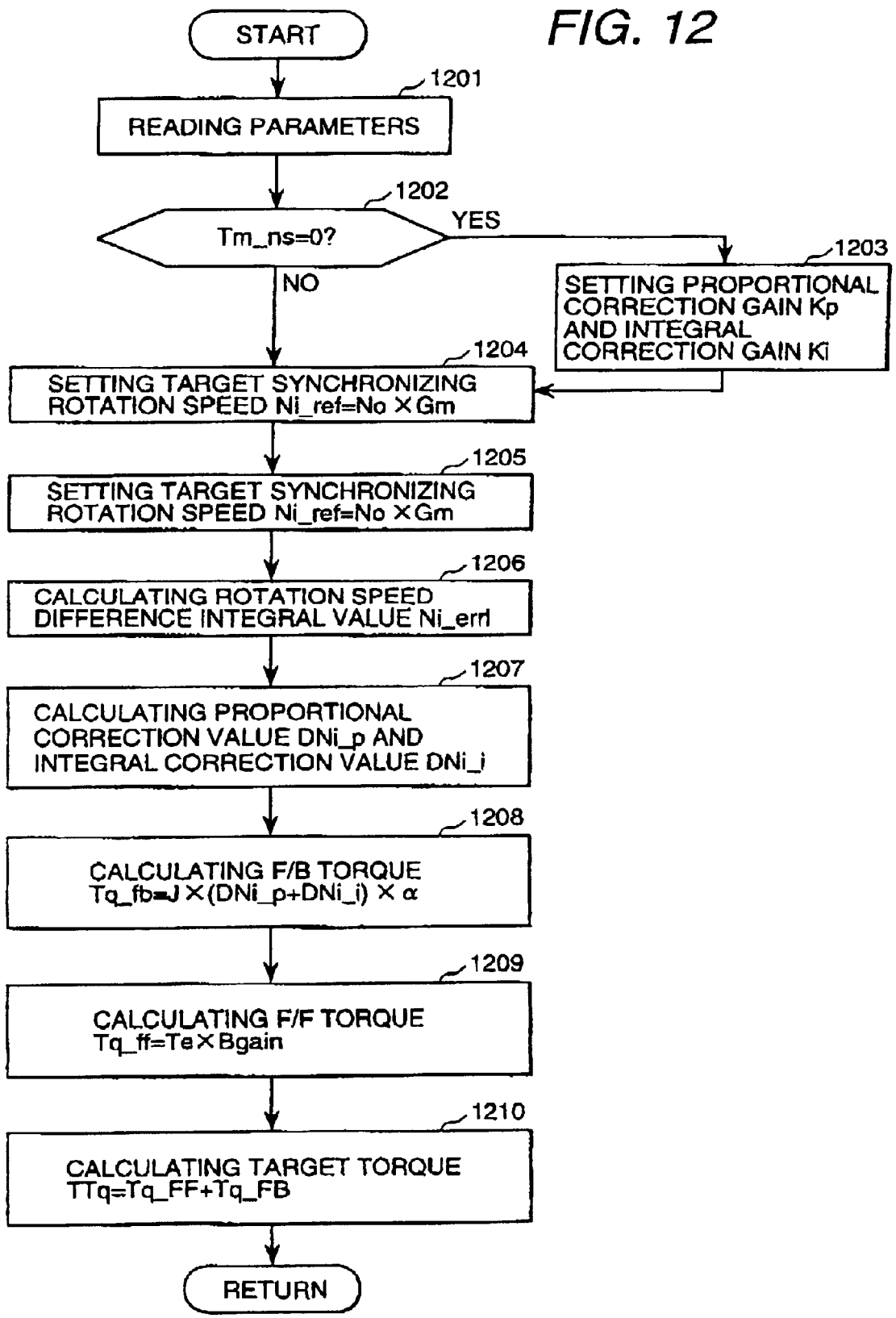
FIG. 12 is a time chart showing the control contents of the rotation synchronizing control phase in the shift control by the system of controlling the vehicle according to the first embodiment of the present invention.

FIG. 12 is a time chart showing the control contents of the rotation synchronizing control phase in the shift control by the system of controlling the vehicle according to the first embodiment of the present invention.

The control contents of the rotation synchronizing control phase to be described below are programmed in the computer 100c of the power train control unit 100, and repetitively executed in a predetermined cycle. That is, the processing from Step 1201 to 1210 described below is executed by the power train control unit 100.

In Step 1201, the power train control unit 100 reads parameters, and then in Step 1202, judges by a value of the rotation synchronizing control phase timer Tm_ns whether or not it is just after starting of the rotation synchronizing control phase. If the rotation synchronizing control phase timer Tm_ns=0, it is judged that it is just after starting the rotation synchronizing control phase. Then, Step 1203 is executed, and after that, the processing proceeds to Step 1204, If the rotation synchronizing control phase timer Tm_ns≠0, the processing proceeds to Step 1204.

When it is just after starting the rotation synchronizing control phase, in Step 1203, a proportional correction gain Kp and an integral correction gain Ki for rotation speed feedback are set. There, it is preferable that each of the proportional correction gain Kp and the integral correction gain Ki is separately set for each shifting pattern or for each target shifting stage.

Next, in Step 1204, the target synchronizing rotation speed (the target input rotation speed) Ni_ref is set. The target synchronizing rotation speed is to be a value around the input rotation speed calculated by multiplying the output rotation speed No by the gear ratio Gm after shifting.

Next, in Step 1205, a difference Ni_err between the target synchronizing rotation speed Ni_ref and the input rotation speed Ni is calculated, and then in Step 1206, an integrated value Ni_errI of the rotation speed difference Ni_err is calculated.

Next, in Step 1207, a proportional correction value DNi_p and an integral correction value DNi_i are calculated using the rotation speed difference Ni_err, the rotation speed difference integral value Ni_errI, the proportional correction gain Kp and the integral correction gain Ki.

Next, in Step 1208, a feedback torque Tq_FB is set. Letting the inertia coefficient from the engine to the input shaft be J, and the unit conversion coefficient be $\alpha$, the feedback torque Tq_FB is calculated by J×(DNi_p−DNi_i)×$\alpha$.

Next, in Step 1209, a feed-forward torque Tq_FF is set. It is set that the feed-forward torque Tq_FF=the engine torque Te×the engine torque adjusting gain Bgain. Similarly to FIG. 9 (the torque assist control phase), it is preferable that the engine torque adjusting gain Bgain is set for each shifting pattern. Further, it is preferable that the engine torque adjusting gain Bgain is a function of the engine torque.

Next, in Step 1210, the assist clutch target torque TTq is set. The target torque TTq is set as TTq=Tq_FB+Tq_FF using the feedback torque Tq_FB and the feed-forward torque Tq_FF.

In the rotation synchronizing control phase, the actual assist clutch transmitting torque of FIG. 14(C) is controlled by changing the target torque TTq of the assist clutch of FIG. 14(B) so that the input rotation speed Ni of FIG. 14(D) may follow the target synchronizing rotation speed Ni_ref.

The control contents of the engaging control phase of Step 511 of the shift control by the present embodiment of the system of controlling the vehicle will be described below, referring to FIG. 13 and FIG. 14.

Figure 13:
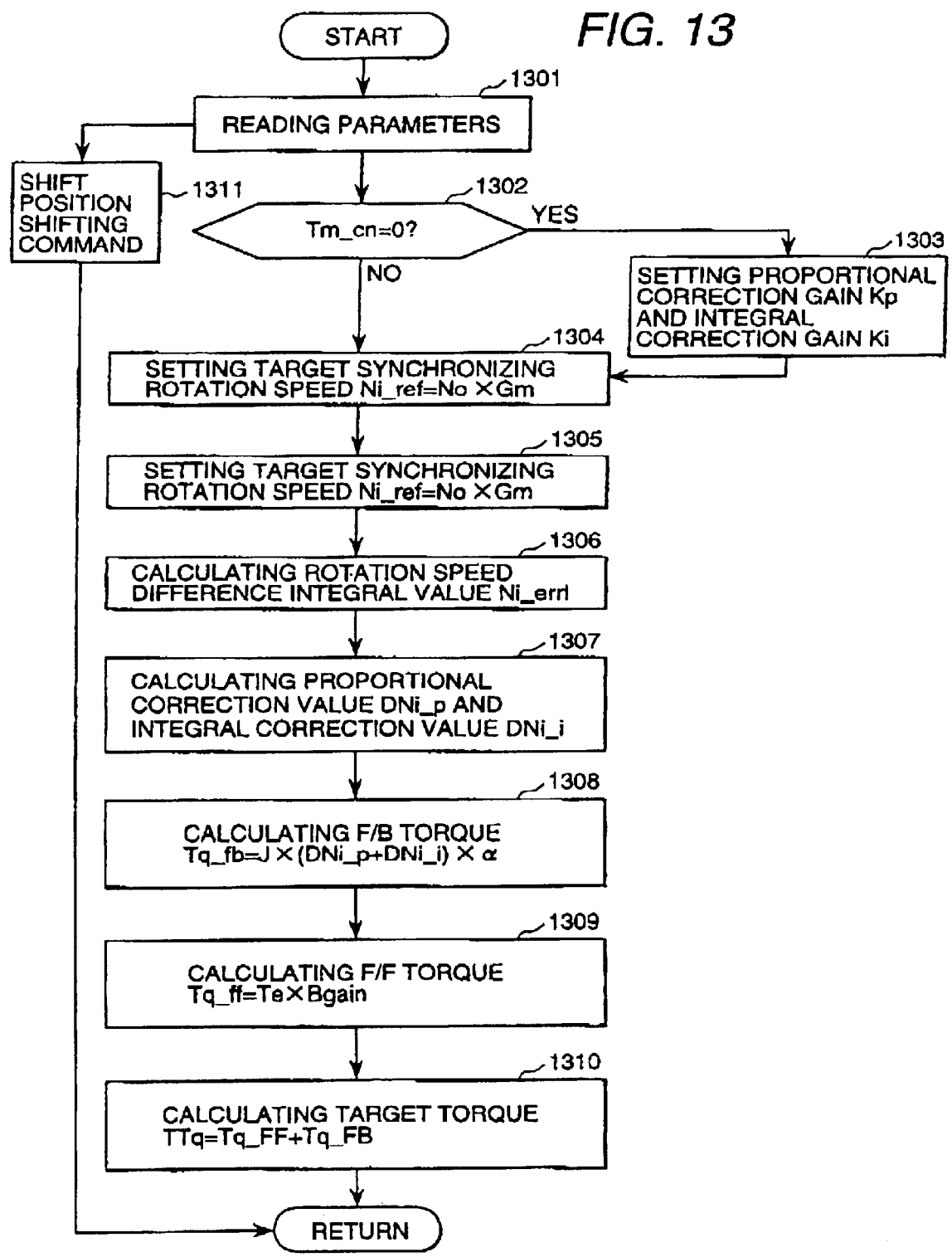
FIG. 13 is a time chart showing the control contents of the engaging control phase in the shift control by the system of controlling the vehicle according to the first embodiment of the present invention.

FIG. 13 is a time chart showing the control contents of the engaging control phase in the shift control by the system of controlling the vehicle according to the first embodiment of the present invention.

The control contents of the engaging control phase to be described below are programmed in the computer 100c of the power train control unit 100, and repetitively executed in a predetermined cycle. That is, the processing from Step 901 to 911 described below is executed by the power train control unit 100.

In Step 1301 of FIG. 13, the power train control unit 100 reads parameters, and then in Step 1302, judges by a value of the engaging control phase timer Tm_cn whether or not it is just after starting of the engaging control phase. If the engaging control phase timer Tm_cn=0, it is judged that it is just after starting the engaging control phase. Then, Step 1303 is executed, and after that, the processing proceeds to Step 1304. If the engaging control phase timer Tm_cn≠0, the processing proceeds to Step 1304.

In step 1303, a proportional correction gain Kp and an integral correction gain Ki for rotation speed feedback are set. There, similarly to FIG. 12 (the rotation synchronizing control phase), it is preferable that each of the proportional correction gain Kp and the integral correction gain Ki is separately set for each shifting pattern or for each target shifting stage.

Next, in Step 1304, the target synchronizing rotation speed Ni_ref for the rotation speed feedback is set. The target synchronizing rotation speed is to be a value around the input rotation speed calculated by multiplying the output rotation speed No by the gear ratio Gm after shifting.

Next, in Step 1305, a difference Ni_err between the target synchronizing rotation speed Ni_ref and the input rotation speed Ni is calculated, and then in Step 1306, an integrated value Ni_errI of the rotation speed difference Ni_err is calculated.

Next, in Step 1307, a proportional correction value DNi_p and an integral correction value DNi_i are calculated using the rotation speed difference Ni_err, the rotation speed difference integral value Ni_errI, the proportional correction gain Kp and the integral correction gain Ki.

Next, in Step 1308, a feedback torque Tq_FB is set. Letting the inertia coefficient from the engine to the input shaft be J, and the unit conversion coefficient be $\alpha$, the feedback torque Tq_FB is calculated by J×(DNi_p−DNi_i)×$\alpha$.

Next, in Step 1309, a feed-forward torque Tq_FF is set. It is set that the feed-forward torque Tq_FF=the engine torque Te×the engine torque adjusting gain Bgain. Similarly to FIG. 9 (the torque assist control phase) and to FIG. 12 (the rotation synchronizing control phase), it is preferable that the engine torque adjusting gain Bgain is set for each shifting pattern. Further, it is preferable that the engine torque adjusting gain Bgain is a function of the engine torque.

Next, in Step 1310, the assist clutch target torque TTq is set. The assist clutch target torque TTq is set as TTq=Tq_FB+Tq_FF using the feedback torque Tq_FB and the feed-forward torque Tq_FF.

On the other hand, the shift position is shifted in Step 1311. In a case of, for example, 2→3 shifting, the target shift position tpSET is moved from the position SF3 to the position SF2 in FIG. 3.

In the engaging control phase, the actual assist clutch transmitting torque of FIG. 14(C) is controlled by changing the target torque TTq of the assist clutch of FIG. 14(B) so that the input rotation speed Ni of FIG. 14(D) may further follow the target synchronizing rotation speed Ni_ref, and the shift position rpSFT of FIG. 14(E) is shifted from the position SF2 to the position SF1. The control phase becomes the shifting completion phase at the time tg when shifting of the shift position rpSFT to the position SF1 is completed, and the target torque TTq of the assist clutch of FIG. 14(B) becomes 0 to complete the shift control.

As described above, since the assist clutch is controlled by setting the target shift torque during shifting in the present embodiment, the torque waveform during shifting strongly affecting feeling of the shifting can be directly controlled, and accordingly the feeling of the shifting can be improved.

The construction and the operation of a second embodiment of a system of controlling a vehicle in accordance with the present invention will be described below, referring to FIG. 15 to FIG. 18.

There, the construction of a system of controlling a vehicle in accordance with second embodiment is the same as that shown in FIG. 1 or FIG. 2. The engaging relationship between the clutch and the driven gear in the present embodiment is the same as that shown in FIG. 3. The input-output signal relationship by the communication means 103 among the power train control unit 100, the engine control unit 101 and the hydraulic pressure control unit 102 in the system of controlling the vehicle in accordance with the present embodiment is the same as that shown in FIG. 4. The overall control contents of the system of controlling the vehicle in accordance with the present embodiment are the same as those shown in FIG. 5. The contents of the timers showing the elapsing time of the shift control by the system of controlling the vehicle in accordance with the present embodiment are the same as those shown in FIG. 6. The control contents of the disengaging control phase of Step 503 of the shift control by the system of controlling the vehicle in accordance with the present embodiment are the same as those shown in FIG. 7, FIG. 8 and FIG. 14 the control contents of the torque assist control phase of Step 505 of the shift control by the system of controlling the vehicle in accordance with the present embodiment are different from those shown in FIG. 9 to FIG. 11 and FIG. 14, and are to be described, referring to FIG. 15 and the follow. The control contents of the rotation synchronizing control phase of Step 509 of the shift control by the system of controlling the vehicle in accordance with the present embodiment are the same as those shown in FIG. 12 and FIG. 14. The control contents of the engaging control phase of Step 511 of the shift control by the system of controlling the vehicle in accordance with the present embodiment are the same as those shown in FIG. 13 and FIG. 14.

The control contents of the torque assist control phase of Step 505 of the shift control by the system of controlling the vehicle in accordance with the present embodiment will be described, referring to FIG. 15 to FIG. 18.

Figure 15:
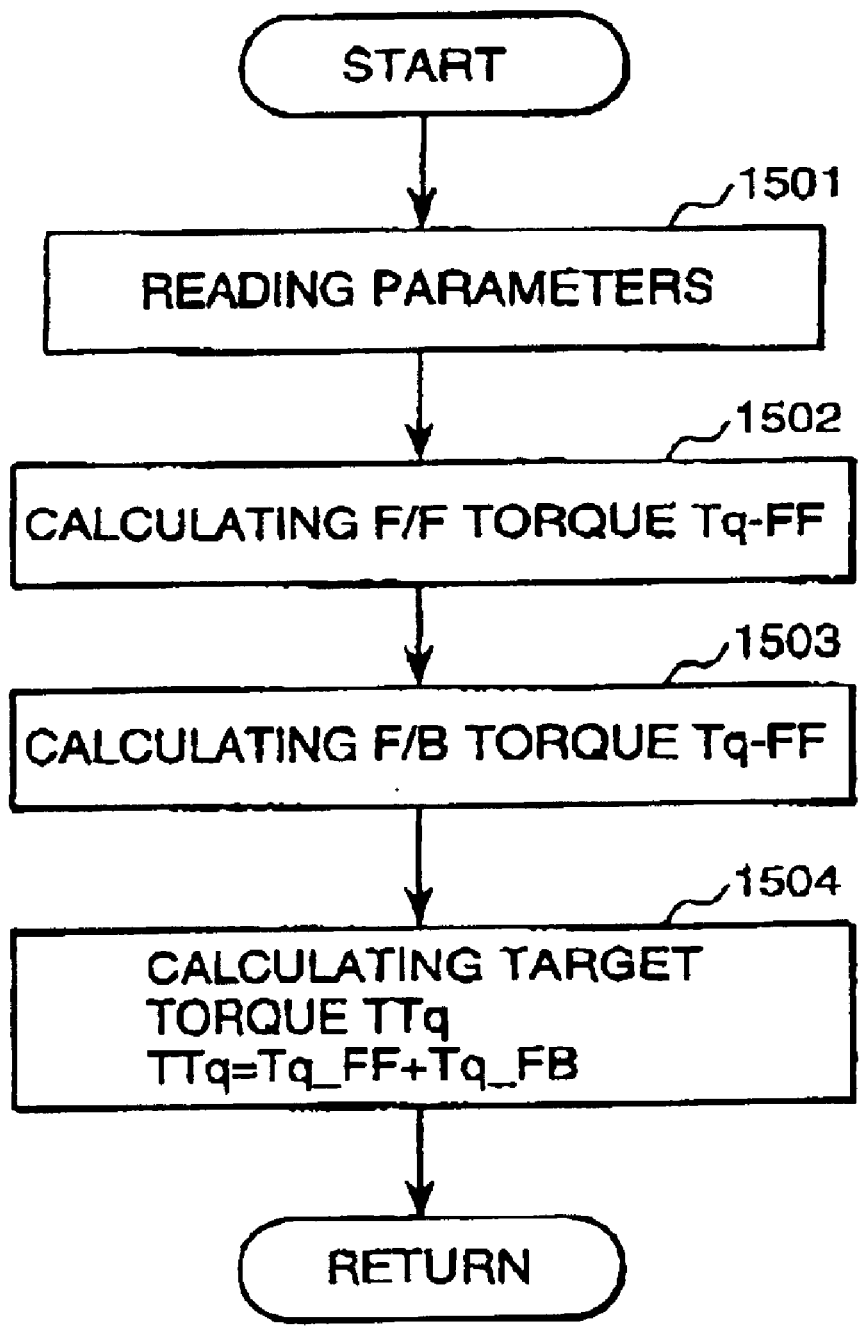
FIG. 15 is a flowchart showing the control contents of the torque assist control phase in the shift control by a system of controlling a vehicle according to a second embodiment of the present invention.
Figure 16:
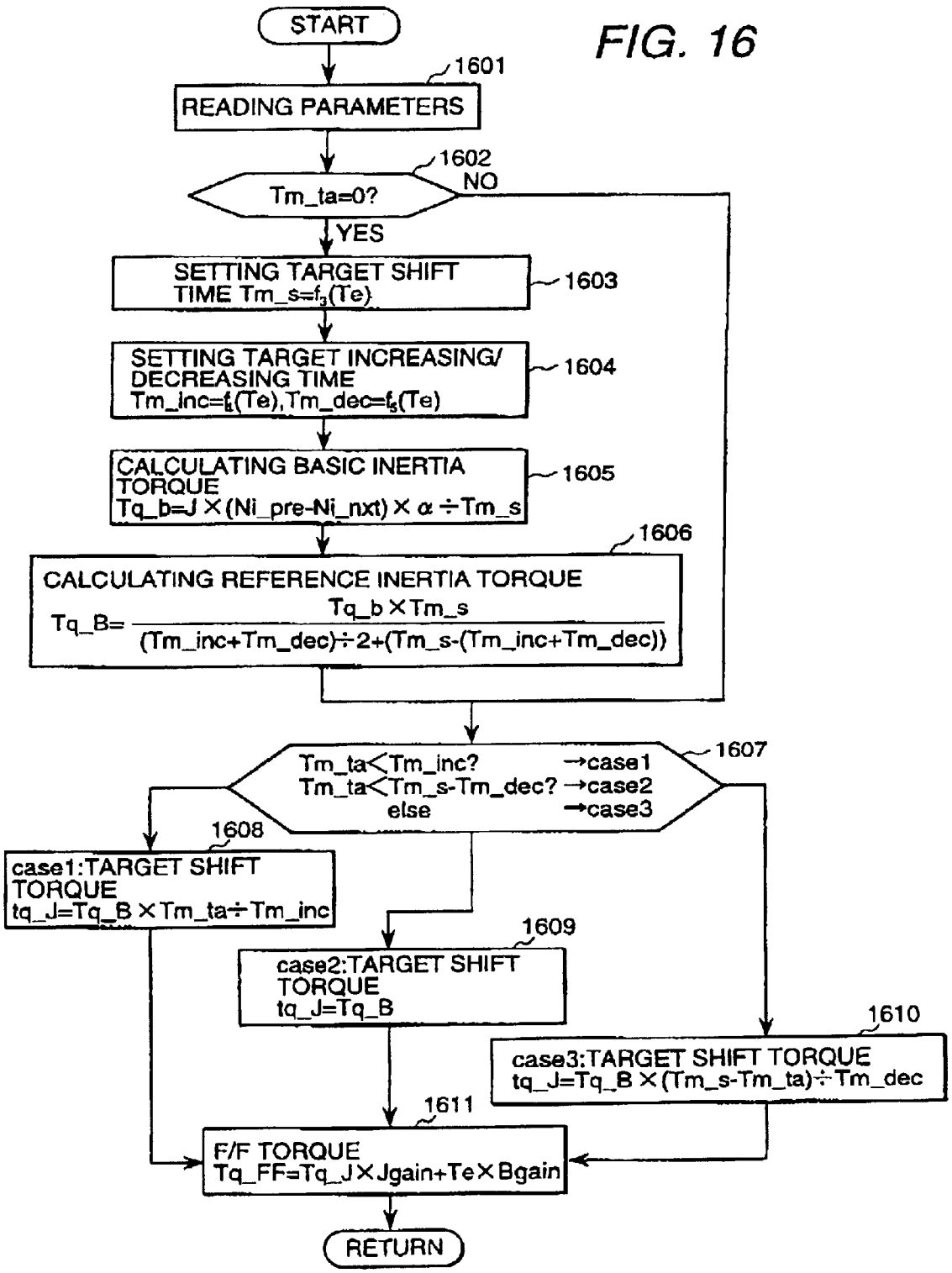
FIG. 16 is a flowchart showing the contents of calculating the feed-forward torque in the control contents of the torque assist control phase in the shift control by the system of controlling the vehicle according to the second embodiment of the present invention.
Figure 17:
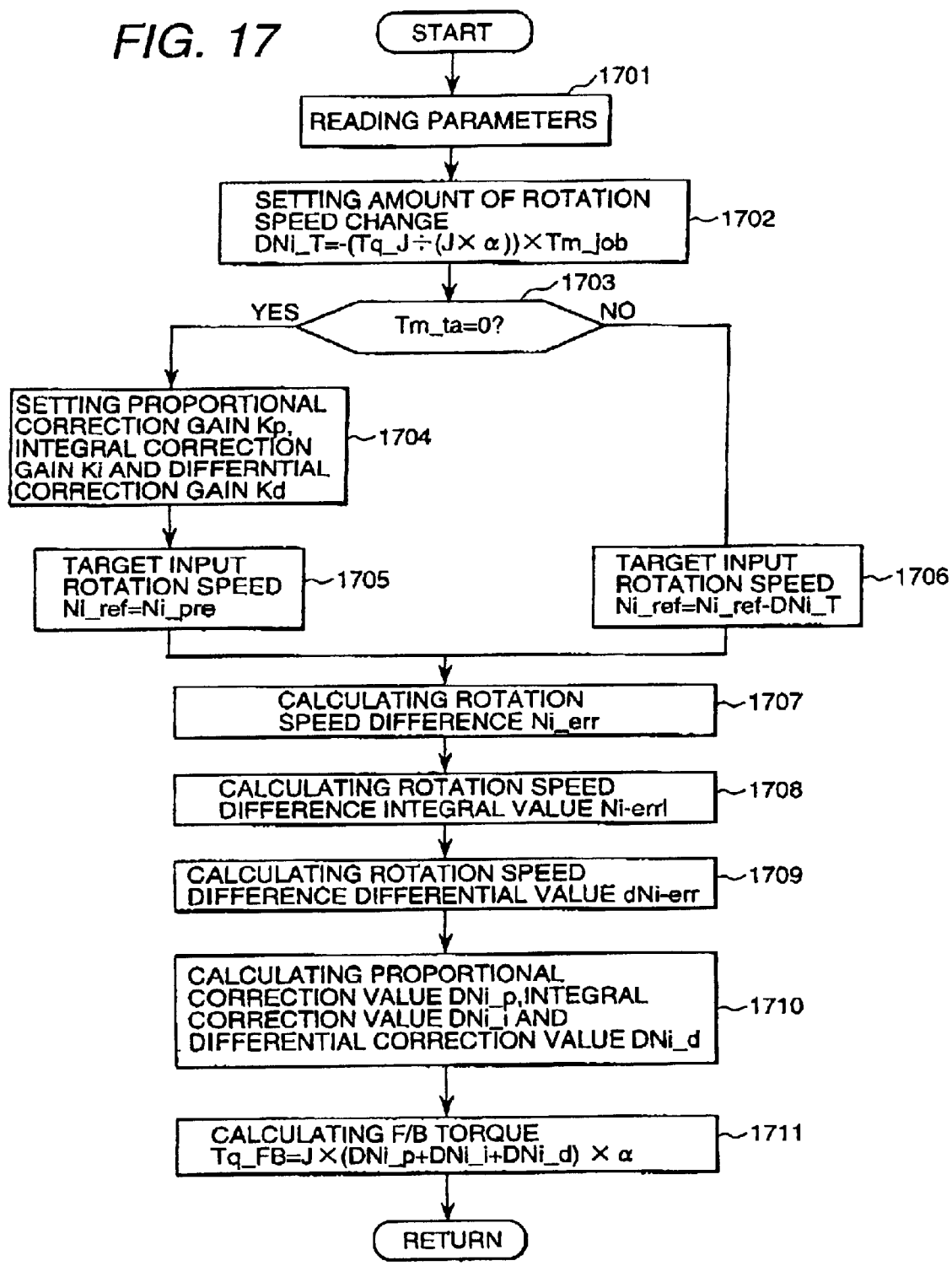
FIG. 17 is a flowchart showing the contents of calculating the feedback torque in the control contents of the torque assist control phase in the shift control by the system of controlling the vehicle according to the second embodiment of the present invention.
Figure 18:
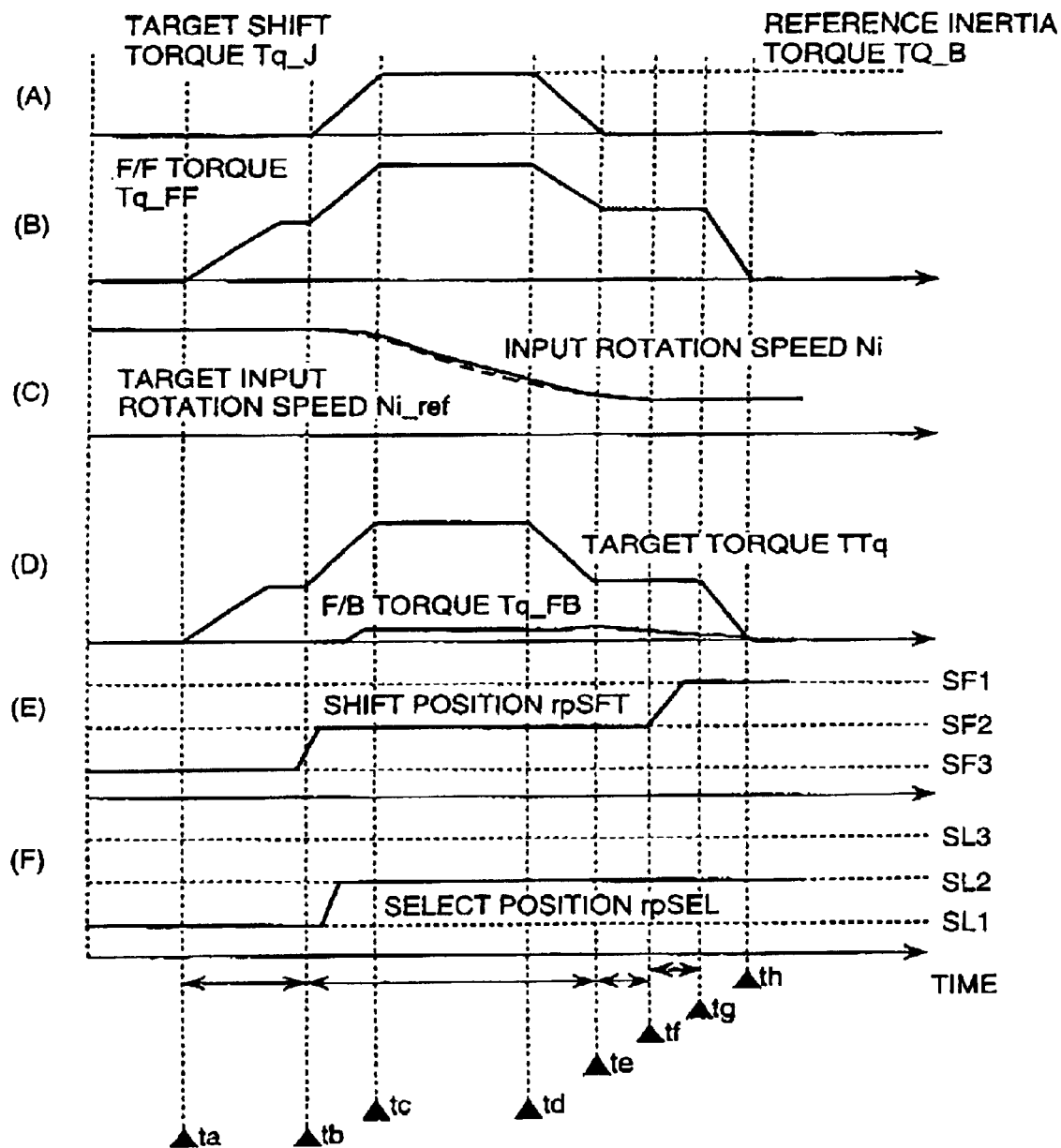
FIG. 18 is a time chart showing the control contents of the shift control by the system of controlling the vehicle according to the second embodiment of the present invention.

FIG. 15 is a flowchart showing the control contents of the torque assist control phase in the shift control by a system of controlling a according to the second embodiment of the present invention. FIG. 16 is a flowchart showing the contents of calculating the feed-forward torque in the control contents of the torque assist control phase in the shift control by the system of controlling the vehicle according to the second embodiment of the present invention. FIG. 17 is a flowchart showing the contents of calculating the feedback torque in the control contents of the torque assist control phase in the shift control by the system of controlling the vehicle according to the second embodiment of the present invention. FIG. 18 is a time chart showing the control contents of the shift control by the system of controlling the vehicle according to the second embodiment of the present invention.

FIG. 18 shows a time chart of the control at up-shift from the second gear position to the third gear position. In FIG. 18, a period from the time point ta to the time point tb corresponds to the disengaging control phase, a period from the time point tb to the time point te corresponds to the torque assist control phase, a period from the time point te to the time point tf corresponds to the rotation synchronizing control phase, a period from the time point tf to the time point tg corresponds to the engaging control phase, and a period from the time point tg to the time point th corresponds to the shifting completion phase.

The control contents of the engaging control phase to be described below are programmed in the computer 100c of the power train control unit 100, and repetitively executed in a predetermined cycle. That is, the processing from Step 1501 to 1504 described below is executed by the power train control unit 100.

As shown in FIG. 18, in the disengaging control phase, as the target torque TTq of the assist clutch of FIG. 18(D) rises, the shift position rpSFT of FIG. 18(E) is started to move from the position SF3 to The position SP2. When the shift position rpSFT approaches near the position SP2 (time tb), the control phase becomes the torque assist control phase.

The control contents of the torque assist control phase will be described below, referring to FIG. 15.

In Step 1501 of FIG. 15, the power train control unit 100 reads parameters.

Next, in Step 1502, a feed-forward torque Tq_FF is calculated. The detail of Step 1502 is to be described later, referring to FIG. 16.

Next, in Step 1503, a feedback torque Tq_FB is calculated. The detail of Step 1503 is to be described later, referring to FIG. 17.

Next, in Step 1504, a target torque TTq of the assist clutch is calculated from the feed-forward torque Tq_FF and the feedback torque Tq_FB.

The control contents of the feed-forward torque calculation means 1502 of FIG. 15 (the torque assist control phase) will be described below, referring to FIG. 16. The basic control contents is similar to those shown in FIG. 9.

In Step 1601, the power train control unit 100 reads parameters, and then in Step 1602, judges by a value of the torque assist control phase timer Tm_ta whether or not it is just after starting of the torque assist control phase. If the torque assist control phase timer Tm_ta=0, it is judged that it is just after starting the torque assist control phase. Then, Step 1603, Step 1604, Step 1605 and Step 1606 are executed, and after that, the processing proceeds to Step 1607. If the torque assist control phase timer Tm_ta≠0, the processing proceeds to Step 1607.

When it is just after starting of the torque assist control phase, the target shift time Tm_s is set in Step 1603 (the target shift time setting process). The target shift time Tm_s is assumed to be a function of the engine torque Te.

Next, in Step 1604 (the target increasing time setting process, and the target decreasing time setting process), the target increasing time Tm_inc and the target decreasing time Tm_dec are set. Similarly to the example of FIG. 9, each of the target increasing time Tm_inc and the target decreasing time Tm_dec is assumed to be a function of the engine torque Te.

Next, in Step 1605, a torque (the basic inertia torque Tq_b) necessary for shifting from the rotation speed Ni_pre equivalent to an input power before shifting to the rotation speed Ni_nxt equivalent to an input power after shifting is calculated. Letting an inertia coefficient from the engine to the input shaft be J, and the unit conversion coefficient be α, the basic inertia torque Tq_b of the torque necessary for shifting becomes J×(Ni_pre−Ni_nxt)×α/Tm_s. That is, the basic inertia torque Tq_b>0 in the case of up-shift, and the basic inertia torque Tq_b<0 in the case of down-shift. There, the input rotation speed before shifting $Ni_{13}$ pre is calculated by the output rotation speed No×the gear ratio before shifting, and the input rotation speed after shifting Ni_nxt is calculated by the output rotation speed No×the gear ratio after shifting.

Next, in Step 1606, a reference inertia torque Tq_B shown is calculated. The reference inertia torque Tq_B is a torque which has an area equal to an area of the basic inertia torque Tq_b×the target shift time Tm_s when the reference inertia torque Tq_B increases (decreases, in the case of downshift) in the target increasing time Tm_inc and decreases (increases, in the case of downshift) in the target decreasing time Tm_dec within the target shift time Tm_s.

Step 1607, Step 1608, Step 1609 and Step 1610 are the target shift torque setting process. In Step 1607, classification of cases is performed using the torque assist control phase timer Tm_ta to determine the method of calculating the target shift torque Tq_J. If the torque assist control phase timer Tm_ta<the target increasing time Tm_inc, the processing proceeds to Step 1608. If the torque assist control phase timer Tm_ta<the target shift time Tm_s−the target decreasing time Tm_dec, the processing proceeds to Step 1609. If the case is a case other than the above, the processing proceeds to Step 1610.

When the torque assist control phase timer Tm_ta<the target increasing time Tm_inc, in Step 1608 the target shift torque Tq_J is increased up to the reference inertia torque Tq_B in the target increasing time Tm_inc (decreased down when down-shifting). It is set that the target shift torque Tq_J=the reference inertia torque Tq_B×the torque assist control phase timer Tm_ta/the target increasing time Tm_inc.

When the torque assist control phase timer Tm_ta<the target shift time Tm_s−the target decreasing time Tm_dec, in Step 1609 it is set that the target shift torque Tq_J=the reference inertia torque Tq_B.

In the cases other than the above, in Step 1610 the target shift torque Tq_J is decreased down to 0 in the target decreasing time Tm_dec (increased up when down-shifting). It is set that the target shift torque Tq_J=the reference inertia torque Tq_B×(the target shift time Tm_s−the torque assist control phase timer Tm_ta)/the target decreasing time Tm_dec.

Next, in Step 1611, the target torque TTq of the assist clutch is calculated. It is set that the target torque TTq=the target shift torque Tq_J×the shift torque adjusting gain Jgain+the engine torque Te×the engine torque adjusting gain Bgain. Similarly to FIG. 9, it is preferable that each of the shift torque adjusting gain Jgain and the engine torque Te×the engine torque adjusting gain Bgain is set for each shifting pattern. Further, it is preferable that each of the shift torque adjusting gain Jgain and the engine torque Te×the engine torque adjusting gain Bgain is a function of the input torque (or the engine torque) before shifting.

As shown in FIG. 18, in the torque assist control phase, as the target shift torque Tq_J of FIG. 18(A) increases up to the reference inertia torque Tq_B and then decreases down to 0, the feed-forward torque Tq_FF of FIG. 18(B) increases up and then decreases down. As the feed-forward torque Tq_FF of FIG. 18(B) increases up and then decreases down, the input rotation speed Ni of FIG. 18(C) is decreased.

The control contents of the feedback torque calculation means 1503 of FIG. 15 (the torque assist control phase) will be described below, referring to FIG. 17.

Initially, parameters are read in Step 1701, and an amount of rotation speed change DNi_T for realizing the target shift torque Tq_J obtained in FIG. 16 is calculated in Step 1702. Letting the inertia coefficient from the engine to the input shaft be J, the unit conversion coefficient be α, and the control cycle time be Tm_job, the rotation speed change amount DNi_T is calculated as DNi_T=−(Tq_J/(J×α))×Tm_job.

Next, in Step 1703, it is judged whether or not it is just after starting of the torque assist control phase. If the torque assist control phase timer Tm_ta=0, Step 1704 and Step 1705 is executed, and after that, the processing proceeds to Step 1707. If the torque assist control phase timer Tm_at 0, Step 1706 is executed and then the processing proceeds to Step 1707. There, Step 1705 and Step 1706 are the target input rotation speed setting process.

If it is just after starting of the torque assist control phase, in Step 1704, a proportional correction gain Kp, an integral correction gain Ki and a differential correction gain Kd for rotation speed feedback are set. There, it is preferable that each of the proportional correction gain Kp, the integral correction gain Ki and the differential correction gain Kd is separately set for each shifting pattern or for each target shifting stage.

Next, in Step 1705, an initial value of the target input rotation speed Ni_ref for the rotation speed feedback is set. The target input rotation speed just after starting of the torque assist control phase is set to the input rotation speed before shifting Ni_pre.

On the other hand, when it is not just after starting of the torque assist control phase, in Step 1706, a target input rotation speed Ni_ref for the rotation speed feedback is set The target input rotation speed Ni_ref is changed step-by-step by the amount of rotation speed change DNi_T calculated in Step 1702.

Next, in Step 1707, a difference Ni_err between the target input rotation speed Ni_ref and the input rotation speed Ni is calculated, and then in Step 1708 an integrated value Ni_errI of the rotation speed difference Ni_err is calculated, and then in Step 1709 a differential value dNi_err of the rotation speed difference Ni_err is calculated.

Next, in Step 1710, a proportional correction value DNi_p, an integral correction value DNi_i and a differential correction value DNi_d are calculated using the rotation speed difference Ni_err, the rotation speed difference integral value Ni_errI, the rotation speed difference differential value dNi_err, the proportional correction gain Kp, the integral correction gain Ki and the differential correction gain Kd.

Next, in Step 1711, a feedback torque Tq_FB is set. Letting the inertia coefficient from the engine to the input shaft be J, and the unit conversion coefficient be α, the feedback torque Tq_FB is calculated by J×(DNi_p−DNi_i+DNi_d)×α. There, the target input rotation speed Ni_ref in the disengaging control phase is set to the input rotation speed before shifting Ni_pre.

That is, in the feedback torque control, the target input rotation speed Ni_ref of FIG. 18(C) of a rotation speed for realizing the target shift torque Tq_J of FIG. 18(A) is changed to change the feedback torque of FIG. 18(D) so that the difference between the target input rotation speed Ni_ref and the input rotation speed Ni is eliminated, and the target torque of the FIG. 18(D) is set from the feed-forward torque Tq_FF and the feedback torque Tq_FB.

As described above, by setting the target torque of the FIG. 18(D) from the feed-forward torque Tq_FF and the feedback torque Tq_FB, the input rotation speed Ni can be controlled so as to follow the target input rotation speed Ni_ref while realizing the target shift torque Tq_J. Further, the select position rpSEL of FIG. 18(F) is shifted from the position SL1 to the position SL2.

Further, in the rotation synchronizing control phase, the target torque TTq of the assist clutch of FIG. 18(D) is controlled so that the input rotation speed Ni of FIG. 18(C) follows the target input rotation speed Ni_ref. In the engaging control phase, the target torque TTq of the assist clutch of FIG. 18(D) is controlled so that the input rotation speed Ni of FIG. 18(C) follows the target input rotation speed Ni_ref, and the shift position rpSFT of FIG. 18(E) is shifted from the position SL1 to the position SL2. The control phase enters into the shifting completion phase at the time tg when shifting of the shift position rpSFT of FIG. 18(E) to the position SL2 is completed, and the target torque TTq of the assist clutch of FIG. 18(D) becomes 0. Thus, the shift control is completed.

As described above, in the present embodiment since the assist clutch is controlled by setting the target shift torque during shifting, and setting the feed-forward command value from the target shift torque and the input torque, and setting the target input rotation speed from the target shift torque, and setting the feedback command value of the assist clutch so as to realize the target input rotation speed. Therefore, the torque waveform during shifting strongly affecting feeling of the shifting can be directly controlled, and accordingly the feeling of the shifting can be improved.

The construction and the operation of a third embodiment of a system of controlling a vehicle in accordance with the present invention will be described below, referring to FIG. 19 to FIG. 22.

There, the construction of a system of controlling a vehicle in accordance with second embodiment is the same as that shown in FIG. 1 or FIG. 2. The engaging relationship between the clutch and the driven gear in the present embodiment is the same as that shown in FIG. 3. The input-output signal relationship by the communication means 103 among the power train control unit 100, the engine control unit 101 and the hydraulic pressure control unit 102 in the system of controlling the vehicle in accordance with the present embodiment is the same as that shown in FIG. 4. The overall control contents of the system of controlling the vehicle in accordance with the present embodiment are the same as those shown in FIG. 5. The contents of the timers showing the elapsing time of the shift control by the system of controlling the vehicle in accordance with the present embodiment are the same as those shown in FIG. 6. The control contents of the disengaging control phase of Step 503 of the shift control by the system of controlling the vehicle in accordance with the present embodiment are the same as those shown in FIG. 7, FIG. 8 and FIG. 14. The control contents of the torque assist control phase of Step 505 of the shift control by the system of controlling the vehicle in accordance with the present embodiment are similar to those shown in FIG. 15 to FIG. 18, but are different in the method of the feed-forward torque control from that shown in FIG. 16, and are to be described, referring to FIG. 19 and the follow. The control contents of the rotation synchronizing control phase of Step 509 of the shift control by the system of controlling the vehicle in accordance with the present embodiment are the same as those shown in FIG. 12 and FIG. 14. The control contents of the engaging control phase of Step 511 of the shift control by the system of controlling the vehicle in accordance with the present embodiment are the same as those shown in FIG. 13 and FIG. 14.

The contents of the feed-forward torque control in the torque assist control phase of the shift control by the system of controlling the vehicle in accordance with the present embodiment will be described, referring to FIG. 19 to FIG. 22.

Figure 19:
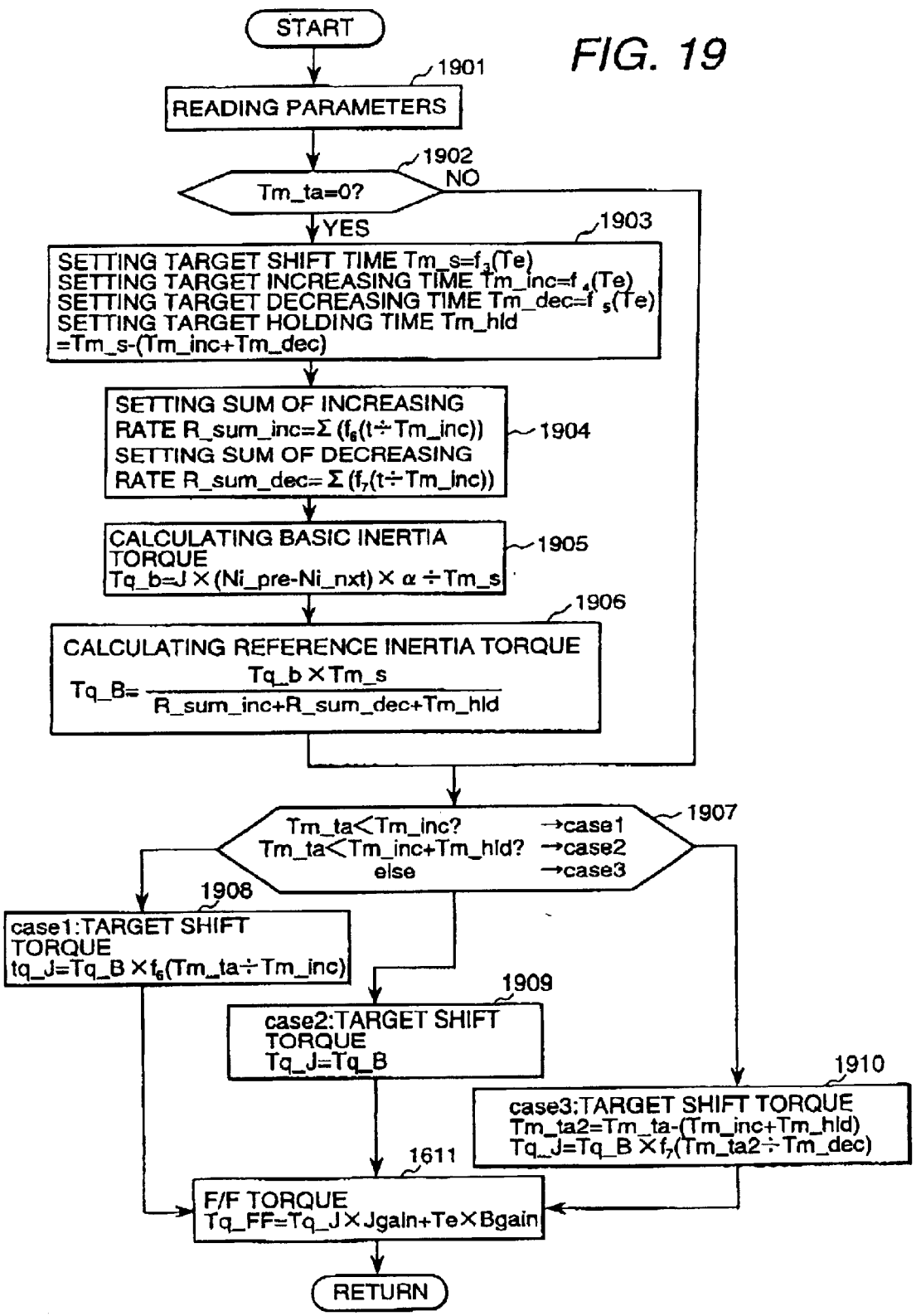
FIG. 19 is a flowchart showing the contents of the feed-forward control in the torque assist control phase in the shift control by a system of controlling a vehicle according to a third embodiment of the present invention.
Figure 20:
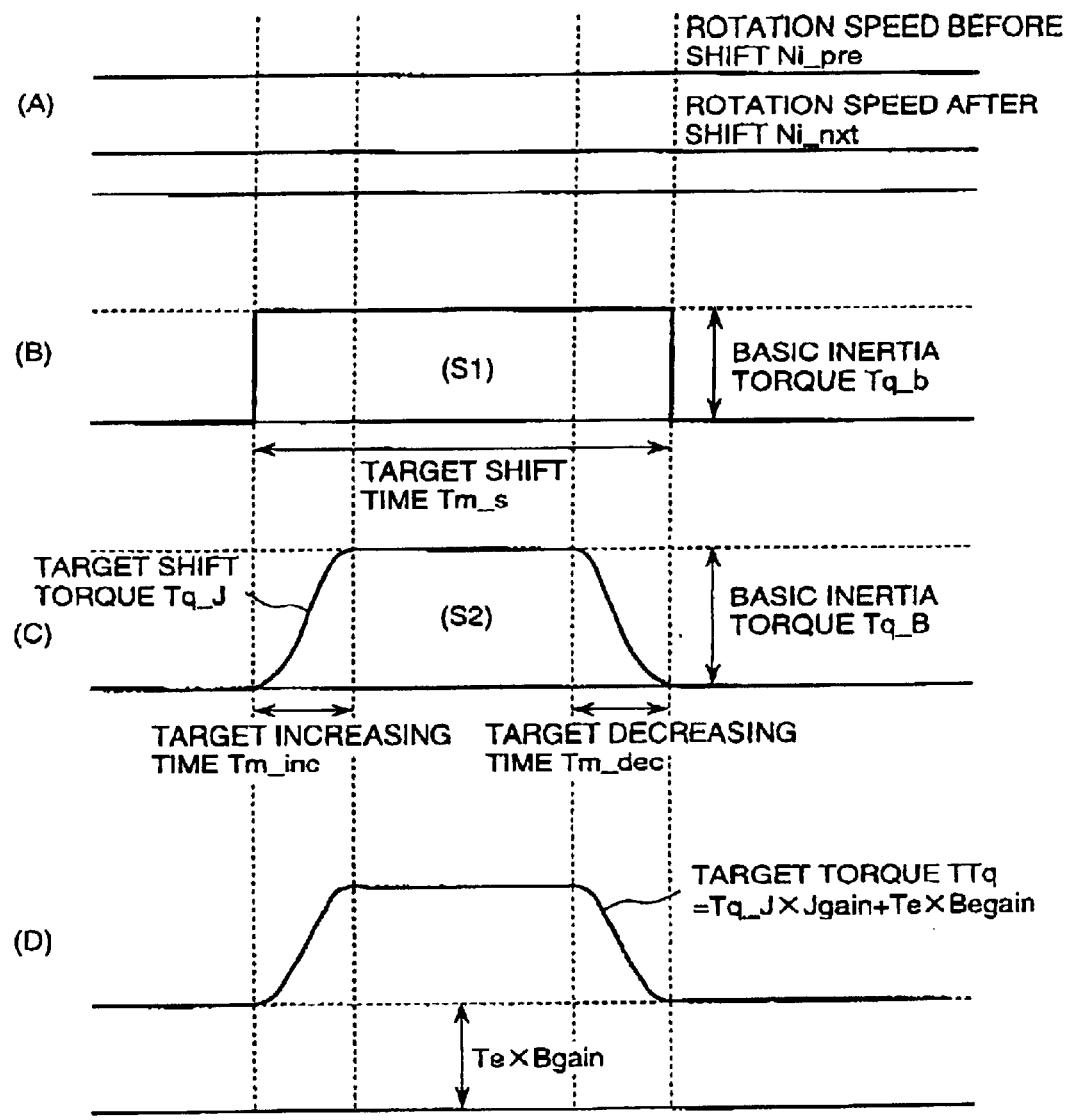
FIG. 20 is a time chart showing the contents of the feed-forward control in the torque assist control phase in the shift control by the system of controlling the vehicle according to the third embodiment of the present invention.
Figure 21A:
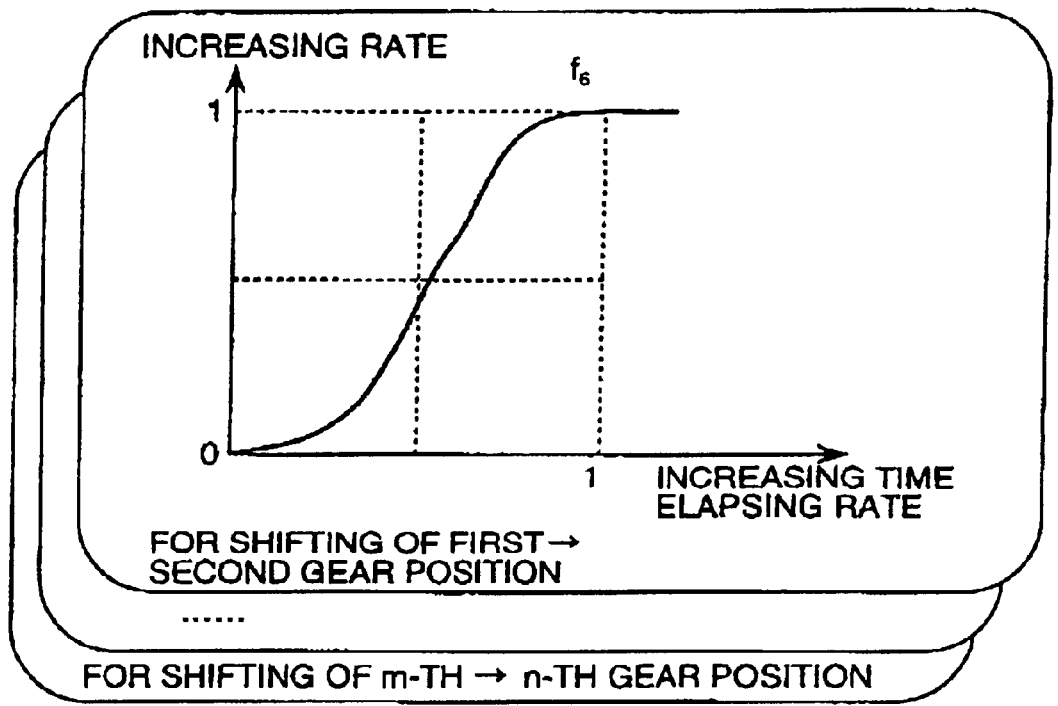
FIG. 21 is an illustration explaining the method of calculating the increasing rate and the decreasing rate in the feed-forward control in the torque assist control phase in the shift control by the system of controlling the vehicle according to the third embodiment of the present invention.
Figure 21B:
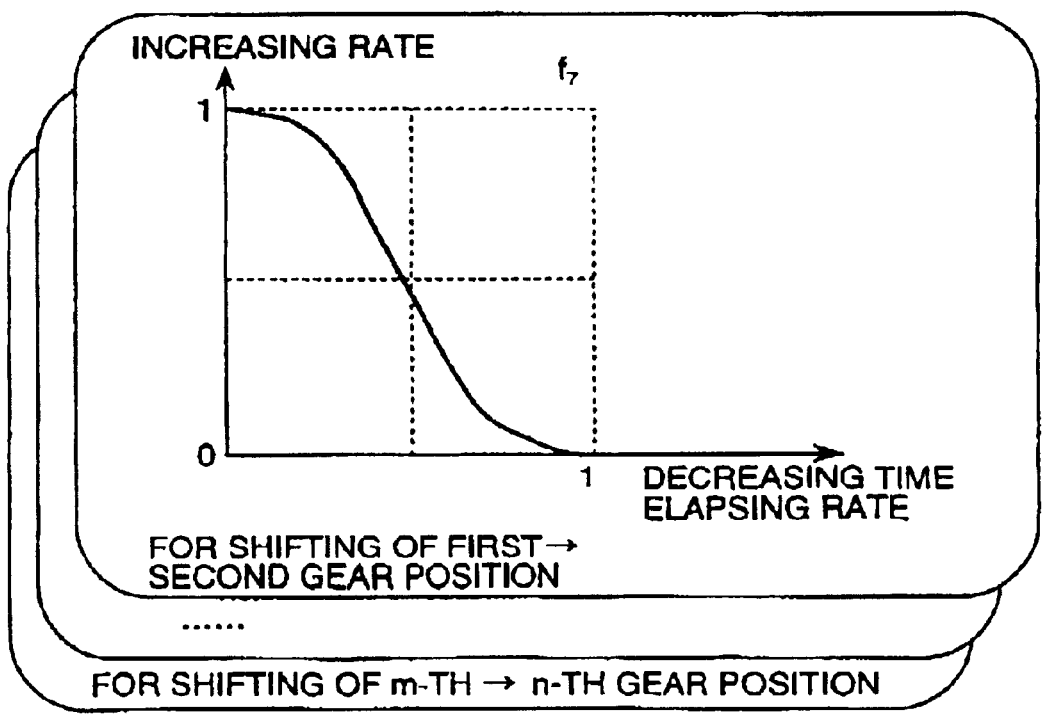
Figure 22:
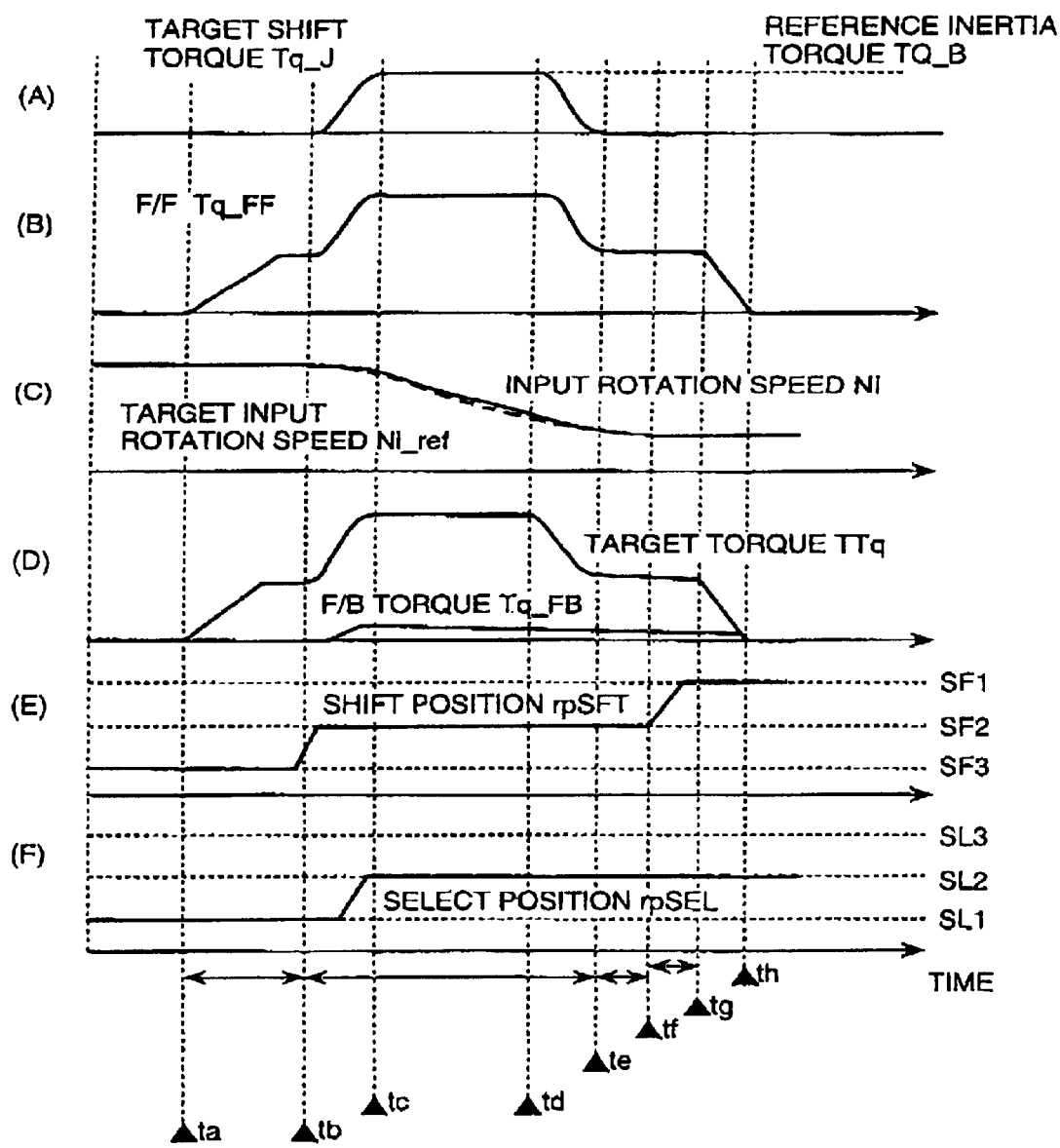
FIG. 22 is a time chart showing the control contents of the shift control by the system of controlling the vehicle according to the third embodiment of the present invention.

FIG. 19 is a flowchart showing the contents of the feed-forward control in the torque assist control phase in the shift control by the system of controlling a according to the third embodiment of the present invention. FIG. 20 is a time chart showing the contents of the feed-forward control in the torque assist control phase in the shift control by the system of controlling the vehicle according to the third embodiment of the present invention. FIG. 21 is an illustration explaining the method of calculating the increasing rate and the decreasing rate in the feed-forward control in the torque assist control phase in the shift control by the system of controlling the vehicle according to the third embodiment of the present invention. FIG. 22 is a time chart showing the control contents of the shift control by the system of controlling the vehicle according to the third embodiment of the present invention.

FIG. 20 shows the time chart of an up-shift (the input rotation speed before shifting Ni_pre>the input rotation speed after shifting Ni_nxt). FIG. 20(A) shows the input rotation speed before shifting Ni_pre and the input rotation speed after shifting Ni_nxt. FIG. 20(B) shows the basic inertia torque Tq_b. FIG. 20(C) shows the target shift torque Tq_J. FIG. 20(D) shows the target torque of the assist clutch TTq.

FIG. 22 shows a time chart of the control at up-shift from the second gear position to the third gear position. In FIG. 22, a period from the time point ta to the time point tb corresponds to the disengaging control phase, a period from the time point tb to the time point te corresponds to the torque assist control phase, a period from the time point te to the time point tf corresponds to the rotation synchronizing control phase, a period from the time point tf to the time point tg corresponds to the engaging control phase, and a period from the time point tg to the time point th corresponds to the shifting completion phase.

The control contents of the engaging control phase to be described below are programmed in the computer 100c of the power train control unit 100, and repetitively executed in a predetermined cycle. That is, the processing from Step 1501 to 1504 described below is executed by the power train control unit 100.

In the disengaging control phase shown in FIG. 22, as the target torque TTq of the assist clutch of FIG. 22(D) rises, the shift position rpSFT of FIG. 22(E) is started to move from the position SF3 to The position SF2.

When the shift position rpSFT approaches near the position SP2 (time tb), the control phase becomes the torque assist control phase. The contents of the feed-forward torque control in the torque assist control phase will be described below, referring to FIG. 19.

The contents of the feed-forward torque control to be described below are programmed in the computer 100c of the power train control unit 100, and repetitively executed in a predetermined cycle. That is, the processing from Step 1901 to 1911 described below is executed by the power train control unit 100.

In Step 1901, the power train control unit 100 reads parameters, and then in Step 1902, judges by a value of the torque assist control phase timer Tm_ta whether or not it is just after starting of the torque assist control phase. If the torque assist control phase timer Tm_ta=0, it is judged that it is just after starting the torque assist control phase. Then, Step 1903, Step 1904, Step 1905 and Step 1906 are executed, and after that, the processing proceeds to Step 1907. If the torque assist control phase timer Tm_ta≠0, it is judged that it is not just after starting the torque assist control phase. Then, the processing proceeds to Step 1907.

When it is just after starting of the torque assist control phase, the target shift time Tm_s shown in FIG. 20(1B), the target increasing time Tm_inc shown in FIG. 20(C) and the target decreasing time Tm_dec are set in Step 1903 (the target shift time setting process, the target increasing time setting process and the target decreasing time setting process). Further, a target holding time Tm_hld is set. The target holding time Tm_hld is set by Tm_ho;d=Tm_s−(Tm_inc+Tm_dec). Each of the target shift time Tm_s, the target increasing time Tm_inc and the target decreasing time Tm_dec is assumed to be a function of the engine torque Te, similarly to FIG. 9 and FIG. 16.

Next, in Step 1904, a sum of increasing rate R_sum_inc and a sum of decreasing rate R_sum_dec are calculated. The increasing rate (Function f6) indicates a rate in an increasing time elapsing rate to the increasing time Tm_inc, and the sum of increasing rate R_sum_inc is the sum of the increasing rate (Function f6). The decreasing rate (Function f7) indicates a rate in a decreasing time elapsing rate to the decreasing time Tm_inc, and the sum of decreasing rate R_sum_dec is the sum of the decreasing rate (Function f7).

Next, in Step 1905, a torque (the basic inertia torque Tq_b) necessary for shifting from the rotation speed Ni_pre equivalent to an input power before shifting to the rotation speed Ni_nxt equivalent to an input power after shifting is calculated. Letting an inertia coefficient from the engine to the input shaft be J, and the unit conversion coefficient be $\alpha$, the basic inertia torque Tq_b of the torque necessary for shifting becomes J×(Ni_pre−Ni_nxt)×$\alpha$/Tm_s. That is, the basic inertia torque Tq_b>0 in the case of up-shift, and the basic inertia torque Tq_b<0 in the case of down-shift. There, the input rotation speed before shifting Ni_pre is calculated by the output rotation speed No×the gear ratio before shifting, and the input rotation speed after shifting Ni_nxt is calculated by the output rotation speed No×the gear ratio after shifting.

Next, in Step 1906, the reference inertia torque Tq_B is calculated. The reference inertia torque Tq_B is a torque which has an area equal to an area of the basic inertia torque Tq_b×the target shift time Tm_s when the reference inertia torque Tq_B increases (decreases, in the case of downshift) in the target increasing time Tm_inc and decreases (increases, in the case of downshift) in the target decreasing time Tm_dec within the target shift time Tm_s. The reference inertia torque Tm_B when the reference inertia torque Tq_B is increased according to the increasing rate f6 in the target increasing time Tm_inc and decreased according to the decreasing rate f7 in the target decreasing time Tm_dec within the target shift time Tm_s is calculated so that the area S1 of FIG. 20(B) may become equal to the area S2 of FIG. 20(C). At that time, a torque increasing according to the increasing rate f6 in the target increasing time Tm_inc and decreases according to decreasing rate f7 in the target decreasing time Tm_dec becomes the target shift torque Tq_J. There, as shown in FIGS. 21(A) and (B), the increasing rate f6 and the decreasing rate f7 are calculated by inputting the increasing time elapsing rate (elapsing time/target increasing time) and the decreasing time elapsing rate (elapsing time/target decreasing time), respectively. Further, each of the increasing rate f6 and the decreasing rate f7 is separately set for each shifting pattern.

Step 1907, Step 1908, Step 1909 and Step 1910 are the target shift torque setting process. In Step 1907, classification of cases is performed using the torque assist control phase timer Tm_ta to determine the method of calculating the target shift torque Tq_J. If the torque assist control phase timer Tm_ta<the target increasing time Tm_inc, the processing proceeds to Step 1908. If the torque assist control phase timer Tm_ta<the target shift time Tm_s−the target decreasing time Tm_dec, the processing proceeds to Step 1909. If the case is a case other than the above, the processing proceeds to Step 1910.

When the torque assist control phase timer Tm_ta<the target increasing time Tm_inc, in Step 1908 the target shift torque Tq_J is increased up to the reference inertia torque Tq_B in the target increasing time Tm_inc (decreased down when down-shifting) according to the increasing rate (function f6). It is set that the target shift torque Tq_J=the reference inertia torque Tq_B×Function f6 (the torque assist control phase timer Tm_ta/the target increasing time Tm_inc).

When the torque assist control phase timer Tm_ta<the target shift time Tm_s−the target decreasing time Tm_dec, in Step 1909 it is set that the target shift torque Tq_J=the reference inertia torque Tq_B.

In the cases other than the above, in Step 1910 the target shift torque Tq_, is decreased down to 0 in the target decreasing time Tm_dec according to the decreasing rate (Function f7) (increased up when down-shifting). It is set that the target shift torque Tq_J=the reference inertia torque Tq_B×Function f7 (a decreasing elapsing time Tm_ta2/the target decreasing time Tm_dec). The decreasing elapsing time Tm_ta2 is calculated by Tm_ta2=Tm_ta−(Tm_inc+Tm_hld).

Next, in Step 1911, the target torque TTq of the assist clutch is calculated. It is set that the target torque TTq=the target shift torque Tq_J×the shift torque adjusting gain Jgain+the engine torque Te×the engine torque adjusting gain Bgain. Similarly to FIG. 9 and FIG. 16, it is preferable that each of the shift torque adjusting gain Jgain and the engine torque Te×the engine torque adjusting gain Bgain is set for each shifting pattern. Further, it is preferable that each of the shift torque adjusting gain Jgain and the engine torque Te×the engine torque adjusting gain Bgain is a function of the input torque (or the engine torque) before shifting.

As described above, in the torque assist control phase, as the target shift torque Tq_J of FIG. 22(A) increases up to the reference inertia torque Tq_B and then decreases down to 0, the feed-forward torque Tq_FF of FIG. 22(B) increases up and then decreases down. As the feed-forward torque Tq_FF of FIG. 22(B) increases up and then decreases down, the input rotation speed Ni of FIG. 22(C) is decreased. Further, the target input rotation speed Ni_ref of FIG. 22(C) of a rotation speed for realizing the target shift torque Tq_J of FIG. 22(A) is changed to change the feedback torque of FIG. 22(D) so that the difference between the target input rotation speed Ni_ref and the input rotation speed Ni is eliminated, and the target torque of the FIG. 22(D) is set from the feed-forward torque Tq_FF and the feedback torque Tq_FB. Thereby, the input rotation speed Ni can be controlled so as to follow the target input rotation speed Ni_ref while realizing the target shift torque Tq_J. Further, the select position rpSEL of FIG. 22(F) is shifted from the position SL1 to the position SL2.

Next, in the rotation synchronizing control phase, the target torque TTq of the assist clutch of FIG. 22(D) is controlled so that the input rotation speed Ni of FIG. 22(C) follows the target input rotation speed Ni_ref.

Further, in the engaging control phase, the target torque TTq of the assist clutch of FIG. 22(D) is controlled so that the input rotation speed Ni of FIG. 22(C) follows the target input rotation speed Ni_ref, and the shift position rpSFT of FIG. 22(E) is shifted from the position SL1 to the position SL2. The control phase enters into the shifting completion phase at the time tg when shifting of the shift position rpSFT of FIG. 22(E) to the position SL2 is completed, and the target torque TTq of the assist clutch of FIG. 22(D) becomes 0. Thus, the shift control is completed.

As described above, in the present embodiment since the assist clutch is controlled by setting the target shift torque during shifting, and setting the feed-forward command value from the target shift torque and the input torque, and setting the target input rotation speed from the target shift torque, and setting the feedback command value of the assist clutch so as to realize the target input rotation speed. Therefore, the torque waveform during shifting strongly affecting feeling of the shifting can be directly controlled, and accordingly the feeling of the shifting can be improved.

The construction and the operation of a fourth embodiment of a system of controlling a vehicle in accordance with the present invention will be described below, referring to FIG. 23 and FIG. 24.

There, the construction of a system of controlling a vehicle in accordance with second embodiment is the same as that shown in FIG. 1 or FIG. 2. The engaging relationship between the clutch and the driven gear in the present embodiment is the same as that shown in FIG. 3. The input-output signal relationship by the communication means 103 among the power train control unit 100, the engine control unit 101 and the hydraulic pressure control unit 102 in the system of controlling the vehicle in accordance with the present embodiment is the same as that shown in FIG. 4. The overall control contents of the system of controlling the vehicle in accordance with the present embodiment are the same as those shown in FIG. 5. The contents of the timers showing the elapsing time of the shift control by the system of controlling the vehicle in accordance with the present embodiment are the same as those shown in FIG. 6. The control contents of the disengaging control phase of Step 503 of the shift control by the system of controlling the vehicle in accordance with the present embodiment are the same as those shown in FIG. 7, FIG. 8 and FIG. 14. The control contents of the torque assist control phase of Step 505 of the shift control by the system of controlling the vehicle in accordance with the present embodiment are similar to those shown in FIG. 15 to FIG. 18, but are different in the method of feedback torque control from that shown in FIG. 17, and are to be described, referring to FIG. 23 and the follow. The control contents of the rotation synchronizing control phase of Step 509 of the shift control by the system of controlling the vehicle in accordance with the present embodiment are the same as those shown in FIG. 12 and FIG. 14. The control contents of the engaging control phase of Step 511 of the shift control by the system of controlling the vehicle in accordance with the present embodiment are the same as those shown in FIG. 13 and FIG. 14.

The contents of the feedback torque control in the torque assist control phase of the shift control by the system of controlling the vehicle in accordance with the present embodiment will be described, referring to FIG. 23 to FIG. 24.

Figure 23:
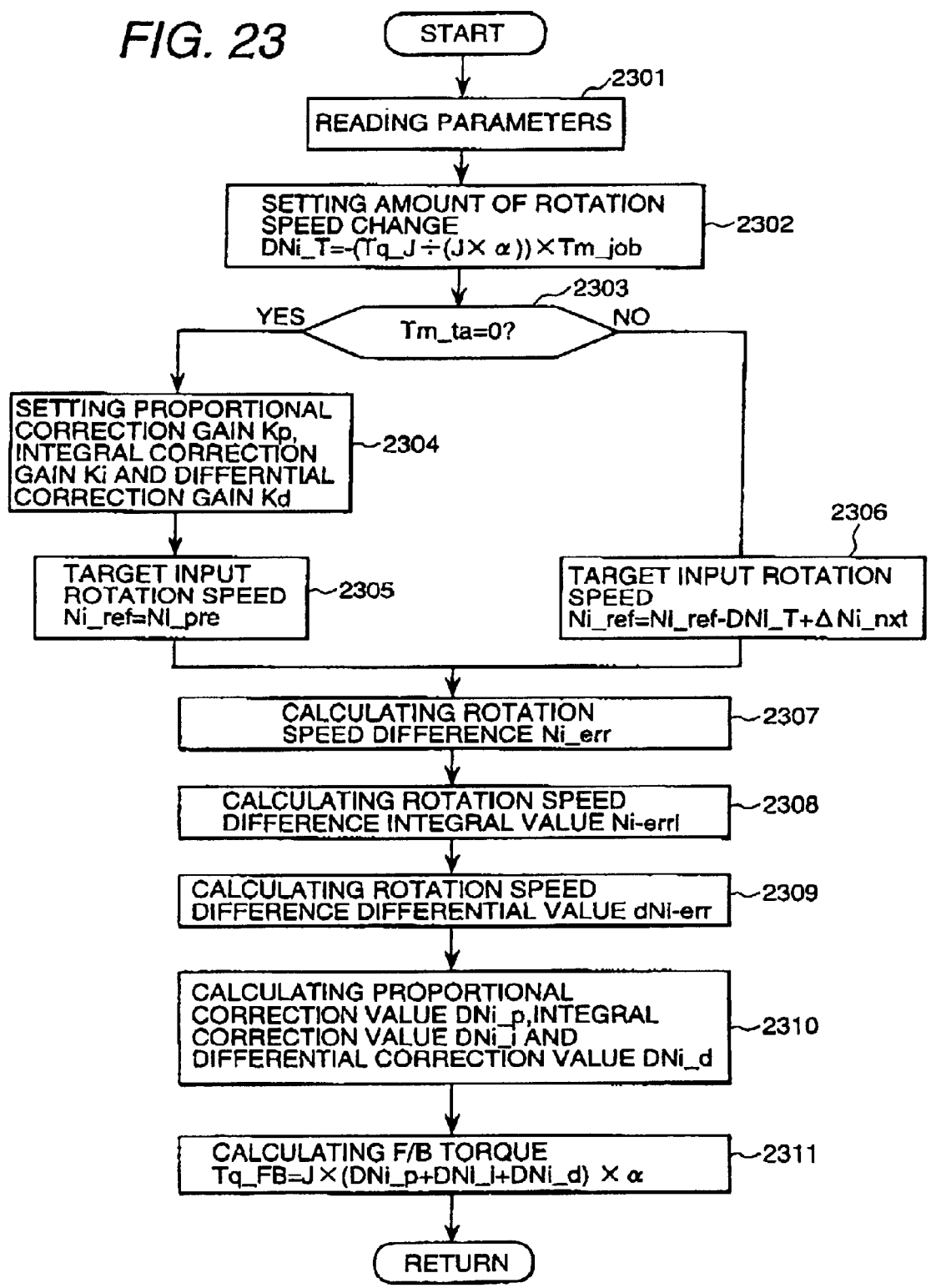
FIG. 23 is a flowchart showing the contents of the feedback control in the torque assist control phase in the shift control by a system of controlling a vehicle according to a fourth embodiment of the present invention.

FIG. 23 is a flowchart showing the contents of the feedback control in the torque assist control phase in the shift control by a system of controlling a vehicle of a fourth embodiment of the present invention. FIG. 24 is a time chart showing the control contents of the shift control by the system of controlling the vehicle according to the fourth embodiment of the present invention.

Figure 24:
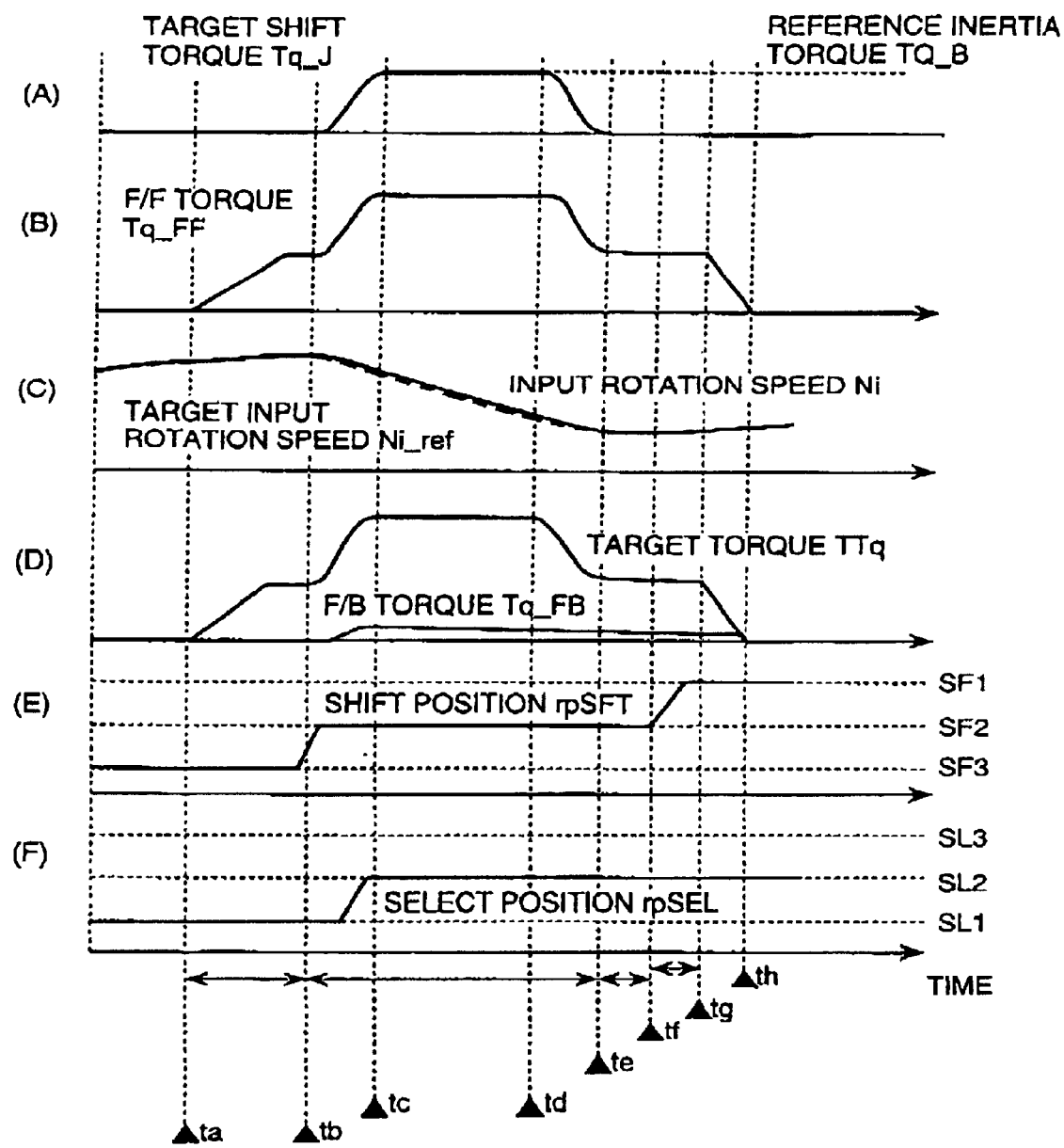
FIG. 24 is a time chart showing the control contents of the shift control by the system of controlling the vehicle according to the fourth embodiment of the present invention.

Different from the time chart of the control at up-shift shown in FIG. 22, FIG. 24 shows a time chart of the control at up-shift from the second gear position to the third gear position in a case where the torque assist control is performed by calculating the feedback torque through the control method shown in FIG. 23. (The time chart of the actual assist clutch transmitting torque is omitted.)

The control contents of the engaging control phase to be described below are programmed in the computer 100c of the power train control unit 100, and repetitively executed in a predetermined cycle. That is, the processing from Step 2301 to 2311 described below is executed by the power train control unit 100.

Similarly to the case of FIG. 22, in FIG. 24, a period from the time point ta to the time point tb corresponds to the disengaging control phase, a period from the time point tb to the time point te corresponds to the torque assist control phase, a period from the time point te to the time point tf corresponds to the rotation synchronizing control phase, a period from the time point tf to the time point tg corresponds to the engaging control phase, and a period from the time point tg to the time point th corresponds to the shifting completion phase.

In the disengaging control phase, as the target torque TTq of the assist clutch of FIG. 24(D) rises, the shift position rpSFT of FIG. 24(E) is started to move from the position SF3 to The position SF2.

The contents of the basic processing shown in FIG. 23 are the same as those shown in FIG. 17.

The power train control unit 100 reads parameters in Step 2301, and calculates an amount of rotation speed change $DNi\_T$ for realizing the target shift torque $Tq\_J$ obtained in FIG. 19 (or FIG. 16) in Step 2302. Letting the inertia coefficient from the engine to the input shaft be J, the unit conversion coefficient be $\alpha$, and the control cycle time be $Tm\_job$, the rotation speed change amount $DNi\_T$ is calculated as $DNi\_T=-(Tq\_J/(J\times\alpha))\times Tm\_job$.

Next, in Step 2303, it is judged based on the torque assist control phase timer $Tm\_ta$ whether or not it is just after starting of the torque assist control phase. If the torque assist control phase timer $Tm\_ta=0$, Step 2304 and Step 2305 is executed, and after that, the processing proceeds to Step 2307. If the torque assist control phase timer $Tm\_at$ 0, Step 2306 is executed and then the processing proceeds to Step 2307.

If it is just after starting of the torque assist control phase, the target input rotation speed setting process of Step 2305 and Step 2306 is executed. In Step 2304, a proportional correction gain Kp, an integral correction gain Ki and a differential correction gain Kd for rotation speed feedback are set. There, similarly to FIG. 17, it is preferable that each of the proportional correction gain Kp, the integral correction gain Ki and the differential correction gain Kd is separately set for each shifting pattern or for each target shifting stage. In Step 2305, an initial value of the target input rotation; speed $Ni\_ref$ for the rotation speed feedback is set. The target input rotation speed just after starting of the torque assist control phase is set to the input rotation speed before shifting $Ni\_pre$.

On the other hand, when it is not just after starting of the torque assist control phase, in Step 2306, a target input rotation speed $Ni\_ref$ for the rotation speed feedback is set. The target input rotation speed $Ni\_ref$ is changed step-by-step by the amount of rotation speed change $DNi\_T$ calculated in Step 2302.

A different point of the present embodiment from FIG. 17 is that the amount of change in the input rotation speed after gear change $Ni\_nxt$ is summed in order to take the change in the rotation speed due to change in the vehicle speed into consideration. That is, a difference $Ni\_err$ between the target input rotation speed $Ni\_ref$ and the input rotation speed Ni is calculated in Step 2307, and an integrated value $Ni\_errI$ of the rotation speed difference $Ni\_err$ is calculated in Step 2308, and then a differential value $dNi\_err$ of the rotation speed difference $Ni\_err$ is calculated in Step 2309.

Next, in Step 2310, a proportional correction value $DNi\_p$, an integral correction value $DNi\_i$ and a differential correction value $DNi\_d$ are calculated using the rotation speed difference $Ni\_err$, the rotation speed difference integral value $Ni\_errI$, the rotation speed difference differential value $dNi\_err$, the proportional correction gain Kp, the integral correction gain Ki and the differential correction gain Kd.

Next, in Step 2311, a feedback torque Tq_FB is set. Letting the inertia coefficient from the engine to the input shaft be J, and the unit conversion coefficient be α, the feedback torque Tq_FB is calculated by J×(DNi_p−DNi_i+DNi_d)×α.

That is, when the shift position rpSFT comes near the position SP2 (time tb), the control phase becomes the torque assist control phase. In the torque assist control phase, as the target shift torque Tq_J of FIG. 24(A) increases up to the reference inertia torque Tq_B and then decreases down to 0, the feed-forward torque Tq_FF of FIG. 24(B) increases up and then decreases down. As the feed-forward torque Tq_FF of FIG. 24(B) increases up and then decreases down, the input rotation speed Ni of FIG. 24(C) is decreased.

Further, the target input rotation speed Ni_ref of FIG. 24(C) of a rotation speed for realizing the target shift torque Tq_J of FIG. 24(A) is changed to change the feedback torque of FIG. 24(D) so that the difference between the target input rotation speed Ni_ref and the input rotation speed Ni is eliminated, and the target torque of the FIG. 24(D) is set from the feed-forward torque Tq_FF and the feedback torque Tq_FB. Thereby, the input rotation speed Ni can be controlled so as to follow the target input rotation speed Ni_ref while realizing the target shift torque Tq_J. Further, the select position rpSEL of FIG. 24(F) is shifted from the position SL1 to the position SL2.

Next, in the rotation synchronizing control phase, the target torque TTq of the assist clutch of FIG. 24(D) is controlled so that the input rotation speed Ni of FIG. 24(C) follows the target input rotation speed Ni_ref.

Further, in the engaging control phase, the target torque TTq of the assist clutch of FIG. 24(D) is controlled so that the input rotation speed Ni of FIG. 24(C) follows the target input rotation speed Ni_ref, and the shift position rpSFT of FIG. 24(E) is shifted from the position SL1 to the position SL2. The control phase enters into the shifting completion phase at the time tg when shifting of the shift position rpSFT of FIG. 24(E) to the position SL2 is completed, and the target torque TTq of the assist clutch of FIG. 24(D) becomes 0. Thus, the shift control is completed.

As described above, in the present embodiment since the assist clutch is controlled by setting the target shift torque during shifting, and setting the feed-forward command value from the target shift torque and the input torque, and setting the target input rotation speed from the target shift torque, and setting the feedback command value of the assist clutch so as to realize the target input rotation speed. Therefore, the torque waveform during shifting strongly affecting feeling of the shifting can be directly controlled, and accordingly the feeling of the shifting can be improved.

The construction and the operation of a fifth embodiment of a system of controlling a vehicle in accordance with the present invention will be described below, referring to FIG. 25 to FIG. 27.

There, the construction of a system of controlling a vehicle in accordance with second embodiment is the same as that shown in FIG. 1 or FIG. 2. The engaging relationship between the clutch and the driven gear in the present embodiment is the same as that shown in FIG. 3. The input-output signal relationship by the communication means 103 among the power train control unit 100, the engine control unit 101 and the hydraulic pressure control unit 102 in the system of controlling the vehicle in accordance with the present embodiment is the same as that shown in FIG. 4. The overall control contents of the system of controlling the vehicle in accordance with the present embodiment are the same as those shown in FIG. 5. The contents of the timers showing the elapsing time of the shift control by the system of controlling the vehicle in accordance with the present embodiment are the same as those shown in FIG. 6. The control contents of the disengaging control phase of Step 503 of the shift control by the system of controlling the vehicle in accordance with the present embodiment are the same as those shown in FIG. 7, FIG. 8 and FIG. 14. The control contents of the torque assist control phase of Step 505 of the shift control by the system of controlling the vehicle in accordance with the present embodiment are similar to those shown in FIG. 15 to FIG. 18, but are different in the method of feedback torque control from that shown in both of FIG. 17 and FIG. 23, and are to be described, referring to FIG. 25 and the follow. The control contents of the rotation synchronizing control phase of Step 509 of the shift control by the system of controlling the vehicle in accordance with the present embodiment are the same as those shown in FIG. 12 and FIG. 14. The control contents of the engaging control phase of Step 511 of the shift control by the system of controlling the vehicle in accordance with the present embodiment are the same as those shown in FIG. 13 and FIG. 14.

The contents of the feedback torque control in the torque assist control phase of the shift control by the system of controlling the vehicle in accordance with the present embodiment will be described, referring to FIG. 25 to FIG. 27.

Figure 25:
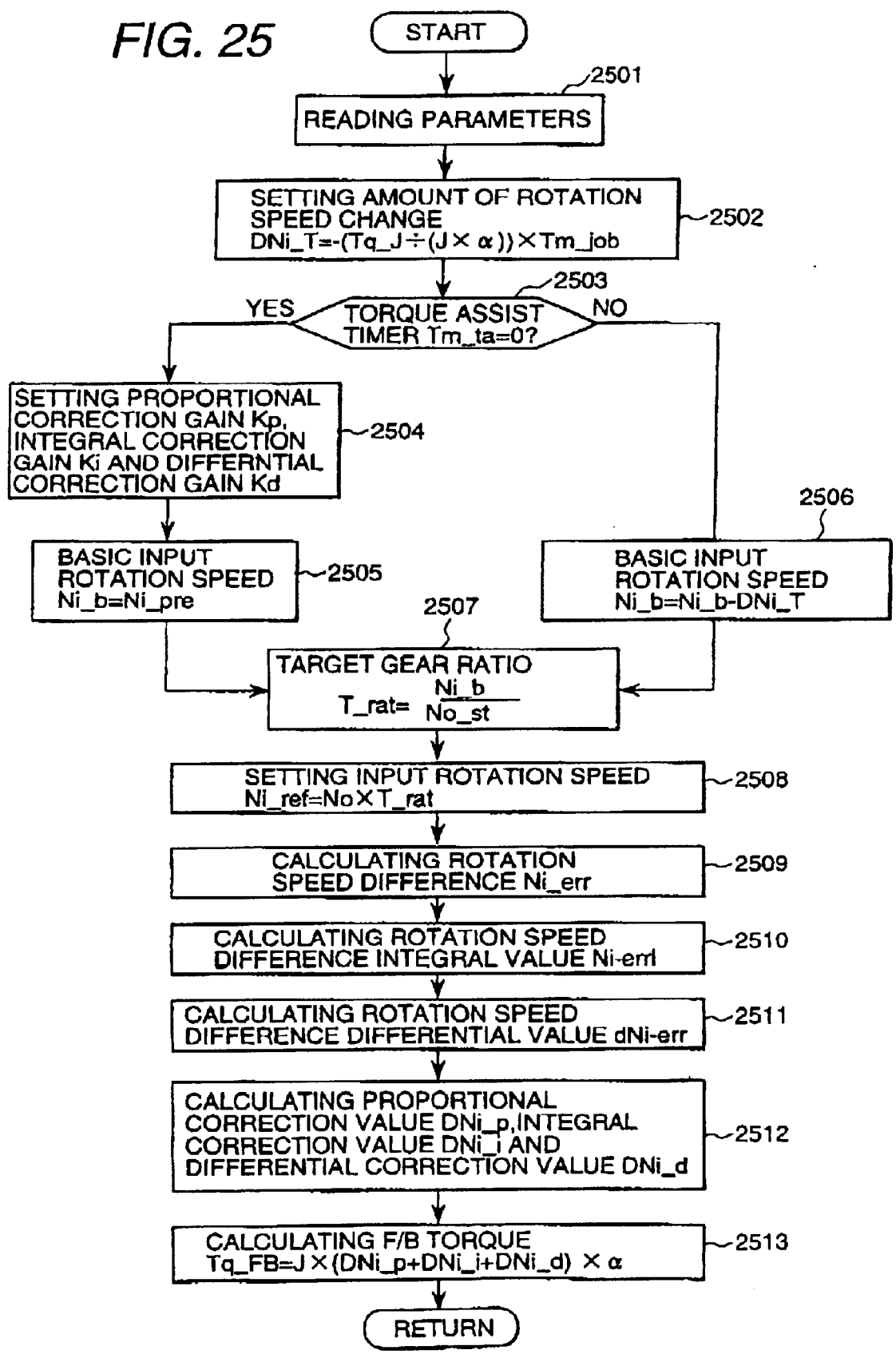
FIG. 25 is a flowchart showing the contents of the feedback control in the torque assist control phase in the shift control by a system of controlling a vehicle according to a fifth embodiment of the present invention.

FIG. 25 is a flowchart showing the contents of the feedback control in the torque assist control phase in the shift control by a system of controlling a vehicle of a fifth embodiment of the present invention. FIG. 26 is a time chart showing the control contents of the shift control by the system of controlling the vehicle according to the fifth embodiment of the present invention. FIG. 27 is a time chart showing the contents of the shift control at shifting down by the system of controlling the vehicle according to the fifth embodiment of the present invention.

Figure 26:
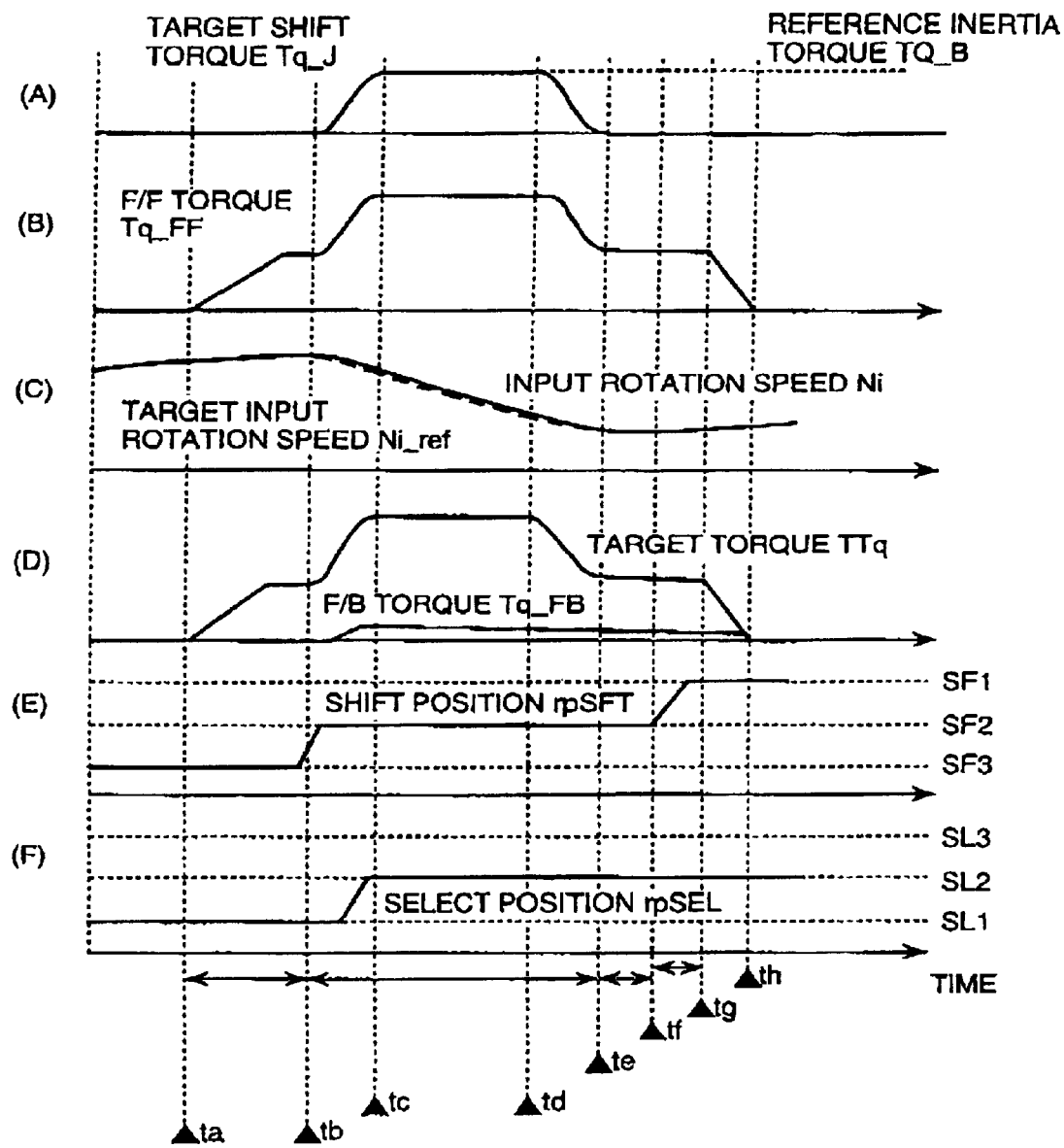
FIG. 26 is a time chart showing the control contents of the shift control by the system of controlling the vehicle according to the fifth embodiment of the present invention.

Different from the time chart of the control at up-shift shown in FIG. 22 and FIG. 24, FIG. 26 shows a time chart of the control at up-shift from the second gear position to the third gear position in a case where the torque assist control is performed by calculating the feedback torque through the control method shown in FIG. 25. (The time chart of the actual assist clutch transmitting torque is omitted.)

The control contents of the engaging control phase to be described below are programmed in the computer 100c of the power train control unit 100, and repetitively executed in a predetermined cycle. That is, the processing from Step 2501 to 2513 described below is executed by the power train control unit 100.

Similarly to the case of FIG. 22 and FIG. 24, in FIG. 26, a period from the time point ta to the time point tb corresponds to the disengaging control phase, a period from the time point tb to the time point te corresponds to the torque assist control phase, a period from the time point te to the time point tf corresponds to the rotation synchronizing control phase, a period from the time point tf to the time point tg corresponds to the engaging control phase, and a period from the time point tg to the time point th corresponds to the shifting completion phase.

In the disengaging control phase, as the target torque TTq of the assist clutch of FIG. 26(D) rises, the shift position rpSFT of FIG. 26(E) is started to move from the position SF3 to The position SF2.

The contents of the basic processing shown in FIG. 25 are the same as those shown in FIG. 17 and FIG. 23.

The power train control unit 100 reads parameters in Step 2501 of FIG. 25, and in Step 2502, calculates an amount of rotation speed change DNi_T for realizing the target shift torque Tq_J obtained in FIG. 19 (or FIG. 16). Letting the inertia coefficient from the engine to the input shaft be J, the unit conversion coefficient be α, and the control cycle time be Tm_job, the rotation speed change amount DNi_T is calculated as DNi_T=−(Tq_J/(J×α))×Tm_job.

Next, in Step 2503, it is judged based on the torque assist control phase timer Tm_ta whether or not it is just after starting of the torque assist control phase. If the torque assist control phase timer Tm_ta=0, Step 2504 and Step 2505 is executed, and after that, the processing proceeds to Step 2507. If the torque assist control phase timer Tm_at≠0, Step 2506 is executed and then the processing proceeds to Step 2507.

If it is just after starting of the torque assist control phase, the target input rotation speed setting process of Step 2505 and Step 2506 is executed. In Step 2504, a proportional correction gain Kp, an integral correction gain Ki and a differential correction gain Kd for rotation speed feedback are set. There, similarly to FIG. 17 and FIG. 23, it is preferable that each of the proportional correction gain Kp, the integral correction gain Ki and the differential correction gain Kd is separately set for each shifting pattern or for each target shifting stage. In Step 2505, an initial value of the target input rotation speed Ni_ref for the rotation speed feedback is set. The target input rotation speed just after starting of the torque assist control phase is set to the input rotation speed before shifting Ni_pre.

On the other hand, when it is not just after starting of the torque assist control phase, in Step 2506, a basic input rotation speed Ni_b for the rotation speed feedback is set. The basic input rotation speed Ni_b is changed step-by-step by the amount of rotation speed change DNi_T calculated in Step 2502. The basic input rotation speed Ni_b is equivalent to the target input rotation speed not taking change in the rotation speed due to change in the vehicle speed into consideration (Ni_ref of FIG. 17).

Next, in Step 2507, the target gear ratio setting process is executed to calculate a target gear ratio T_rat from the basic input rotation speed Ni_b and the output rotation speed No_st at starting of shifting, that is, the calculation is executed as T_rat=Ni_b/No_st. There, instead of the output rotation speed No_st at starting of shifting, (the input rotation speed at starting of shifting Ni_st/a gear ratio before shifting) may be used.

Next, in Step 2508, the target input rotation speed setting process is executed, that is, the calculation is executed as the target input rotation speed Ni_ref=the output rotation speed No×the target gear ratio T_rat. By the above, the effect of change in the rotation speed caused by change in the vehicle speed can be reflected.

Next, a difference Ni_err between the target input rotation speed Ni_ref and the input rotation speed Ni is calculated in Step 2509, and an integrated value Ni_errI of the rotation speed difference Ni_err is calculated in Step 2510, and then a differential value dNi_err of the rotation speed difference Ni_err is calculated in Step 2511.

Next, in Step 2512, a proportional correction value DNi_p, an integral correction value DNi_i and a differential correction value DNi_d are calculated using the rotation speed difference Ni_err, the rotation speed difference integral value Ni_errI, the rotation speed difference differential value dNi_err, the proportional correction gain Kp, the integral correction gain Ki and the differential correction gain Kd.

Next, in Step 2513, a feedback torque Tq_FB is set. Letting the inertia coefficient from the engine to the input shaft be J, and the unit conversion coefficient be α, the feedback torque Tq_FB is calculated by J×(DNi$_{13}$ p−DNi_i+DNi_d)×α.

Therein, the output rotation speed No_st at starting of shifting is set to the output rotation speed No when the disengaging control phase is switched to the torque assist control phase. Further, in order to suppress the effect of rotation speed fluctuation due to the discharging control, it is preferable that the output rotation speed No_st at starting of shifting is set to a filter value of the output rotation speed No when the disengaging control phase is switched to the torque assist control phase, or to an average value of several number of the outputs rotation speed values just before the switching.

When the shift position rpSFT comes near the position SF2 (time tb), the control phase becomes the torque assist control phase. In the torque assist control phase, as the target shift torque Tq_J of FIG. 26(A) increases up to the reference inertia torque Tq_B and then decreases down to 0, the feed-forward torque Tq_FF of FIG. 26(B) increases up and then decreases down. As the feed-forward torque Tq_FF of FIG. 26(B) increases up and then decreases down, the input rotation speed Ni of FIG. 26(C) is decreased. Further, the target input rotation speed Ni_ref of FIG. 26(C) of a rotation speed for realizing the target shift torque Tq_J of FIG. 26(A) is changed to change the feedback torque of FIG. 26(D) so that the difference between the target input rotation speed Ni_ref and the input rotation speed Ni is eliminated, and the target torque of the FIG. 26(D) is set from the feed-forward torque Tq_FF and the feedback torque Tq_FB. Thereby, the input rotation speed Ni can be controlled so as to follow the target input rotation speed Ni_ref while realizing the target shift torque Tq_J. Further, the select position rpSEL of FIG. 26(F) is shifted from the position SL1 to the position SL2.

Further, in the rotation synchronizing control phase, the target torque TTq of the assist clutch of FIG. 26(D) is controlled so that the input rotation speed Ni of FIG. 26(C) follows the target input rotation speed Ni_ref.

In the engaging control phase, the target torque TTq of the assist clutch of FIG. 26(D) is controlled so that the input rotation speed Ni of FIG. 26(C) follows the target input rotation speed Ni_ref, and the shift position rpSFT of FIG. 26(E) is shifted from the position SL1 to the position SL2. The control phase enters into the shifting completion phase at the time tg when shifting of the shift position rpSFT of FIG. 26 (E) to the position SL2 is completed, and the target torque TTq of the assist clutch of FIG. 26(D) becomes 0. Thus, the shift control is completed.

The control contents at down-shifting from the second gear position to the first gear position will be described below, referring to FIG. 27. (The time chart of the actual assist clutch transmitting torque is omitted.)

Figure 27:
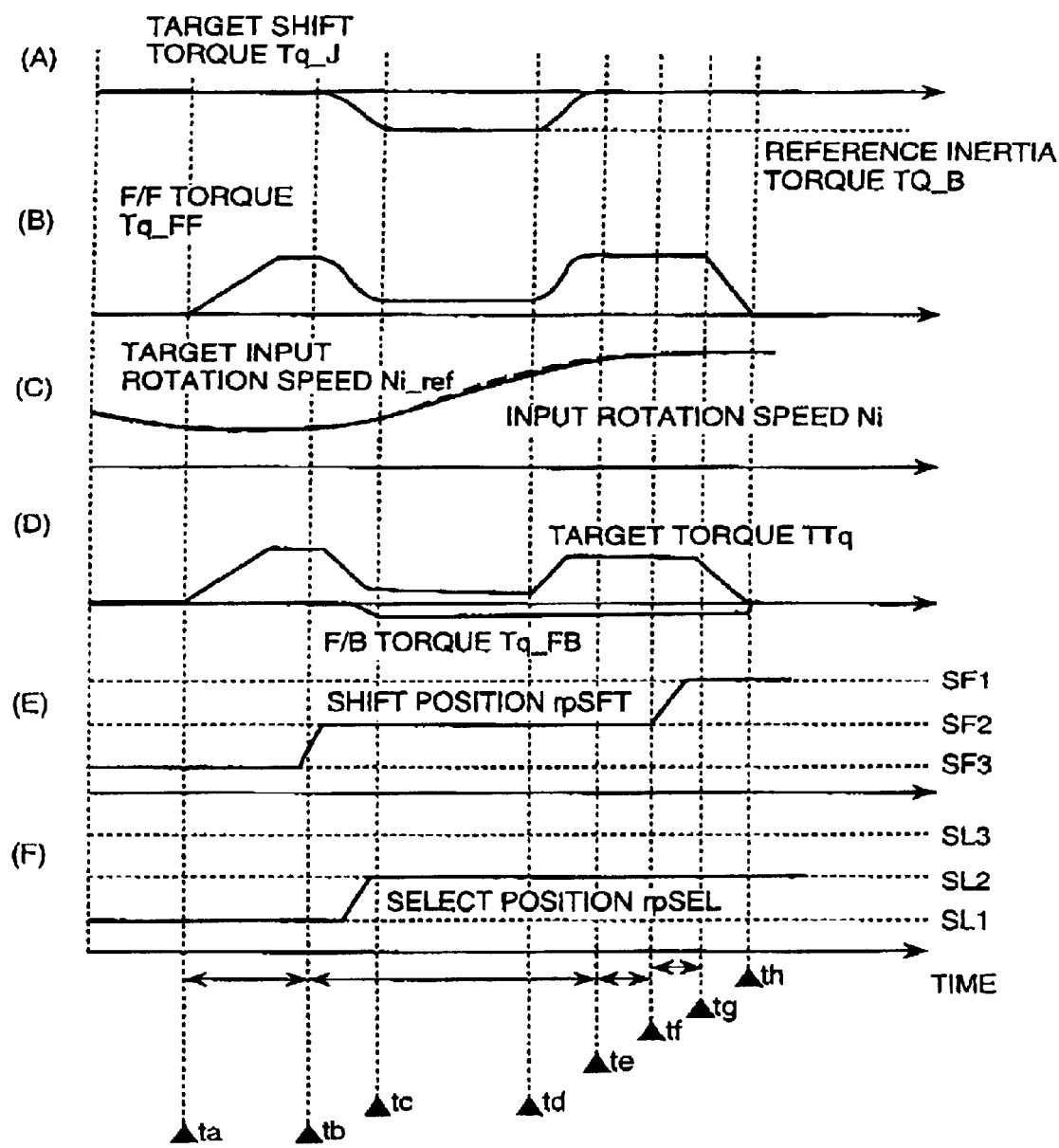
FIG. 27 is a time chart showing the contents of the shift control at shifting down by the system of controlling the vehicle according to the fifth embodiment of the present invention.

Similarly to the case of FIG. 26, in FIG. 27, a period from the time point ta to the time point tb corresponds to the disengaging control phase, a period from the time point tb to the time point te corresponds to the torque assist control phase, a period from the time point te to the time point tf corresponds to the rotation synchronizing control phase, a period from the time point tf to the time point tg corresponds to the engaging control phase, and a period from the time point tg to the time point th corresponds to the shifting completion phase.

In the disengaging control phase, as the target torque TTq of the assist clutch of FIG. 27(D) rises, the shift position rpSFT of FIG. 27(E) is started to move from the position SF3 to The position SF2.

When the shift position rpSFT comes near the position SF2 (time tb), the control phase becomes the torque assist control phase. In the torque assist control phase, as the target shift torque Tq_J of FIG. 27(A) decreases down to the reference inertia torque $Tq_{13}$ B and then increases up to 0, the feed-forward torque Tq_FF of FIG. 27(B) decreases down and then increases up. As the feed-forward torque Tq_FF of FIG. 27(B) decreases down and then increases up, the input rotation speed Ni of FIG. 27(C) is increased. Further, the target input rotation speed Ni_ref of FIG. 27(C) of a rotation speed for realizing the target shift torque Tq_J of FIG. 27(A) is changed to change the feedback torque of FIG. 27(D) so that the difference between the target input rotation speed Ni_ref and the input rotation speed Ni is eliminated, and the target torque of the FIG. 27(D) is set from the feed-forward torque Tq_FF and the feedback torque Tq_FB. Thereby, the input rotation speed Ni can be controlled so as to follow the target input rotation speed Ni_ref while realizing the target shift torque Tq_J. Further, the select position rpSEL of FIG. 27(F) is not shifted and kept in the position SL1 because of the down-shift from the second gear position to the first gear position.

Next, in the rotation synchronizing control phase, the target torque TTq of the assist clutch of FIG. 27(D) is controlled so that the input rotation speed Ni of FIG. 27(C) follows the target input rotation speed Ni_ref.

In the engaging control phase, the target torque TTq of the assist clutch of FIG. 27(D) is controlled so that the input rotation speed Ni of FIG. 27(C) follows the target input rotation speed Ni_ref, and the shift position rpSFT of FIG. 27(E) is shifted from the position SL2 to the position SL1. The control phase enters into the shifting completion phase at the time tg when shifting of the shift position rpSFT to the position SL1 is completed, and the target torque TTq of the assist clutch of FIG. 27(D) becomes 0. Thus, the shift control is completed.

As described above, in the present embodiment since the assist clutch is controlled by setting the target shift torque during shifting, and setting the feed-forward command value from the target shift torque and the input torque, and setting the target input rotation speed from the target shift torque, and setting the feedback command value of the assist clutch so as to realize the target input rotation speed. Therefore, the torque waveform during shifting strongly affecting feeling of the shifting can be directly controlled, and accordingly the feeling of the shifting can be improved.

The construction and the operation of a sixth embodiment of a system of controlling a vehicle in accordance with the present invention will be described below, referring to FIG. 28.

Figure 28:
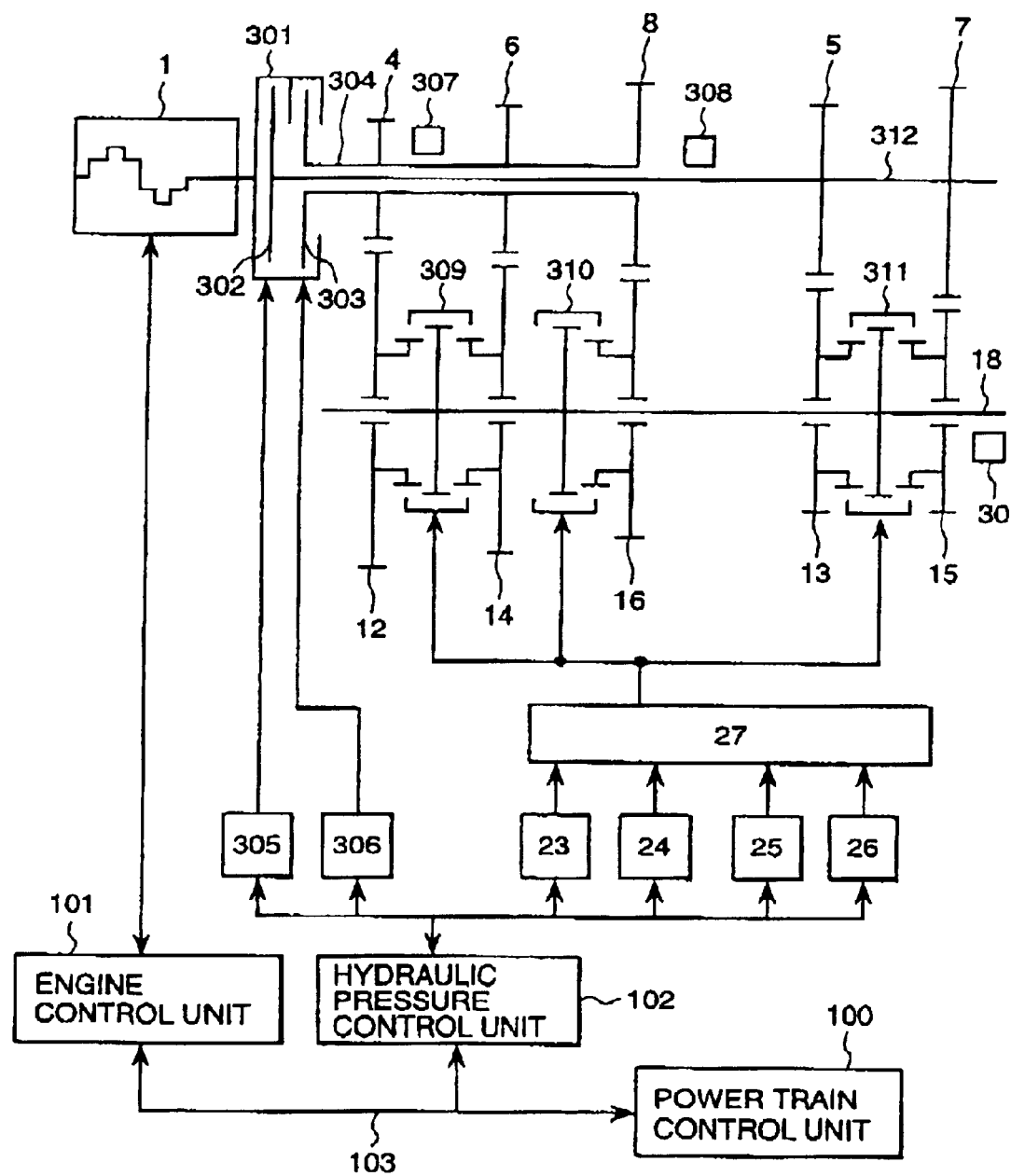
FIG. 28 is a system diagram showing the construction of a system of controlling a vehicle according to a sixth embodiment of the present invention.

FIG. 28 is a system diagram showing the construction of a system of controlling a vehicle of a sixth embodiment of the present invention. In the figure, the same parts as in FIG. 1 are identified by the same reference character.

A point of the present embodiment different from the embodiment of FIG. 1 is as flows. Although the embodiment shown in FIG. 1 is constructed in that the torque of the engine 1 is transmitted to the transmission input shaft 10 by engaging the first clutch input disk 2 with the second clutch output disk 3, the present embodiment is constructed using a twin clutch. That is, a first clutch input disk 301 is directly connected to the engine 1, and a first clutch first output disk 302 is directly connected to a transmission first input shaft 312, and a first clutch second output disk 303 is directly connected to a transmission second input shaft 304. The transmission second input shaft 304 is formed in a hollow shaft, and the transmission first input shaft 312 is penetrated through the hollow portion of the transmission second input shaft 304 so that the transmission first input shaft 312 can be rotated in the rotation direction relative to the transmission second input shaft 304. The first drive gear 4, the third drive gear 6 and the fifth drive gear 8 are fixed to the transmission second input shaft 304, and are rotatable with respect to the transmission first input shaft 312. Further, the second drive gear 5 and the fourth drive gear 7 is fixed to the transmission first input shaft 312, and are rotatable with respect to the transmission second input shaft 304. The engaging and disengaging of the first clutch input disk 301 with and from the first clutch first output disk 302 is performed by a first clutch actuator 305, and the engaging and disengaging of the first clutch input disk 301 with and from the first clutch second output disk 303 is performed by a first clutch actuator 306.

Further, a first engaging clutch 309 having a synchronizer mechanism for engaging the first driven gear 12 with the transmission output shaft 18 and for engaging the third driven gear 14 with the transmission output shaft 18 is provided between the first driven gear 12 and the third driven gear 14. Accordingly, the rotation torque transmitted from the first drive gear 4 or the third drive gear 6 to the first driven gear 12 or the third driven gear 14 is transmitted to the first engaging clutch 309, and then transmitted to the transmission output shaft 18 through the first engaging clutch 309.

Further, a third engaging clutch 311 having a synchronizer mechanism for engaging the second driven gear 13 with the transmission output shaft 18 and for engaging the fourth driven gear 15 with the transmission output shaft 18 is provided between the third driven gear 13 and the fourth driven gear 15. Accordingly, the rotation torque transmitted from the second drive gear 5 or the fourth drive gear 7 to the second driven gear 13 or the fourth driven gear 15 is transmitted to the third engaging clutch 311, and then transmitted to the transmission output shaft 18 through the third engaging clutch 311.

Further, a second engaging clutch 310 having a synchronizer mechanism for engaging the fifth driven gear 15 with the transmission output shaft 18 is provided in the fifth driven gear 16. Accordingly, the rotation torque transmitted from the fifth drive gear 8 to the fifth driven gear 16 is transmitted to the second engaging clutch 310, and then transmitted to the transmission output shaft 18 through the second engaging clutch 310.

For example, letting a case where the torque is transmitted to the transmission output shaft 18 using the first drive gear 4 and the first driven gear 12 be a first gear position; a case where the torque is transmitted to the transmission output shaft 18 using the third drive gear 6 and the third driven gear 14 be a third gear position; and a case where the torque is transmitted to the transmission output shaft 18 using the fourth drive gear 7 and the fourth driven gear 15 be a fourth gear position, the up-shift shifting from the first gear position to the third gear position or the down-shift shifting from the third gear position to the first gear position is performed by executing control similar to the control of the assist clutch in the embodiment illustrated in FIG. 1 using the first clutch first output disk 302 from the condition of keeping the first clutch first output disk 302 in the disengaging state and keeping the third engaging clutch 311 and the fourth driven gear 15 in the engaging state. By doing so, the torque waveform and input rotation speed during shifting can be controlled.

Further, for example, letting a case where the torque is transmitted to the transmission output shaft 18 using the second drive gear 5 and the second driven gear 13 be a second ear position; a case where the torque is transmitted to the transmission output shaft 18 using the fourth drive gear 7 and the fourth driven gear 15 be a fourth gear position; and a case where the torque is transmitted to the transmission output shaft 18 using the fifth drive gear 8 and the fifth driven gear 16 be a fifth gear position, the up-shift shifting from the second gear position to the fourth gear position or the down-shift shifting from the fourth gear position to the second gear position is performed by executing control similar to the control of the assist clutch in the embodiment illustrated in FIG. 1 using the first clutch second output disk 303 from the condition of keeping the first clutch second output disk 303 in the disengaging state and keeping the second engaging clutch 310 and the fifth driven gear 16 in the engaging state. By doing so, the torque waveform and input rotation speed during shifting can be controlled.

As described above, in the shifting operation of using the twin clutch in the present embodiment, since the assist clutch is controlled by setting the target shift torque during shifting, the torque waveform during shifting strongly affecting feeling of the shifting can be directly controlled, and accordingly the feeling of the shifting can be improved.

According to the present invention, it is possible to improve the shifting feeling and to rapidly perform the rotation speed synchronization by controlling the torque waveform during changing speed so as to form a torque waveform good for the shifting feeling.

What is claimed is:

1. A method of controlling a vehicle comprising a driving power source for generating a driving force; a gear type transmission having a plurality of gear trains; and a plurality of torque transmitting means arranged between an input shaft and an output shaft of said transmission,
   at least one of said torque transmitting means being a friction transmitting means,
   shifting being performed by controlling said friction transmitting means when the shifting is performed from one of the gear trains to another of the gear trains, the method comprising the steps of:
   estimating or detecting an input torque to said transmission;
   detecting an output rotation speed of said transmission;
   setting a target shift torque during shifting using at least one parameter among parameters expressing a state of said driving power source or said transmission; and
   controlling an output shaft torque of said transmission and an input rotation speed of said transmission during shifting by setting a command value to said friction transmitting means using said target shift torque and said input torque, wherein
   said target shift torque is set by
   a target shift time set by at least one parameter among the parameters expressing the state of said driving power source or said transmission;
   a target increasing time set by at least one parameter among the parameters expressing the state of said driving power source or said transmission;
   a target decreasing time set by at least one parameter among the parameters expressing the state of said driving power source or said transmission; and
   at least one parameter among the parameters expressing the state of said driving power source or said transmission.

2. A method of controlling a vehicle according to claim 1, wherein
   said target shift time, said target increasing time and said target decreasing time are set corresponding to a gear position before shifting and a gear position to be targeted.

3. A method of controlling a vehicle according to claim 1, wherein
   said target shift time, said target increasing time and said target decreasing time are set corresponding to an input torque.

4. A method of controlling a vehicle according to claim 1, wherein
   said target shift time, said target increasing time and said target decreasing time are set corresponding to a gear position before shifting, a gear position to be targeted, and an input torque.

5. A method of controlling a vehicle comprising a driving power source for generating a driving force; a gear type transmission having a plurality of gear trains; and a plurality of torque transmitting means arranged between an input shaft and an output shaft of said transmission,
   at least one of said torque transmitting means being a friction transmitting means,
   shifting being performed by controlling said friction transmitting means when the shifting is performed from one of the gear trains to another of the gear trains, the method comprising the steps of:
   estimating or detecting an input torque to said transmission;
   detecting an input rotation speed of said transmission;
   detecting an output rotation speed of said transmission;
   setting a target shift torque during shifting using at least one parameter among parameters expressing a state of said driving power source or said transmission;
   setting a feed-forward command value to said friction transmitting means from said target shift torque and said input torque;
   setting a target input rotation speed from said target shift torque;
   setting a feedback command value to said friction transmitting means based on a difference between said target input rotation speed and said input rotation speed; and
   controlling an output shaft torque of said transmission and an input rotation speed of said transmission during shifting by setting a command value to said friction transmitting means using said feed-forward command value and said feedback command value wherein
   said target shift torque is set by
   a target shift time set by at least one parameter among parameters expressing a state of said driving power source or said transmission;
   a target increasing time set by at least one parameter among the parameters expressing the state of said driving power source or said transmission;
   a target decreasing time set by at least one parameter among the parameters expressing the state of said driving power source or said transmission; and
   at least one parameter among the parameters expressing the state of said driving power source or said transmission.

6. A method of controlling a vehicle according to claim 5, wherein
   said target input rotation speed is set based on a target gear ratio set from said target shift torque.

* * * * *